United States Patent
He et al.

(10) Patent No.: US 12,493,585 B2
(45) Date of Patent: Dec. 9, 2025

(54) PAGE CONTENT CONNECTION METHOD, APPARATUS AND DEVICE, DOCUMENT SYNCHRONIZATION METHOD, APPARATUS AND DEVICE, AND DOCUMENT PROCESSING METHOD, APPARATUS AND DEVICE

(71) Applicant: BEIJING ZITIAO NETWORK TECHNOLOGY CO., LTD., Beijing (CN)

(72) Inventors: Weipeng He, Beijing (CN); Hengyu Zhang, Beijing (CN); Zongyan Wei, Beijing (CN); Guangping Xie, Beijing (CN); Xuejia Chen, Beijing (CN); Wei Chen, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 132 days.

(21) Appl. No.: 18/548,654

(22) PCT Filed: Feb. 28, 2022

(86) PCT No.: PCT/CN2022/078214
§ 371 (c)(1),
(2) Date: Sep. 1, 2023

(87) PCT Pub. No.: WO2022/184007
PCT Pub. Date: Sep. 9, 2022

(65) Prior Publication Data
US 2024/0143555 A1 May 2, 2024

(30) Foreign Application Priority Data

Mar. 1, 2021 (CN) .......................... 202110226979.4
Mar. 1, 2021 (CN) .......................... 202110226980.7
Mar. 1, 2021 (CN) .......................... 202110227813.4

(51) Int. Cl.
*G06F 16/178* (2019.01)

(52) U.S. Cl.
CPC .................................. *G06F 16/178* (2019.01)

(58) Field of Classification Search
CPC ..................................................... G06F 16/178
(Continued)

(56) References Cited

U.S. PATENT DOCUMENTS

| 5,901,058 A * | 5/1999 | Steinman | G05B 19/408 |
| | | | 700/1 |
| 2006/0136513 A1* | 6/2006 | Ngo | G06Q 10/10 |
| | | | 707/999.203 |

(Continued)

FOREIGN PATENT DOCUMENTS

| CN | 101136018 A | 3/2008 |
| CN | 102222079 A | 10/2011 |

(Continued)

OTHER PUBLICATIONS

International Search Report (with English translation) and Written Opinion issued in PCT/CN2022/078214, dated May 12, 2022, 18 pages provided.

(Continued)

*Primary Examiner* — Muluemebet Gurmu
(74) *Attorney, Agent, or Firm* — Astute IP Law Group

(57) ABSTRACT

A page content processing method, apparatus and device, and a readable medium are provided. The method comprises: in response to a connection operation of a target content block in a current page, determining a connection content block of the target content block; and at an associated location of one of the target content block and the connection content block, displaying a connection identifier (Continued)

of the other content block, so as to view the other content block by using the connection identifier. Also provided are a document synchronization method, apparatus and device, a medium, a tree structure-based document processing method, apparatus and device, and a medium.

33 Claims, 22 Drawing Sheets

(58) Field of Classification Search
USPC .......................................................... 707/626
See application file for complete search history.

(56) References Cited

U.S. PATENT DOCUMENTS

| | | | | |
|---|---|---|---|---|
| 2008/0104141 | A1* | 5/2008 | McMahon | G06F 40/197 |
| | | | | 707/999.203 |
| 2010/0318892 | A1* | 12/2010 | Teevan | G06F 16/958 |
| | | | | 715/229 |
| 2011/0066668 | A1 | 3/2011 | Guarraci | |
| 2011/0252315 | A1 | 10/2011 | Misawa et al. | |
| 2014/0279843 | A1 | 9/2014 | Von Weihe | |
| 2015/0339045 | A1 | 11/2015 | Sekine | |
| 2016/0110313 | A1 | 4/2016 | Prakash et al. | |
| 2017/0060829 | A1* | 3/2017 | Bhatt | G06F 40/169 |
| 2021/0173550 | A1* | 6/2021 | Song | G06F 9/54 |
| 2021/0224230 | A1* | 7/2021 | Jones | G06F 16/185 |

FOREIGN PATENT DOCUMENTS

| | | |
|---|---|---|
| CN | 102810115 A | 12/2012 |
| CN | 104036027 A | 9/2014 |
| CN | 105637462 A | 6/2016 |
| CN | 107357496 A | 11/2017 |
| WO | 2005045588 A2 | 5/2005 |

OTHER PUBLICATIONS

First Office Action for Chinese Patent Application No. 202110226979.4, mailed on Mar. 10, 2025, 31 Pages.

* cited by examiner

PAGE CONTENT CONNECTION METHOD, APPARATUS AND DEVICE, DOCUMENT SYNCHRONIZATION METHOD, APPARATUS AND DEVICE, AND DOCUMENT PROCESSING METHOD, APPARATUS AND DEVICE

This application is the national phase of International Patent Application No. PCT/CN2022/078214 filed on Feb. 28, 2022, which claims the priority to Chinese Patent Application No. 202110226980.7, titled "PAGE CONGENT PROCESSING METHOD, APPARATUS AND DEVICE, AND READABLE MEDIUM", filed on Mar. 1, 2021 with the China National Intellectual Property Administration, Chinese Patent Application No. 202110227813.4, titled "DOCUMENT SYNCHRONIZATION METHOD, APPARATUS AND DEVICE, AND MEDIUM" filed on Mar. 1, 2023 with the China National Intellectual Property Administration, and Chinese Patent Application No. 202110226979.4 titled "DOCUMENT PROCESSING METHOD, APPARATUS AND DEVICE BASED ON TREE STRUCTURE, AND MEDIUM" filed on Mar. 1, 2023 with the China National Intellectual Property Administration, all of which are incorporated herein by reference in their entireties.

FIELD

The present disclosure relates to the technical field of information processing and computer document data processing, and in particular to a page content connection method, apparatus and device and a readable medium, a document synchronization method, apparatus and device and a medium, and a document processing method, apparatus and device based on a tree structure, and a medium.

BACKGROUND

When a page is generated, there may be a logical relationship between certain content in the page and content in another page. Therefore, extended description for the content in the page may be provided by using the content of another page, so as to enhance an association between the page contents, thereby ensuring readability of the page for a user.

Presently, a link of another page is embedded into one page, to access another page by accessing the link. It is inconvenient to search and view reference content in another page.

Presently, computer software is heavily used in document processing. With increase of collaborative office requirement, the technology of online collaboratively processing the document is gradually developed.

For the on-line collaboratively processed documents, multiple users may need to view, edit or refer to the documents. The research aims at synchronous update of the documents, giving consideration to a cost of cooperation between front end and back end, effective management of various operations of the multiple users, and maintaining accuracy and consistency of the documents.

SUMMARY

In view of above, according to embodiments of the present disclosure, a page content processing method, apparatus and device, and a readable medium are provided, so as to implement connection between different page content blocks, thereby reducing complexity in viewing page content connection, and improving flexibility of the page content connection.

In a first aspect, a page content processing method is provided according to an embodiment of the present disclosure. The method includes:
  determining, in response to a connection operation for a target content block in a current page, a connection content block of the target content block; and
  displaying, at an associated position of one of the target content block and the connection content block, a connection identifier of the other of the target content block and the connection content block, to view the other content block by using the connection identifier.

In a second aspect, an information processing method is provided according to an embodiment of the present disclosure. The method includes:
  recording, in response to a connection operation for connecting a first content block and a second content block, a connection relationship between the first content block and the second content block in connection characteristic information of the first content block and connection characteristic information of the second content block;
  searching, in response to a connection content block output request of the first content block, for the connection characteristic information of the first content block to determine a content block in connection with the first content block; and obtaining content data information of the content block in connection with the first content block, and outputting the content data information.

In a third aspect, a page content processing apparatus is provided according to an embodiment of the present disclosure. The apparatus includes a connection response module and a content connection module. The connection response module is configured to determine, in response to a connection operation for a target content block in a current page, a connection content block of the target content block. The content connection module is configured to display, at an associated position of one of the target content block and the connection content block, a connection identifier of the other of the target content block and the connection content block, to view the other content block by using the connection identifier.

In a fourth aspect, an information processing apparatus is provided according to an embodiment of the present disclosure. The apparatus includes a connection relationship recording module, a connection content searching module and a connection content output module. The connection relationship recording module is configured to record, in response to a connection operation for connecting a first content block and a second content block, a connection relationship between the first content block and the second content block in connection characteristic information of the first content block and connection characteristic information of the second content block. The connection content searching module is configured to search, in response to a connection content block output request of the first content block, for the connection characteristic information of the first content block to determine a content block in connection with the first content block. The connection content output module is configured to obtain content data information of the content block in connection with the first content block, and output the content data information.

In a fifth aspect, a computer device is further provided according to an embodiment of the present disclosure. The computer device includes: one or more processors; and a memory configured to store one or more programs, where the one or more programs, when being executed by the one or more processors, cause the one or more processors to perform the page content processing method according to any embodiment of the present disclosure, or perform the information processing method according to any embodiment of the present disclosure.

In a sixth aspect, a readable medium storing computer programs is further provided according to an embodiment of the present disclosure. The programs are executed by a processor to perform the page content processing method according to any embodiment of the present disclosure, or perform the information processing method according to any embodiment of the present disclosure.

According to the page content processing method, apparatus and device, and the readable medium provided in the embodiment of the present disclosure, a page is created by content blocks; in response to a connection operation for a target content block of a current page, a connection content block of the target content block is determined. Then, at an associated position of one of the target content block and the connection content block, a connection identifier of the other of the target content block and the connection content block is displayed. In this way, connection between the target content block and the connection content block is implemented, thereby avoiding a problem that it needs to jump and view a second time since the required reference content cannot be directly viewed when establishing connection between a page and an original page. By means of the connection identifier displayed at the associated position of one content block, the other content block can be directly viewed, without jumping to the original page for viewing, thereby reducing complexity in viewing a part of content of another page in one page, and thus improving flexibility in page content processing.

According to embodiments of the present disclosure, a document synchronization method, apparatus and device, and a medium are provided, to update documents synchronously.

In a seventh aspect, a document synchronization method is provided according to embodiments of the present disclosure. The method includes:
  monitoring an update state of a document according to a document version identifier of a document node in a tree structure of the document, where the document includes at least one content block, the tree structure includes a document node and a content block node, a parent-child relationship between the document node and the content block node represents affiliation between the document and the content block; a document version identifier sequence is recorded in the document node and the document version identifier is used to represent update of a content block belonging to the document;
  determining, in response to detecting an update of a content object in a room, a client device in the room subscribing the content object, wherein the content object comprises a document; and providing update content of the content object in the room to the client device, to allow the client device to update the content object.

In an eighth aspect, a document synchronization method is provided according to an embodiment of the present disclosure. The method includes:
  sending a content update request to a server for a currently processed document of a client device, to request the server to determine document content according to a document version identifier in the content update request, where the document includes at least one content block, the tree structure includes a document node and a content block node, a parent-child relationship between the document node and the content block node represents affiliation between the document and the content block; where a document version identifier sequence is recorded in the document node, and the document version identifier is used to represent update of a content block belonging to the document;
  obtaining the document version identifier and a content block version identifier of a content block belonging to the document fed back by the server; and
  obtaining practical content by the client device according to the document version identifier and the content block version identifier.

In a ninth aspect, a document synchronization apparatus is further provided according to an embodiment of the present disclosure. The apparatus includes a first monitoring module, a first determining module and a sending module. The first monitoring module is configured to monitor an update state of a document according to a document version identifier of a document node in a tree structure of the document, where the document includes at least one content block, the tree structure includes a document node and a content block node, a parent-child relationship between the document node and the content block node represents affiliation between the document and the content block; a document version identifier sequence is recorded in the document node and the document version identifier is used to represent update of a content block belonging to the document. The first determining module is configured to determine, in response to detecting an update of a content object in a room, a client device in the room subscribing the content object, where the content object includes a document. The sending module is configured to provide update content of the content object in the room to the client device, to allow the client device to update the content object.

In a tenth aspect, a document synchronization apparatus is further provided according to an embodiment of the present disclosure. The apparatus includes: a request sending module, a version identifier obtaining module and a content obtaining module. The request sending module is configured to send a content update request to a server for a currently processed document of a client device, to request the server to determine document content according to a document version identifier in the content update request, where the document includes at least one content block, the tree structure includes a document node and a content block node, a parent-child relationship between the document node and the content block node represents affiliation between the document and the content block; where a document version identifier sequence is recorded in the document node, and the document version identifier is used to represent update of a content block belonging to the document. The version identifier obtaining module is configured to obtain the document version identifier and a content block version identifier of a content block belonging to the document fed back by the server. The content obtaining module is configured to obtain practical content to the client device according to the document version identifier and the content block version identifier.

In an eleventh aspect, a document synchronization device is further provided according to an embodiment of the present disclosure. The device includes: one or more processors; and a memory configured to store one or more programs, where the one or more programs, when being executed by the one or more processors, cause the one or more processors to perform the document synchronization method according to any embodiment of the present disclosure.

In a twelfth aspect, a medium storing computer programs is further provided according to an embodiment of the present disclosure. The computer programs are executed by a processor to perform the document synchronization method according to any embodiment of the present disclosure.

According to the technical solution of the embodiments of the present disclosure, the update state of the document is monitored uniformly by the document version identifier of the document node; and when it is monitored that the content object in the room is updated, the update content of the content object in the room is provided to all client devices subscribing the content object in the room, so that the client devices update the content object. Compared with the technical solution of respectively monitoring multiple content blocks in the document by the content block version identifier, a monitoring pressure of the server can be effectively reduced with the technical solution of the present disclosure, thereby effectively updating the on-line documents synchronously.

A document processing method, apparatus and device based on a tree structure, and a medium are provided according to embodiments of the present disclosure, so as to meet multiple operation requirements on on-line document collaborative processing.

In a thirteenth aspect, a document processing method based on a tree structure is provided according to an embodiment of the present disclosure. The method includes:

obtaining a document operation event for a current document;

determining, according to the document operation event, a document node and/or a content block node in a tree structure of the current document; and performing the document operation event according to a correspondence between a document version identifier of the document node and a content block version identifier of the content block node, wherein the document comprises at least one content block, the tree structure comprises a document node and a content block node; a parent-child relationship between the document node and the content block node represents affiliation between the document and the content block; a document version identifier sequence is recorded in the document node, a content block version identifier sequence is recorded in the content block node; and the document version identifier is used to represent update of the content block of the document.

In a fourteenth aspect, a document processing apparatus based on a tree structure is further provided according to an embodiment of the present disclosure. The apparatus includes: a first obtaining module, a first determining module and a performing module. The first obtaining module is configured to obtain a document operation event for a current document. The first determining module is configured to determine, according to the document operation event, a document node and/or a content block node in a tree structure of the current document. The performing module is configured to perform the document operation event according to a correspondence between a document version identifier of the document node and a content block version identifier of the content block node. The document comprises at least one content block, the tree structure comprises a document node and a content block node; a parent-child relationship between the document node and the content block node represents affiliation between the document and the content block; a document version identifier sequence is recorded in the document node, a content block version identifier sequence is recorded in the content block node; and the document version identifier is used to represent update of the content block of the document.

In a fifteenth aspect, a document processing device based on a tree structure is further provided according to an embodiment of the present disclosure. The device includes: one or more processors; and a memory configured to store one or more programs, where the one or more programs, when being executed by the one or more processors, cause the one or more processors to perform the document processing method based on a tree structure according to any embodiment of the present disclosure.

In a sixteenth aspect, a medium storing computer programs is further provided according to an embodiment of the present disclosure. The computer programs are executed by a processor to perform the document processing method based on a tree structure according to any embodiment of the present disclosure.

According to the embodiments of the present disclosure, the document version identifier of the document node is added in the current document. According to the correspondence between the document version identifier of the document node and the content block version identifier of the content block, the document operation event is performed on the content block nodes indicated by all the content block version identifiers corresponding to the document version identifier, thereby performing uniform operation on the current document, and thus improving operation convenience of the current document for the user.

BRIEF DESCRIPTION OF THE DRAWINGS

In conjunction with the drawings and with reference to the following implementations, the above and other features, advantages ad aspects of the embodiments of the present disclosure will become more apparent. Throughout the drawings, the same or similar reference numerals indicate the same or similar elements. It should be understood that, the drawings are schematic, and the devices and elements are unnecessary to be drawn to scale.

DETAILED DESCRIPTION OF EMBODIMENTS

Embodiments of the present disclosure are described in detail hereinafter with reference to the drawings. Although the drawings show some embodiments of the present disclosure, it should be understood that the present disclosure may be implemented by various embodiments and are not limited to be implemented by the embodiments clarified herein. The embodiments described in the present disclosure are intended to illustrate the present disclosure thoroughly and completely. It should be understood that the drawings and the embodiments are only schematic, and are not intended to limit the protection scope of the present disclosure.

It should be understood that, steps described in the method embodiments of the present disclosure may be performed in different orders and/or performed in parallel. In addition, the method embodiments may include additional steps and/or steps omitted. The scope of the present disclosure is not limited thereto.

The term "including" and variations thereof adopted herein is inclusive, that is "including but not limited to". The term "based on" means "at least partially based on". The term "one embodiment" means "at least one embodiment", and the term "another embodiment" means "at least another embodiment". The term "some embodiments" means "at least some embodiments". Definitions of other terms are provided below.

It should be noted that, the terms "first" "second" and so on mentioned in the present disclosure are only used to distinguish different apparatuses, modules or units, rather than limit an order of functions performed by the apparatus, module or unit or limit interdependence.

It should be noted that, the terms "one" and "multiple" mentioned in the present disclosure are schematic rather than restrictive, and should be understood as "one or more" by those skilled in the art, otherwise explicitly illustrated in the context.

In the embodiments of the present disclosure, a name of messages or information interacted between multiple parties is only illustrative, rather than limit the scope of the message or information.

Figure 1A:
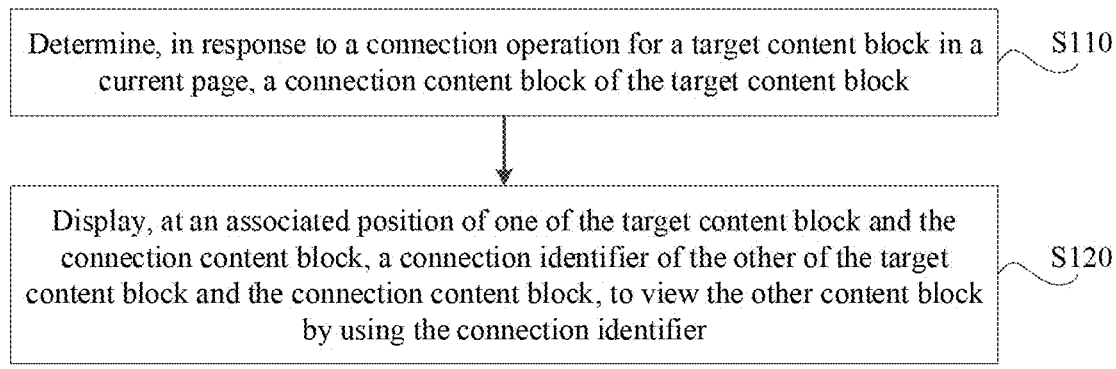
FIG. 1A shows a flowchart of a page content processing method according to an embodiment of the present disclosure.

FIG. 1A shows a flowchart of a page content processing method according to an embodiment of the present disclosure. The embodiment of the present disclosure is applicable to a case that a content in any page needs to be connected to other content for collaboration. The page content connection method provided in the embodiment of the present disclosure may be performed by a page content processing apparatus according to an embodiment of the present disclosure. The apparatus may be implemented by software and/or hardware, and is integrated in a device for performing the method.

As shown in FIG. 1A, the page content processing method in the embodiment of the present disclosure may include steps S110 and S120 as follows.

In step S110, in response to a connection operation for a target content block in a current page, a connection content block of the target content block is determined.

In order to ensure operation convenience of the page content, a page is created by defining content blocks in the embodiment of the present disclosure. The page may be a document page, a web page or an application page, and a type of the page is not limited in the embodiment. Content blocks for recording various types of information in the page are set according to a context relationship between contents in the page. In this case, the content block may be a paragraph, a table and a picture of a document, or work objects at different phases in a same project flow, so that page contents satisfying user requirements are generated and organized by using the content blocks in the page.

In the embodiment, in order to comprehensively describe a certain content block in a page by using other existing content so as to improve readability of the content block, a connection relationship between a certain content block in the page and associated content blocks may be established, to comprehensively explain information of the content block, so that the user can understand the content block easier. Therefore, when the user entering in the current page needs to connect a certain content block to existing content blocks in a current page, the certain content block serves as a target content block requiring content connection. Then, a connection operation is performed on the target content block in the current page, to select content blocks to be connected for the target content block from the existing content blocks. In this case, in response to the connection operation for the target content block, a connection content block of the target content block is determined based on a content block selection operation performed according to a connection requirement.

It should be noted that, the connection content block in the embodiment may be a content block in the current page other than the target content block, or may be a content block in a page other than the current page. That is, the target content block and a reference content block may be located at the same page or different pages. Characteristics, content types and classification labels of the target content block and the connection content block are not limited in the embodiment. The connection may be established for content blocks having the same characteristic or type, or may be established for content blocks having different characteristics or types. For example, a connection between the target content block and the connection content block may be, for example, a connection between different targets in a same project flow, a connection between a target and a task, and a connection between a paragraph and a table. That is, the connection content block and the target content block may have the same or different content types. The content block may include at least one of: a content block of a text type, a content block of a multimedia type, a content block of a table type, and a content block of a program type. The content block of the multimedia type may be a picture, a gif image, audio, video and so on, thereby improving richness of the content connection.

In step S120, at an associated position of one of the target content block and the connection content block, a connection identifier of the other of the target content block and the connection content block is displayed, to view the other content block by using the connection identifier.

In some embodiments, in order to quickly viewing the connection content block at the target content block after the connection content block of the target content block is determined, a connection between the target content block and the connection content block may be established by using the connection identifier. As an example, a connection identifier of the connection content block may be displayed at an associated position of the target content block, and a connection identifier of the target content block may be displayed at an associated position of the connection content block. As an example, a bi-directional connection is established between the target content block and the connection content block, that is, at any one of the target content block and the connection content block, content of the other content block can be viewed via the connection identifier. In this case, when the user triggers the connection identifier displayed at the associated position of the target content block in the current page, for example, the user drags a mouse to hover on the connection identifier or the user clicks the connection identifier, specific content of the connection content block to which the connection identifier points is directly displayed in the current page, so that the user can directly view the connected connection content block at the associated position of the target content block. With the connection identifier, the specific content that is connected can be viewed at the current page. As compared with the technical solution in which only a link of the whole referenced document or a part of the referenced document is displayed and it has to jump to a page where the referenced content is located to search for the specific referenced content, content to be referenced can be viewed directly without search, thereby improving the efficiency of viewing some content of one page in another page. In an embodiment, by the connection identifier displayed at an associated position of each of the target content block and the connection content block, the user can view, at any one of the target content block and the connection content block, content of the other content block, thereby improving the viewing efficiency as compared with a strategy of using webpage hyperlink which can implement only unidirectional connection and content viewing. When the user triggers the connection identifier of the target content block displayed at the associated position of the connection content block in a page where the connection content block is located, specific content of the target content block pointed by the connection identifier is directly displayed in the page where the connection content block is located, so that the user can directly view the connected target content block at the connection content block, thereby implementing quick viewing between the target content block and the connection content block.

It should be noted that, in the embodiment, at the associated position of one of the target content block and the connection content block, the connection identifier of the other content block may be displayed permanently, or may be displayed in response to triggering of the user. For example, the connection identifier is usually hidden; and the connection identifier of the connection content block is displayed at the associated position of the target content block only when the user clicks the target content block in the current page. The connection identifier in the embodiment may be implemented with an icon or any marker that can be triggered, which is not limited in the embodiment.

In some embodiments, in order to accurately distinguish a connection direction of the target content block and the connection content block, that is, accurately determining whether the target content block actively connects to the connection content block or the connection content block actively connects to the target content block, the connection identifiers displayed at the associated positions of the target content block and the connection content block are different from each other, i.e., classified into an active connection identifier and a passive connection identifier. In this case, the process of displaying, at the associated position of one of the target content block and the connection content block, the connection identifier of the other content block may include: displaying, at the associated position of the target content block, an active connection identifier indicating connecting to the connection content block, to view the connection content block in the current page by using the active connection identifier; and displaying, at the associated position of the connection content block, a passive connection identifier indicating being connected to the target content block, to view the target content block at a page where the connection content block is located by using the passive connection identifier.

Figure 1B:
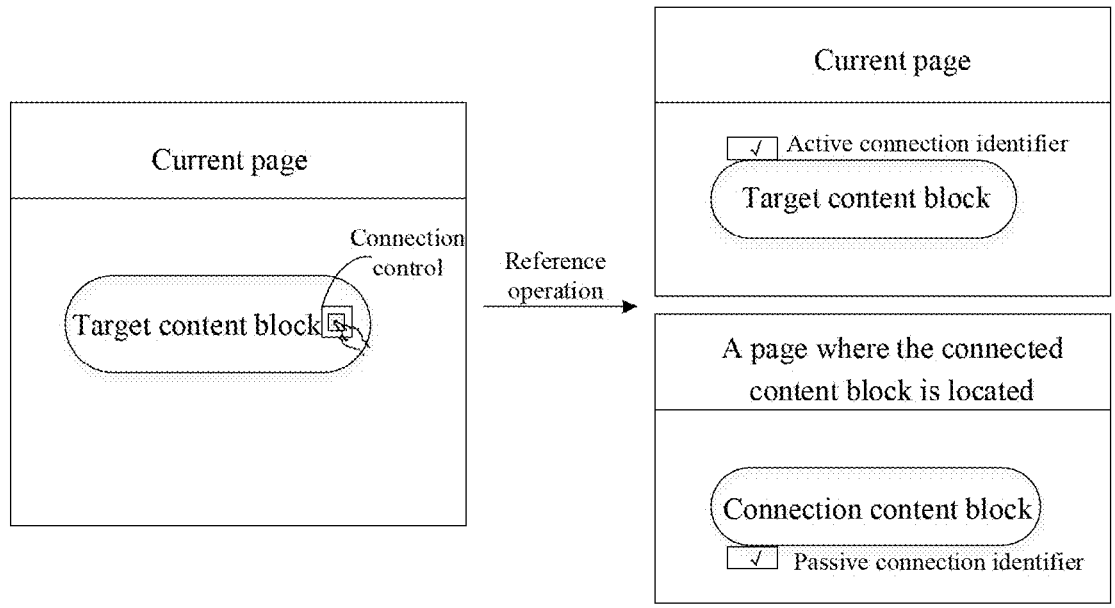
FIG. 1B shows a schematic diagram of an interface of a page content connection process according to an embodiment of the present disclosure.

In some embodiments, once the target content block and the connection content block are connected with each other, different types of connection identifiers are displayed at the associated positions of the target content block and the connection content block, to represent a connection direction between the target content block and the connection content block, as shown in FIG. 1B. The active connection identifier is displayed at the associated position of the target content block, to indicate that the target content block actively connects to other content block, and specific content of the connection content block may be viewed by triggering the active connection identifier in the current page. The passive connection identifier is displayed at the associated position of the connection content block, to indicate that the connection content block is referenced by other content block, and specific content of the target content block may be viewed by triggering the passive connection identifier in the page where the connection content block is located.

It should be noted that, the active connection identifier and the passive connection identifier in the embodiment may be distinguished by an identifier pattern, such as a color and a shape, or may be distinguished by a position of the identifier relative to the content block. For example, the active connection identifier may be located above the content block, and the passive connection identifier may be located below the content block.

According to the technical solution of the embodiment of the present disclosure, a page is created by content blocks; in response to a connection operation for a target content block in a current page, a connection content block of the target content block is determined. Then, at an associated position of one of the target content block and the connection content block, a connection identifier of the other of the target content block and the connection content block is displayed. In this way, connection between the target content block and the connection content block is implemented, thereby avoiding a problem that it needs to jump and view a second time since the required reference content cannot be directly viewed when establishing connection between a page and an original page. By means of the connection identifier displayed at the associated position of one content block, the other content block can be directly viewed, without jumping to the original page for viewing, thereby reducing complexity in viewing a part of content of one page in another page, and thus improving flexibility in page content processing.

Based on the above solution, in order to ensure that the user accurately performs the connection operation for the target content block in the current page, before determining the connection content block of the target content block in response to the connection operation for the target content block in the current page, the method may further include: creating the target content block in the current page and configuring a connection control for the target content block, to perform the connection operation by using the connection control.

In some embodiments, before the current page is created by using content blocks, various content blocks required to carry page information are created in the current page according to the requirement of the user. In this case, when the target content block is created, a connection control is directly set for the target content block in the current page. The connection control may be an alignment button set at a tail of the target content block, or the like. The user may perform the connection operation for the target content block by triggering the connection control, for example clicking the connection control, so as to accurately perform the connection operations for all the content blocks in the current page.

Figure 2A:
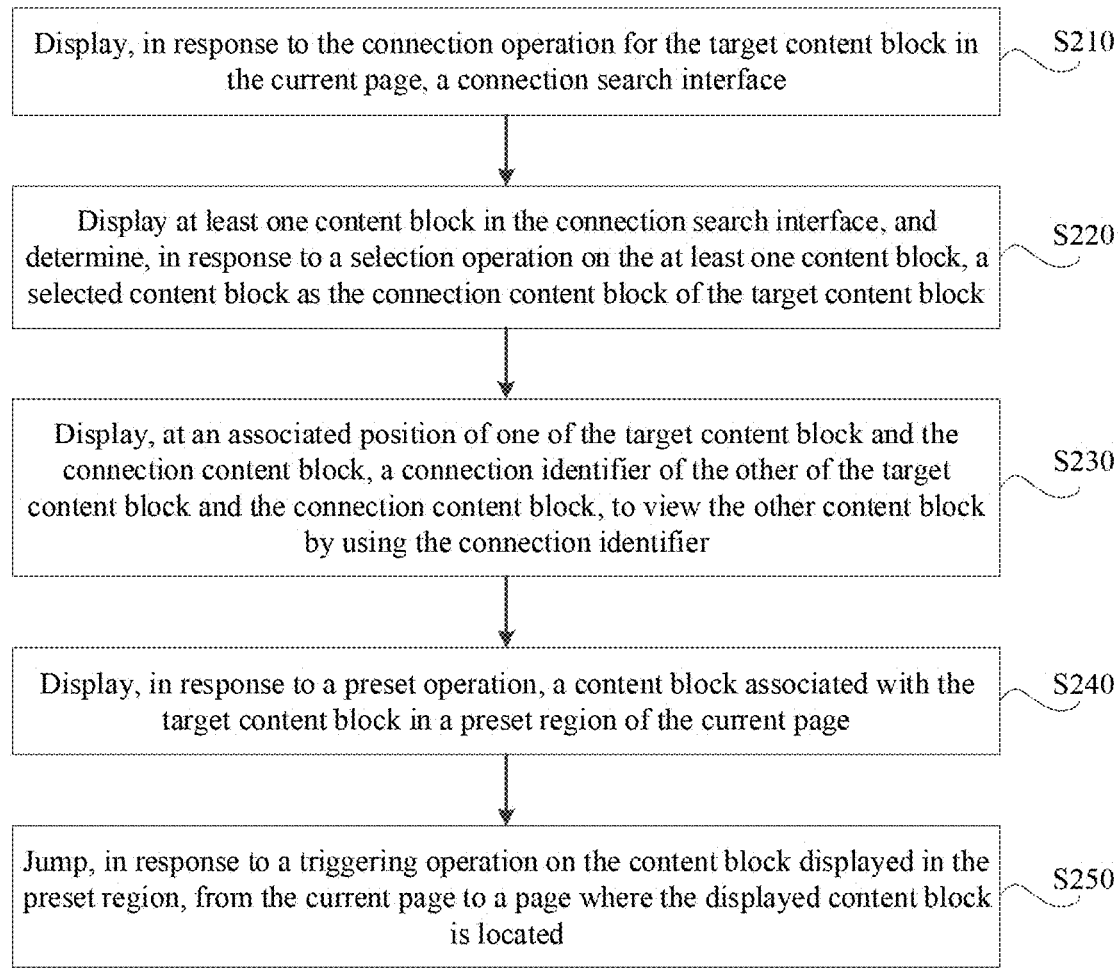
FIG. 2A shows a flowchart of another page content processing method according to an embodiment of the present disclosure.

FIG. 2A shows a flowchart of a page content connection method according to an embodiment of the present disclosure. This embodiment optimizes the technical solutions provided in the above embodiments. For any content block created in the page, the content block may be connected by other content blocks, and may connect to other content blocks. In order to quickly distinguish specific connection condition of any content block, the displaying, at the associated position of one of the target content block and the connection content block, the connection identifier of the other content block in this embodiment includes displaying of at least one of the following connection identifiers: 1) a passive connection identifier in the case that the content block is connected by other content block; 2) an active connection identifier in the case that the content block connects to other content block. In this embodiment, a specific process of determining the connection content block of the target content block and a process of processing the connection identifier displayed in any content block are described in detail.

In an embodiment, as shown in FIG. 2A, the method in the embodiment may include steps S210 to S250 as follows.

In step S210, in response to a connection operation for a target content block in a current page, a connection search interface is displayed.

Figure 2B:
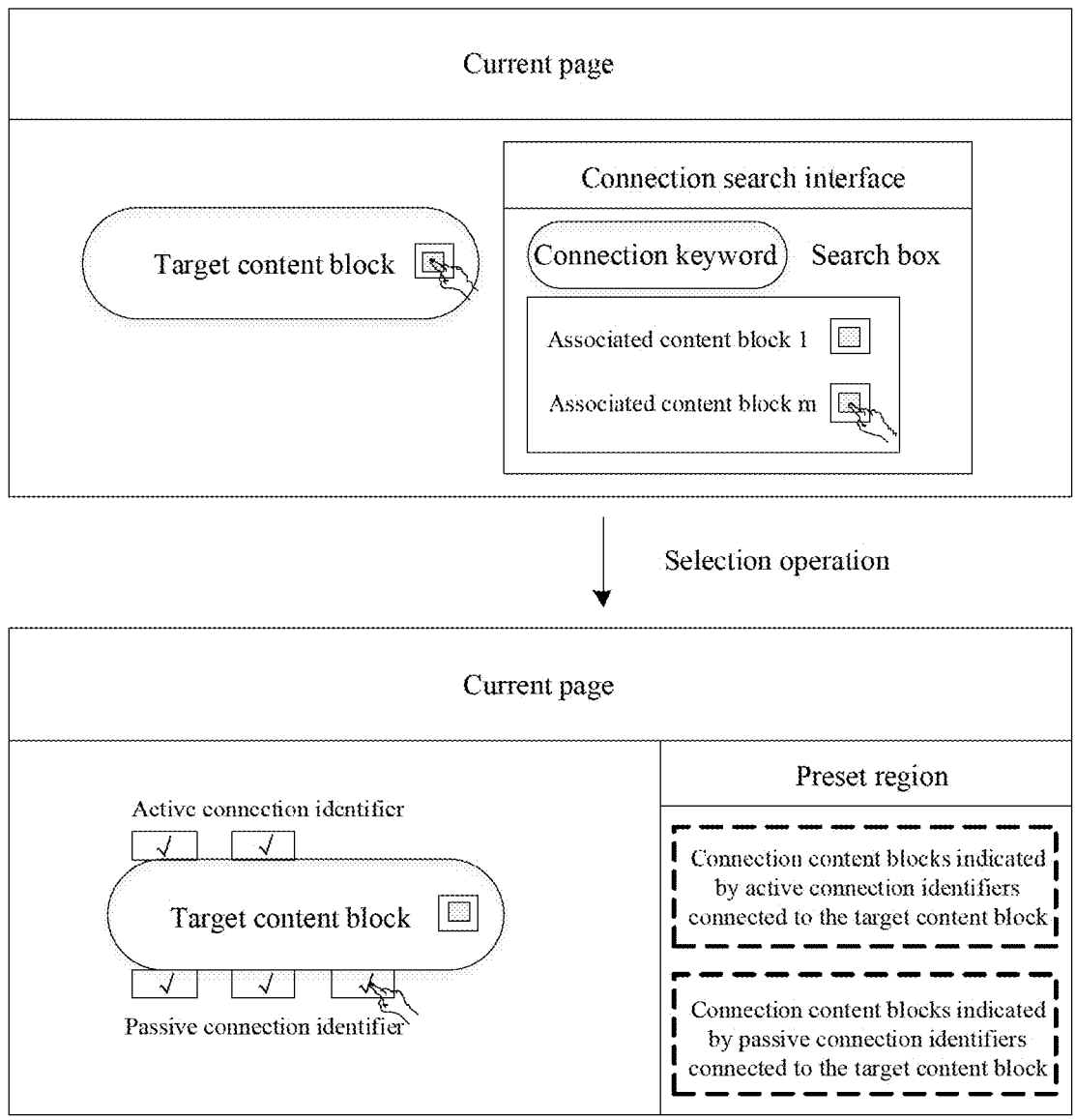
FIG. 2B shows a schematic diagram of an interface of another page content connection process according to an embodiment of the present disclosure.

In an embodiment, when the user connects the target content block to other content block in the current page, the user performs the connection operation via the connection control configured for the target content block. In order to ensure convenience in the selection of the connection content block, a connection search interface is directly displayed at an interface of the target content block in the current page in response to the connection operation for the target content block in the current page in this embodiment, as shown in FIG. 2B. The connection search interface may be implemented as a pop-up window, or may be implemented as a search page newly displayed above the current page, which is not limited in the embodiment. Specific connection information is inputted to the connection search interface, to search for and display content blocks in the current page or other page which are related to this connection, so that the user selects the connection content block of the target content block from the content blocks, thereby ensuring connection convenience of the connection content blocks in the page.

In step S220, at least one content block is displayed in the connection search interface, and in response to a selection operation on the at least one content block, a selected content block is determined as the connection content block of the target content block.

In order to quickly select the connection content block from the connection search interface, at least one content block is displayed at the connection search interface in this embodiment. The at least one displayed content block may be an associated content block of the target content block, or may be a content block found in response to an inputted connection keyword. A selection operation is performed on the at least one content block displayed in the connection search interface, a selected content block among the at least one displayed content block can be determined, and the selected content block serves as the connection content block of the target content block.

It should be noted that, the process of displaying at least one content block associated with the target content block in the connection search interface may include: displaying a content block satisfying a preset condition, for example content blocks viewed recently, or displaying all the content blocks, for example to switch among the content blocks by a scrollbar.

As an example, a search box is arranged in the connection search interface in this embodiment, so that the user can input specific information of content blocks to be connected with the target content block in the search block, and quickly searches for a corresponding connection content block in sequence. In this embodiment, the connection information is a keyword representing a content block with which the target content block requires to connect. As shown in FIG. 2B, the connection keyword is inputted in the search box in the connection search interface, associated content blocks meeting the connection keyword requirement can be found from the content blocks generated in the pages, and the found associated content blocks are displayed in the connection search interface. The user selects the connection content block of the target content block from the associated content blocks by viewing specific content of the displayed associated content blocks. In this case, according to the selection operation performed on the associated content blocks by the user, the connection content block of the target content block can be directly determined in this embodiment, thereby ensuring accuracy of the page content connection.

In step S230, at an associated position of one of the target content block and the connection content block, a connection identifier of the other of the target content block and the connection content block is displayed, to view the other content block by the connection identifier.

In step S240, in response to a preset operation, one or more content blocks associated with the target content block are displayed in a preset region of the current page.

In an embodiment, if the target content block in the current page may connect to other content block and may be connected by other content block, the connection identifier displayed at the associated position of the target content block includes a passive connection identifier indicating being referenced by other content block and an active connection identifier indicating connecting to other content block. As shown by FIG. 2B, the preset operation in the embodiment can trigger to display the content block associated with the target content block. The preset operation may be a triggering operation on any connection identifier displayed at the associated position of the target content block, a display mode switching operation or a triggering operation on a preset operation control, and so on. When the preset operation is triggered by triggering any connection identifier displayed at the associated position of the target content block, such as clicking the connection identifier or a mouse hovers at a position of the connection identifier, content blocks in associated connection with the target content block can be viewed. The associated connection may include being connected by the target content block and connecting to the target content block. In response to the triggering operation on any connection identifier displayed at the associated position of the target content block, the content block which is connected by the target content block and the content block which connects to the target content block are displayed in the present region of the current page in this embodiment. That is, the content blocks corresponding to the active connection identifier and the passive connection identifier displayed at the associated position of the target content block may be displayed in different modes. For example, the content blocks to which the target content block actively connects are displayed in different sub-regions or provided with different marks from the content blocks to which the target content block is passively connected. The preset region may be sidebars at top, bottom, left and right of the current page, or may be a lower half display region or upper half display region of the current page. In the sidebar of the current page, the connection content blocks of the target content block in different types are displayed according to the types of the connection identifiers. For example, the content blocks to which the target content block actively connects are displayed in different sub-regions in the preset region from the content blocks to which the target content block is passively connected. The content block indicated by the connection identifier specified by the preset operation may be highlighted. For example, the content block which is connected by the target content block and the content block which connects to the target content block are displayed in different sub-regions in the sidebar, and the content block indicated by the connection identifier triggered by the user is highlighted, so that the user can intuitively view the content block currently triggered.

In some embodiments, when displaying the content blocks associated with the target content block in the preset region of the current page, in order to directly view the content block indicated by the triggered reference icon, the content block indicated by the triggered reference icon is analyzed and only the content block indicated by the triggered reference icon is displayed in the sidebar of the current page.

In another implementation of the embodiment, the process of displaying the content block in associated connection with the target content block in the preset region of the current page may include: viewing a connection relationship recorded in connection characteristic information of the target content block, and determining whether the content block associated with the target content block is deleted according to a delete identifier corresponding to the connection relationship; and displaying the content block associated with the target content block that is not deleted in the preset region of the current page.

When a connection relationship is established between the target content block and the connection content block, the connected content block may be deleted in a subsequent operation. In order to avoid the data processing pressure due to continuously correcting all stored connection data when connection between different content blocks is deleted by write diffusion, the following scheme is provided according to the present disclosure. In the embodiment, a connection relationship is recorded in connection characteristic information of the target content block and connection characteristic information of the connection content block when the connection is established between the target content block and the connection content block. A delete identifier corresponding to the connection relationship indicates whether the connected content block is deleted. The delete identifier may be recorded in the connection characteristic information of the content block or may be recorded in other data region, which is not limited herein. Therefore, in the embodiment, when displaying the content blocks associated with the target content block in the preset region of the current page, in order to ensure accurate display of the connection content block, the recorded connection relationship is found from the connection characteristic information of the target content block, it is determined whether the content block in associated connection with the target content block indicated by the delete identifier corresponding to the connection relationship is deleted, the content block not deleted is selected and displayed in the present region of the current page, thereby avoiding invalid display of the content blocks in associated connection with the target content block.

Further, in order to ensure accuracy regarding whether the connected content block is deleted, after the connection content block of the target content block is determined in response to the connection operation for the target content block in the current page in this embodiment, a connection relationship between the target content block and the connection content block may be directly recorded in the connection characteristic information of the target content block and the connection characteristic information of the connection content block, the connection relationship of one of the target content block and the connection content block is provided with a delete identifier of the other content block, and the delete identifier is recorded in the connection characteristic information corresponding to the connection relationship or other data region. That is, the delete identifier in the connection relationship of one of the target content block and the connection content block marks whether the connected other content block is deleted. When the connection between the target content block and the connection content block is just established, the delete identifier in the connection relationship of one of the target content block and the connection content block is "undeleted". Subsequently, in response to a delete operation for the target content block, content blocks in connection with the target content block are found according to the connection relationship recorded in the connection characteristic information of the target content block, and the delete identifiers set by the found content blocks for the target content block are updated. For example, if it is detected in the subsequent operation that the target content block is deleted by the user, the content blocks in connection with the target content block are determined according to the connection relationship recorded in the connection characteristic information of the target content block, the connection relationship with the target content block is found from the connection relationships recorded in the connection characteristic information of the connected content blocks, and the delete identifier set in the connection relationship is modified to "deleted", thereby ensuring accuracy of the content block connection.

In order to display the content blocks in associated connection with the target content block in the preset region in different modes, the present disclosure provides such a scheme in which: according to the connection type of the triggered connection identifier, namely the active connection identifier or the passive connection identifier, the content blocks associated with the target content block under the connection type are displayed in the preset region of the current page. For example, if the user triggers the active connection identifier, the content blocks to which the target content block connects, namely all content blocks corresponding to the active connection identifier, are displayed in the preset region of the current page. If the user triggers the passive connection identifier, the content blocks connected to the target content block, namely all content blocks corresponding to the passive connection identifier, are displayed in the preset region of the current page. In this way, the content blocks corresponding to the active connection identifier are displayed in different batch from the content blocks corresponding to the passive connection identifier for the target content block.

It should be noted that, in the embodiment, each connection identifier displayed for the target content block has a classification label matching with a content block type associated with the connection identifier. In this case, the classification labels of the connection identifiers displayed at the associated positions of the connection content block and the target content block may be the same or different. For example, in an entire project work flow, the classification label of the connection identifier may include at least one of a target, a task and a report, where the target, task and report form the project flow. The process of displaying the content blocks in associated connection with the target content block in the preset region of the current page includes: selectively displaying the content blocks in associated connection with the target content block in the preset region of the current page, according to a classification label of the triggered reference icon. That is, when the user triggers any connection identifier displayed at the associated position of the target content block, a type of the content block associated with the triggered connection identifier is analyzed first. Then, a classification label of the connection identifier is determined, and it is unnecessary to display all content blocks in associated connection with the target content block in the preset region of the current page. By contrast, content blocks associated with a specific connection identifier belonging to the classification label are displayed, where the specific connection identifier belonging to the classification label is found from the connection identifiers associated with the target content block. For example, if the classification label of the connection identifier triggered by the user is a target type, a specific connection identifier belonging to the target type is found from the connection identifiers displayed for the target content block, and the content blocks associated with the specific connection identifier belonging to the target type are displayed in the preset region.

In step S250, in response to a triggering operation on the content block displayed in the preset region, it is jumped from the current page to a page where the content block is located.

In an embodiment, when the content blocks in associated connection with the target content block are displayed in the preset region of the current page, the user may trigger the displayed content blocks in associated connection with the target content block in the preset region of the current page, to view specific content of the content blocks in detail. In this case, in response to the triggering operation on any content block displayed in the preset region, it may be jumped from the current page directly to a page where the content block is located, thereby implementing quick jumping for the page content connection. As an example, it may be jumped from the current page directly to a position of the content block in the page where the content block is located, thereby quickly displaying the triggered content block.

According to the technical solution of the embodiment of the present disclosure, a page is created by content blocks; in response to a connection operation for a target content block of a current page, a connection content block of the target content block is determined. Then, at an associated position of one of the target content block and the connection content block, a connection identifier of the other of the target content block and the connection content block is displayed. In this way, connection between the target content block and the connection content block is implemented, thereby avoiding a problem that it needs to jump and view a second time since the required reference content cannot be directly viewed when establishing connection between a page and an original page. By means of the connection identifier displayed at the associated position of one content block, the other content block can be directly viewed, without jumping to the original page for viewing, thereby reducing complexity in viewing a part of content of one page in another page. The connection relationship is established between two content blocks by using the connection identifier, thereby ensuring synchronous change of the page content after the connection operation, and thus improving flexibility in page content connection.

Figure 3:
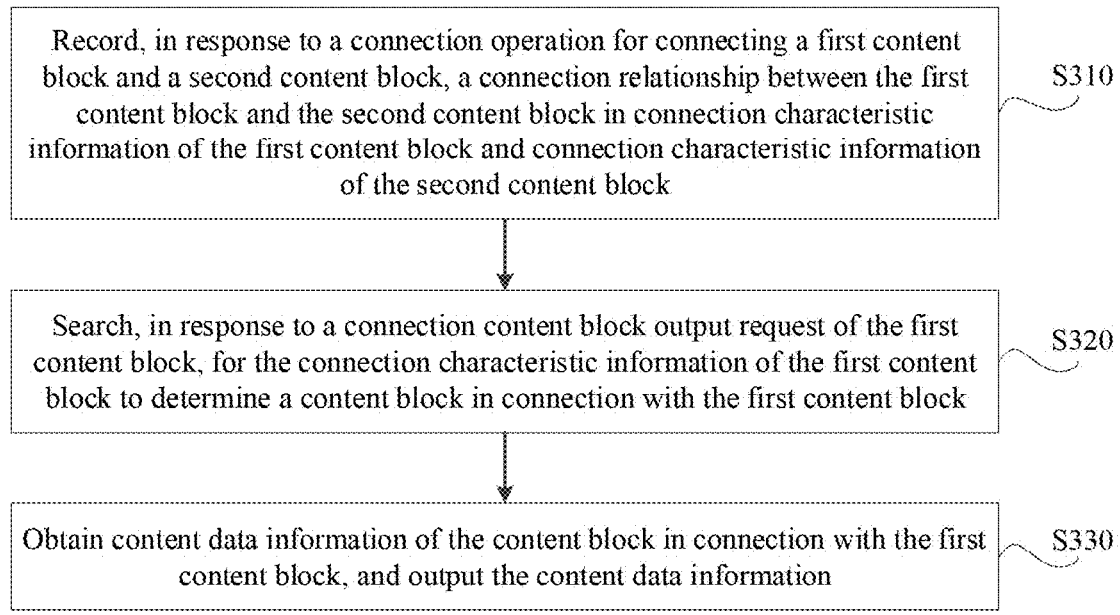
FIG. 3 shows a flowchart of an information processing method according to an embodiment of the present disclosure.

FIG. 3 shows a flowchart of an information processing method according to an embodiment of the present disclosure. The embodiment of the present disclosure is applicable to a case where a content in any page needs to connect to other content for collaboration. The information processing method provided in the embodiment of the present disclosure may be performed by an information processing apparatus according to an embodiment of the present disclosure. The apparatus may be implemented by software and/or hardware, and is integrated in a device performing the method.

As shown in FIG. 3, the information processing method provided in the embodiment of the present disclosure may include the following steps S310 to S330.

In step S310, in response to a connection operation for connecting a first content block and a second content block, a connection relationship between the first content block and the second content block is recorded in connection characteristic information of the first content block and connection characteristic information of the second content block.

In the embodiment, in order to comprehensively describe a certain content block in a page by using existing other content so as to improve readability of the content block, a connection relationship between a certain content block in the page and associated content blocks may be established, to comprehensively explain information of the content block, so that the user can understand the content block easier. Therefore, if the user entering in the current page needs to connect the first content block and the second content block, the user performs a connection operation on the first content block and the second content block. In order to ensure accuracy of the content block connection operation, it needs to detect in real time whether the connection relationship between the first content block and the second content block changes. Therefore, in response to the connection operation for connecting the first content block and the second content block, a connection relationship between the first content block and the second content block is recorded in the connection characteristic information of the first content block and the connection characteristic information of the second content block, and a delete identifier is set corresponding to the connection relationship recorded in the connection characteristic information of any one of the first content block and the second content block to mark whether the other of the first content block and the second content block is deleted in the subsequent operation. In this case, it is unnecessary to delete the connection relationship related to the deleted content block, thereby avoiding complicated data processing operations due to continuously correcting all stored connection data when the connection between different content blocks is deleted by write diffusion, greatly reducing the data processing pressure due to deleting the connection related to the content block after deleting the content block while ensuring the accuracy of the content block connection, and thus reducing an error probability.

It should be noted that, under the connection relationship of one of the first content block and the second content block in the embodiment, a delete identifier of the other of the first content block and the second content block may be set in the connection characteristic information or other data region, to determine whether the other content block is deleted. The validity of the connection relationship is analyzed by determining whether the identifier represents "undeleted" or "deleted", to determine whether the connected content block has cancelled connection.

If the first content block and the second content block are document content, in order to ensure the accuracy of the connection characteristic after the first content block and the second content block are connected, the connection characteristic information of the first content block and the second content block in the document structure is updated in the embodiment, to ensure consistency between the document structure and the content block connection. It should be noted that, the first content block and the second content block in the embodiment may belong to the same document or different documents, which is not limited herein.

In step S320, in response to a connection content block output request of the first content block, the connection characteristic information of the first content block is searched for to determine a content block in connection with the first content block.

In an embodiment, after the connection relationship between the first content block and the second content block is recorded in both the connection characteristic information of the first content block and the connection characteristic information of the second content block, a request for displaying a content block in connection with the first content block may be received. At this time, a connection content block output request of the first content block is received. The output request is generated in response to a triggering operation on the connection identifier displayed at the associated position of the first content block, or in response to a starting operation for a preset mode of displaying the connection content block. Further, in response to the connection content block output request of the first content block, connection characteristic information of the first content block may be searched for. Connection relationships of the content blocks in connection with the first content block are recorded in the connection characteristic information. The content blocks in connection with the first content block can be found based on the connection relationship and then it is determined whether the content blocks in connection with the first content block are deleted, thereby ensuring accuracy of the content block display.

In step S330, content data information of the content block in connection with the first content block is obtained, and the content data information is outputted.

In an embodiment, after the content blocks in connection with the first content block are determined, content data information of each content block may be searched for in the connection characteristic information of the content block or in other data region. The content data information may be a content block indicated by the delete identifier, to determine whether the content block is deleted. In another implementation of the embodiment, the delete identifier set for the content block in connection with the first content block is obtained when the content data information of the content block in connection with the first content block is obtained. It is determined from the delete identifier whether the connected content block is deleted; and content data information of the content block is outputted if the content block in connection with the first content block is not deleted. That is, if the content block in connection with the first content block is deleted, the content data information of the content block is "not to output content", thereby ensuring accuracy of the content block output display.

In a subsequent operation process of the content block, the first content block may be deleted. In this case, in response to a delete operation for the first content block, the content block in connection with the first content block is determined according to the connection characteristic information of the first content block, and the delete identifier set by the content block in connection with the first content block for the first content block is updated. That is, the content block in connection with the first content block is found based on the connection relationship in the connection characteristic information of the first content block, the delete identifier set for the first content block by the content block in connection with the first content block is modified to be "deleted", and the content data information of the first content block is modified to be "not to output content", thereby ensuring display accuracy of the subsequent connection content block.

According to the technical solution of the embodiment of the present disclosure, the page is created by the content block. In response to the connection operation for connecting the first content block and the second content block, the connection relationship between the first content block and the second content block is recorded in the connection characteristic information of the first content block and the connection characteristic information of the second content block. Then, in response to a connection content block output request of the first content block, the connection characteristic information of the first content block is searched for to determine the content block in connection with the first content block, and the content data information of the content block in connection with the first content block is obtained and outputted. In this way, the connection relationship between the target content block and the connection content block is detected accurately and the connection content block is outputted accurately, thereby avoiding complicated data processing operations due to continuously correcting all stored connection data when the connection between different content blocks is deleted by write diffusion, and thus greatly reducing the data processing pressure due to deleting the connection related to the content block after deleting the content block while ensuring the accuracy of the content block connection.

Figure 4:
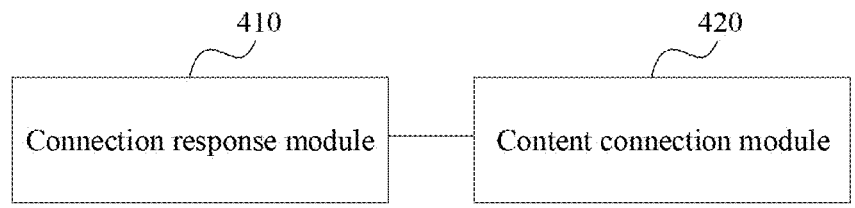
FIG. 4 shows a schematic structural diagram of a page content processing apparatus according to an embodiment of the present disclosure.

FIG. 4 shows a schematic structural diagram of a page content processing apparatus according to an embodiment of the present disclosure. The embodiment of the present disclosure is applicable to a case that a content in any page needs to connect to other content for collaboration. The apparatus may be implemented by software and/or hardware, and is integrated in a device for performing the method. In FIG. 4, the page content processing apparatus in FIG. 4 may include a connection response module 410 and a content connection module 420.

The connection response module 410 is configured to determine, in response to a connection operation for a target content block in a current page, a connection content block of the target content block.

The content connection module 420 is configured to display, at an associated position of one of the target content block and the connection content block, a connection identifier of the other of the target content block and the connection content block, to view the other content block by using the connection identifier.

According to the technical solution provided in the embodiment of the present disclosure, a page is created by content blocks; in response to a connection operation for a target content block of a current page, a connection content block of the target content block is determined. Then, at an associated position of one of the target content block and the connection content block, a connection identifier of the other of the target content block and the connection content block is displayed. In this way, connection between the target content block and the connection content block is implemented, thereby avoiding a problem that it needs to jump and view a second time since the required reference content cannot be directly viewed when establishing connection between a page and an original page. By means of the connection identifier displayed at the associated position of one content block, the other content block can be directly viewed, without jumping to the original page for viewing, thereby reducing complexity in viewing a part of content of another page in one page, and thus improving flexibility in page content processing.

The content connection module 420 is configured to: display, at an associated position of the target content block, an active connection identifier indicating connecting to the connection content block, to view the connection content block in the current page by using the active connection identifier; and display, at an associated position of the connection content block, a passive connection identifier indicating being connected to the target content block, to view the target content block in a page where the connection content block is located by using the passive connection identifier.

The connection response module 410 is configured to: display, in response to the connection operation for the target content block in the current page, a connection search interface; and display at least one content block in the connection search interface, and determine, in response to a selection operation on the at least one content block, a selected content block as the connection content block of the target content block.

A connection identifier displayed at an associated position of one of the target content block and the connection content block includes at least one of: a passive connection identifier indicating the one content block being connected to another content block; and an active connection identifier indicating the one content block connecting to another content block.

The page content connection apparatus may further include a connection display module and a page jumping module. The connection display module is configured to: display, in response to a preset operation, one or more content blocks associated with the target content block in a preset region of the current page. The page jumping module is configured to: jump, in response to a triggering operation on a content block of the one or more content blocks displayed in the preset region, from the current page to a page where the triggered content block is located.

The page jumping module is configured to: jump from the current page to a position of the triggered content block in the page where the triggered content block is located.

The connection display module is configured to: view a connection relationship recorded in connection characteristic information of the target content block, and determine, according to a delete identifier set corresponding to the connection relationship, whether the content block associated with the target content block is deleted; and display, in the preset region of the current page, the content block associated with the target content block that is not deleted.

The delete identifier set corresponding to the connection relationship is recorded in connection characteristic information of the content block indicated by the connection relationship or other data region.

The page content processing apparatus may further include a connection relationship recording module, configured to record a connection relationship between the target content block and the connection content block both in connection characteristic information of the target content block and in connection characteristic information of the connection content block.

The page content processing apparatus may further include a content delete module, configured to: determine, in response to a delete operation on the target content block, a content block in connection with the target content block according to the connection relationship recorded in the connection characteristic information of the target content block, and update a delete identifier set by the determined content block for the target content block.

The preset region includes a sidebar, a lower half display region or an upper half display region of the current page; the content blocks to which the target content block actively connects and passively connects are displayed in different sub-regions of the preset region, and a content block indicated by a connection identifier specified by the preset operation is highlighted.

Each connection identifier displayed at an associated position of the target content block has a classification label associated with the connection identifier. The connection display module is configured to: selectively display, in the preset region of the current page, the content blocks associated with the target content block according to a classification label of a triggered connection identifier.

The current page includes a document.

The page content processing apparatus may further include a content creating module, configured to create the target content block in the current page, and configure a connection control for the target content block, to perform the connection operation by using the connection control.

The connection content block is a content block in the current page other than the target content block, or is a content block in a page other than the current page.

The connection content block and the target content block have the same or different types of content; classification labels of the connection identifiers displayed at associated positions of the connection content block and the target content block are the same or different.

Further, the content block includes at least one of: a content block of a text type, a content block of a multimedia type, a content block of a table type and a content block of a program type. The classification label includes at least one of: a target, a task and a report.

The page content processing apparatus provided in this embodiment of the present disclosure share the same concept as the page content processing method provided in the above embodiment. For the technical details not described in detail in this embodiment, one may refer to the above embodiments. This embodiment and the above embodiments have the same beneficial effects.

Figure 5:
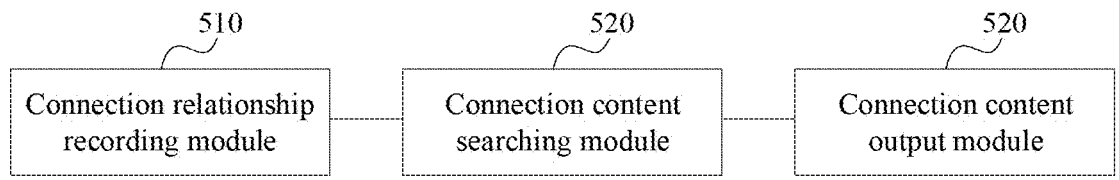
FIG. 5 shows a schematic structural diagram of an information processing apparatus according to an embodiment of the present disclosure.

FIG. 5 shows a schematic structural diagram of an information processing apparatus according to an embodiment of the present disclosure. The embodiment of the present disclosure is applicable to a case where a content in any page needs to connect to other content for collaboration. The apparatus may be implemented by software and/or hardware, and is integrated in a device for performing the method. In FIG. 5, the page content processing apparatus may include a connection relationship recording module 510, and a connection content searching module 520 and a connection content output module 530.

The connection relationship recording module 510 is configured to: record, in response to a connection operation for connecting a first content block and a second content block, a connection relationship between the first content block and the second content block in connection characteristic information of the first content block and connection characteristic information of the second content block.

The connection content searching module 520 is configured to: search, in response to a connection content block output request of the first content block, for the connection characteristic information of the first content block to determine a content block in connection with the first content block.

The connection content output module 530 is configured to: obtain content data information of the content block in connection with the first content block, and output the content data information.

According to the technical solution of the embodiment of the present disclosure, the page is created by the content block. In response to the connection operation for connecting the first content block and the second content block, the connection relationship between the first content block and the second content block is recorded in the connection characteristic information of the first content block and the connection characteristic information of the second content block. Then, in response to a connection content block output request of the first content block, the connection characteristic information of the first content block is searched for to determine the content block in connection with the first content block, and the content data information of the content block in connection with the first content block is obtained and outputted. In this way, the connection relationship between the target content block and the connection content block is detected accurately and the connection content block is outputted accurately, thereby avoiding complicated data processing operations due to continuously correcting all stored connection data when the connection between different content blocks is deleted by write diffusion, and thus greatly reducing the data processing pressure due to deleting the connection related to the content block after deleting the content block while ensuring the accuracy of the content block connection.

The information processing apparatus may further include a content block delete module, configured to: determine, in response to a delete operation for the first content block, a content block in connection with the first content block according to the connection characteristic information of the first content block, and update a delete identifier set for the first content block by the content block in connection with the first content block.

The information processing apparatus may further include a document structure updating module, configured to: update the connection characteristic information of the first content block and the second content block in a document structure.

The first content block and the second content block belong to a same document or different documents.

The page content processing apparatus provided in this embodiment of the present disclosure share the same concept as the page content processing method provided in the above embodiment. For the technical details not described in detail in this embodiment, one may refer to the above embodiments. This embodiment and the above embodiments have the same beneficial effects.

The embodiment of the present disclosure is applicable to process on-line documents, and may be performed by a document synchronization apparatus. The apparatus may be implemented by hardware and/or software. The apparatus may be configured in an electronic device having storage and calculation capability. For example, the apparatus is integrated in a server. The server processes the on-line documents, to response to the edits on the on-line documents performed by users through client devices. The apparatus is applicable to a scenario in which the server provides on-line document editing and viewing services for multiple client devices, and practical content and a tree structure of the document are stored in the server.

In order to clearly introduce the technical solution of the embodiment of the present disclosure, a tree structure of a document used in the embodiment of the present disclosure is introduced first. A document, such as a page, may include various forms of document content, for example texts, pictures, tables, links, or multimedia contents. The practical content belongs to the document. For convenience of being referred at multiple positions, some practical content is implemented as a content block, so that the content block can be referred by other document or content block conveniently. The content block is independent data having collaboration capability and recording capability. A reference relationship refers to that a source content block in a source document is referenced by a destination document or a destination content block. Content of the source content block may be copied into the destination document or the destination content block, and an optional mark may be set to display the reference relationship for the user. The definition of content block may be preset by online document software, or may be customized by users. For example, content blocks can be distinguished by content types, such as texts, pictures, tables and the like. The content blocks may alternatively be distinguished based on preset separators, such as a "carriage return", "paragraph separator", and "section break" and so on. Alternatively, the separation boundary of content blocks may be set by user operations.

Figure 6:
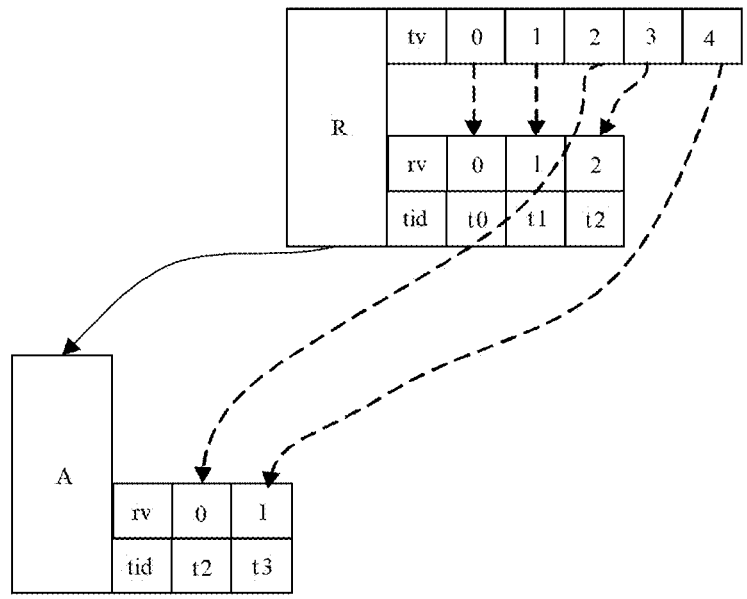
FIG. 6 is a schematic diagram of a tree structure of a document according to an embodiment of the present disclosure.

Each document has a tree structure, and the server manages the document by the tree structure or equivalent thereof. The tree structures of multiple documents may be combined together by an association relationship such as a reference relationship. FIG. 6 is a schematic diagram of a tree structure of a document according to an embodiment of the present disclosure. FIG. 6 briefly shows a tree structure of a document. The document includes two content blocks, one is a root content block, and the other is called other content block, which is a non-root node. The root content block includes basic content generated when the document is created. One document may have only one root content block. Other content block refers to a non-root content block belonging to the document. The non-root content block may be generated, together with the root content block, based on a template when the document is created, or may be subsequently added by the user after the document is created. As shown in FIG. 6, the tree structure includes two types of nodes, that is, a document node and a content block node. A document node (node R) corresponds to a document, and also corresponds to a root content block of the document. A content block node (node A) corresponds to a content block A.

In the tree structure, a parent-child relationship between the document node and the content block node represents affiliation between the document and the content block. That is, a parent node of the node A is the node R, a child node of the node R is the node A, and a parent-child relationship exists between the node A and the node R.

A document version identifier sequence is recorded in the document node, and a content block version identifier sequence is recorded in the content block node. A document version identifier is used to represent update of each content block belonging to the document. As shown in FIG. 6, the node A includes a content block version identifier sequence, that is, an RV sequence. The content block version identifier is also referred to as record version (RV) and is used for recording various versions of the content block as the content changes. The content blocks belonging to the document include a root content block. A content block version identifier sequence of the root content block is also recorded in the document node. If the node R includes a root content block, the node R includes an RV sequence. Practically, if the document node includes no root content block and the basic content block serves as a content block child node, the document node may not include the RV sequence. As shown in FIG. 6, a document version identifier sequence, that is, a TV sequence, is recorded in the document node. TV is used to represent update of the content blocks belonging to the document. For example, a newly added RV of each content block node may lead to a newly added TV.

An edition operation identifier (transaction ID, TID) is further recorded in the tree structure. The edition operation represents a transaction operation, and the transaction operation may lead to content change of the content block or other change of the tree structure. As shown in FIG. 6, an edition operation identifier sequence is recorded in the document node and the content block node, and the edition operation identifier is used to represent an edition operation for updating the content block. TV may be in one-to-one correspondence with RV of each node. Alternatively, when one edition operation leads to change of RVs of multiple content blocks, one TV may record multiple RVs corresponding to one TID.

In the tree structure, a table of a tree structure snapshot may be recorded. That is, for each TV, newest RVs of all content blocks of the document in the TV state are recorded. The tree structure snapshot may record newly added RVs corresponding to the TV. The snapshot may be recorded in the form of a table, and the form of the snapshot is not limited in the embodiment of the present disclosure.

In addition to the relationship between the content block and the document as well as version change, nodes of the tree structure record practical content of the content block. Each content block node may record practical content change of the content block for each RV relative to a previous RV.

Figure 7:
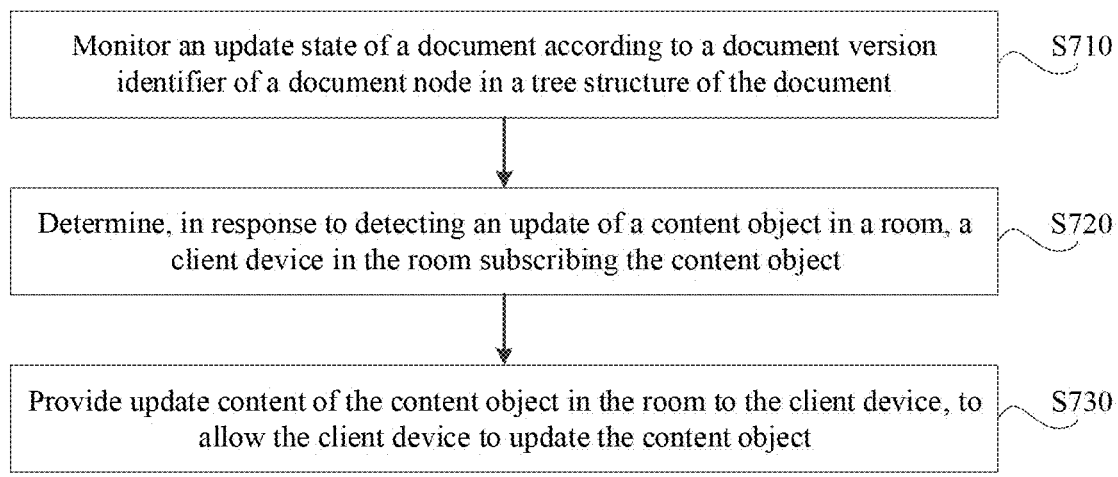
FIG. 7 is a flowchart of a document synchronization method according to an embodiment of the present disclosure.

FIG. 7 is a flowchart of a document synchronization method according to an embodiment of the present disclosure. The method may be performed by a document synchronization apparatus arranged in an electronic device. The electronic device may be a terminal device, preferably a server. Preferably, the server stores content and tree-structure of each document, and provides update service for the client device, for the case of on-line document collaboration processing. As shown in FIG. 7, the method according to this embodiment includes steps S710 to S730 as follows.

In step S710, an update state of a document is monitored according to a document version identifier of a document node in a tree structure of the document.

The document includes at least one content block, the tree structure includes a document node and a content block node, and a parent-child relationship between the document node and the content block node represent affiliation between the document and the content block. A document version identifier sequence is recorded in the document node, and a document version identifier is used to represent update of each content block belonging to the document. It should be noted that, the document version identifier sequence is consisted of document version identifiers of the document node. When one content block of the document is updated, that is, content of the document is updated for one time, a new content block version identifier is added in the content block version identifier sequence of the content block node, and a new document version identifier is added in the document version identifier sequence of the document node.

An update of each content block indicates that practical content of each content block changes. As an example, adding, deleting or modifying the practical content of the content block may be referred to update of the content block. It should be noted that, when the practical content of the content block in the document is updated, the document version identifier in the document node of the document is also updated. It should be understood that, each time the content block is updated, the corresponding document version identifier is updated for one time, that is, adding a new document version identifier in the document version identifier sequence of the document node.

In the embodiment, the process of monitoring an update state of the document by the server according to the document version identifier of the document node may include: monitoring a document version identifier sequence of the document node in a tree structure, and determining that the document is updated when a new document version identifier is generated.

In practice, the server monitors the document version identifier sequence of the document node in the tree structure in real time or periodically, to determine whether a new document version identifier is added in the document version identifier sequence. When the new document version identifier is generated in the document version identifier sequence, a content block version identifier is determined according to the document version identifier. The update content block is determined according to the content block version identifier, and practical content of the update content block is analyzed to determine the update content block of the content block. The content block version identifier is used to represent update information of the content block, such as number of updates, i.e., the number of content block version identifiers included in the content block version identifier sequence, which is the same as the number of updates of the content block. It should be understood that, the monitoring the update state of the document refers to monitoring the practical content of each content block in the document. The document is updated when practical content of one content block is updated.

In step S720, in response to detecting an update of a content object in a room, a client device subscribing the content object in the room is determined.

The content object includes a document. It should be noted that, the client device may send a request to the server as desired, to join in a room including one or more content objects, that is, subscribing update of the monitored content object(s) in the room. Each room may include one or more content objects, which is not limited herein. In practice, once detecting an update of a certain content object in the room, the server determines all client devices subscribing the content object in the room.

It should be noted that, the document version identifier is used to record update content of the document. The update content of a reference document or a reference content block in the document may be recorded or not recoded. If the document version identifier does to not record the update content of the reference document and the reference content block, the document version identifier of the document is not updated when practical content of the reference document or the reference content block in the document is updated. In other words, the document version identifier of the document, and respective content block version identifiers of respective reference content blocks in the document are required to be subscribed separately for subscribing the content object. Content block nodes having affiliation with the document node are located in the document. The content block being referred in the document is recorded by a dedicated reference node, rather than by affiliation or the parent-child relationship in the tree structure. The reference node serves as a child node of the reference document, and serves as a parent node of a node of a source document or a source content block being referred.

In step S730, update content of the content object in the room is provided to the client device, to allow the client device to update the content object.

It should be noted that, when the server determines all client devices in the room subscribing the content object, the server may push the update content of the content object to the client device, to allow the client device to update the content object. Practically, the client device may pull the update content of the content object in the room from the server, to update the content object cached locally. It should be noted that, when a size of the update content pushed to the client device by the server reaches a preset value, a pulling request may be sent to the server by the client device, so that the client device actively pulls the update content from the server, and updates the content object cached locally.

According to the technical solution of the embodiment, the update state of the document is monitored uniformly according to the document version identifier of the document node. Once detecting update of the content object in the room, the update content of the content object in the room is uniformly provided to all client devices in the room subscribing the content object, so that the client devices update the content object. Compared with the technical solution in which multiple content blocks of the document are monitored separately according to the content block version identifiers, the on-line documents are updated synchronously while a monitoring pressure of the server is reduced according to the embodiment of the present disclosure. The update state of the document is monitored according to the document version identifier, and the update content is provided to the client device subscribing the content object when the content object in the room is updated, thereby adding a function of protection order and implementing deduplication and loss prevention based on version mechanism, as compared with the conventional subscribing mechanism.

Figure 8:
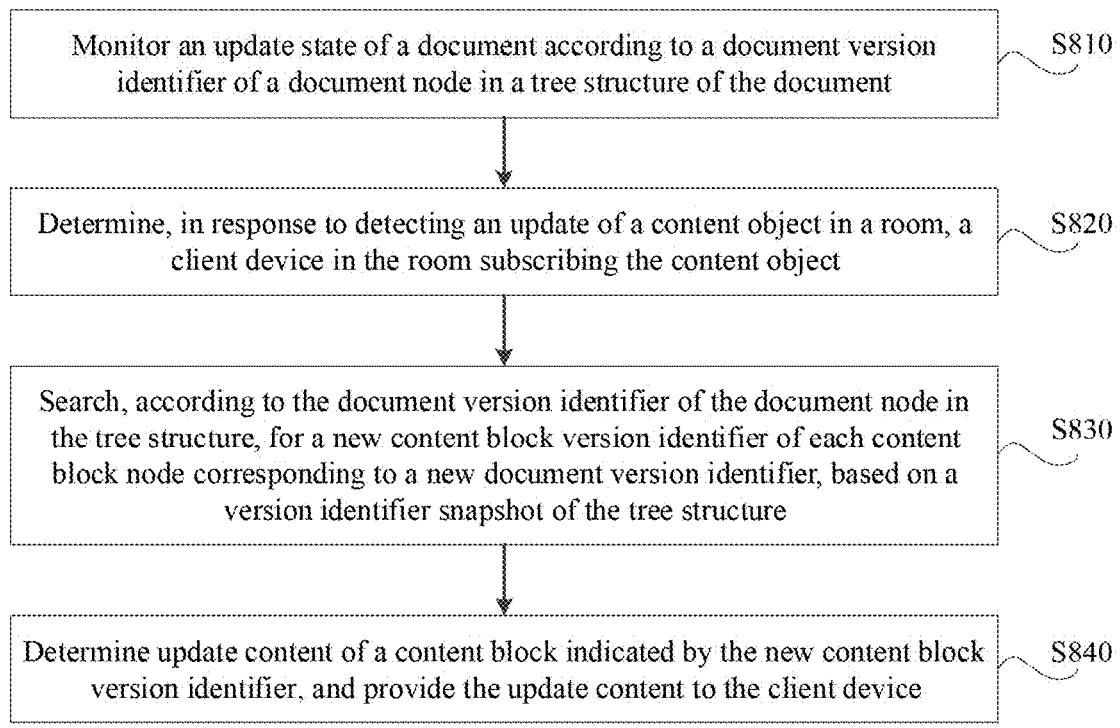
FIG. 8 is a flowchart of another document synchronization method according to an embodiment of the present disclosure.

FIG. 8 is a flowchart of another document synchronization method according to an embodiment of the present disclosure. In this embodiment, the document synchronization method is further defined based on the above embodiments. In this embodiment, the document synchronization process is illustrated by assuming that a content block version identifier sequence is recorded in the content block node and the content object includes a content block. As shown in FIG. 8, the document synchronization method in this embodiment includes steps S810 to S840.

In step S810, the update status of the document is monitored according to the document version identifier of the document node in the tree structure of the document.

The document includes at least one content block, the tree structure includes a document node and a content block node. The parent-child relationship between the document node and the content block node represents affiliation between the document and the content block. A document version identifier sequence is recorded in the document node, and a document version identifier is used to represent update of the content block belonging to the document.

In step S820, in response to detecting an update of the content object in the room, a client device subscribing the content client device in the room is determined.

The content object includes a document.

In step S830, according to the document version identifier of the document node in the tree structure, a newly added content block version identifier of each content block node corresponding to the newly added document version identifier is searched for based on a version identifier snapshot of the tree structure.

The version identifier snapshot refers to a correspondence established between a current newest document version identifier in the document version identifier sequence of the document node and a current newest content block version identifier of a content block node corresponding to each content block included in the document. As an example, it is assumed that a document corresponding to the document node 1 includes three content blocks, that is, a content block B1, a content block B2 and a content block B3. The document version identifier sequence of the document node 1 includes eight document version identifiers, which are respectively 0, 1, 2, 3, 4, 5, 6 and 7 (that is, the document version identifier 7 indicates the newest document version identifier). The content block version identifier sequence of the content block node corresponding to the content block B1 includes two content block version identifiers, 0 and 1 (that is, the newest content block version identifier of the content block B1 is 1). The content block version identifier sequence of the content block node corresponding to the content block B2 includes three content block version identifiers, 0, 1 and 2 (that is, the newest content block version identifier of the content block B2 is 2). The content block version identifier sequence of the content block node corresponding to the content block B3 includes four content block version identifiers, 0, 1, 2 and 3 (that is, the newest content block version identifier of the content block B3 is 3). The document version identifier 7 of the document node 1 respectively establishes correspondence with the newest content block version identifier 1 of the content block B1, the newest content block version identifier 2 of the content block B2, the newest content block version identifier 3 of the content block B3, and the correspondence serves as the version identifier snapshot.

It should be noted that, a parent-child relationship is established between the document node and the content block node of the content block included in the document corresponding to the document node, and the content block version identifier of each content block node establishes a correspondence with the document version identifier. It should be understood that, according to the document version identifier of the document node and the pre-created version identifier snapshot of the tree structure, the content block version identifier of each content block node corresponding to the document version identifier can be quickly found. The newly added document version identifier refers to a newest document version identifier in the document version identifier sequence of the document node. The newly added content block version identifier of each content block node refers to a newest content block version identifier in the content block version identifier sequence of each content block node.

It should be understood that, when one content block of the document is updated, the content block version identifier of the content block node corresponding to the content block is updated, and accordingly, the document version identifier of the document node corresponding to the document where the content block is located is also updated. In this case, a correspondence is established between the newly added document version identifier and the newly added content block version identifier, and is stored in the version identifier snapshot. It should be noted that, the version identifier snapshot may be a table for storing a mapping relationship between the document version identifier of the document node and the content block version identifier of the content block node, or may be of other forms, which are not limited herein.

In step S840, update content of the content block is determined according to the newly added content block version identifier, and the update content is provided to the client device, to allow the client device to update the content object.

In the embodiment, a newly added content block version identifier is generated in the content block version identifier sequence of the content block node, and an edition operation identifier is searched for according to the newly added content block version identifier, to determine an edition operation according to the edition operation identifier, and in turn determine update content of the content block. After obtaining the update content of the content block, the server pushes the update content to the client device, to allow the client device to update the content object. Practically, when a size of the update content reaches a certain threshold, the server may notify the client device of a message that the client device may pull the update content of the content block from the server, to update the content block cached in the client device locally.

In an embodiment, the content block version identifier sequence is recorded in the content block node. The document synchronization method further includes: adding a new document version identifier in the document version identifier sequence of the document node, when a new content block version identifier is added for any content block node belonging to the document node.

In an embodiment, one document may include one or more content blocks. In practice, one document generally includes multiple content blocks, and accordingly one document node corresponds to multiple content block nodes. When practical content of one content block node corresponding to the document node is changed, a new content block version identifier is added in the content block version identifier sequence of the content block node, and a new document version identifier is added in the document version identifier sequence of the document node corresponding to the content block node. The corresponding content block version identifier may be found based on the document version identifier, and the update content of the content block is found in turn.

In an embodiment, the content object may include a content block. The document synchronization method further includes: monitoring the update state of the content block according to the content block version identifier of the content block node in the tree structure.

The content block version identifier sequence is recorded in the content block node, and the content block version identifier is used to represent content update of the content block. In an embodiment, the content block version identifier is used to record the number of updates of the content block. That is, once content of the content block is updated, a new content block version identifier is added in the content block version identifier sequence. The content block version identifier sequence of each content block node is monitored, to determine whether a new content block version identifier is added in the content block version identifier sequence. If a new content block version identifier is added in one content block version identifier sequence, it is determined that practical content of the content block is updated. In practice, the content block version identifier sequence of each content block may be monitored in real time or periodically.

Figure 9:
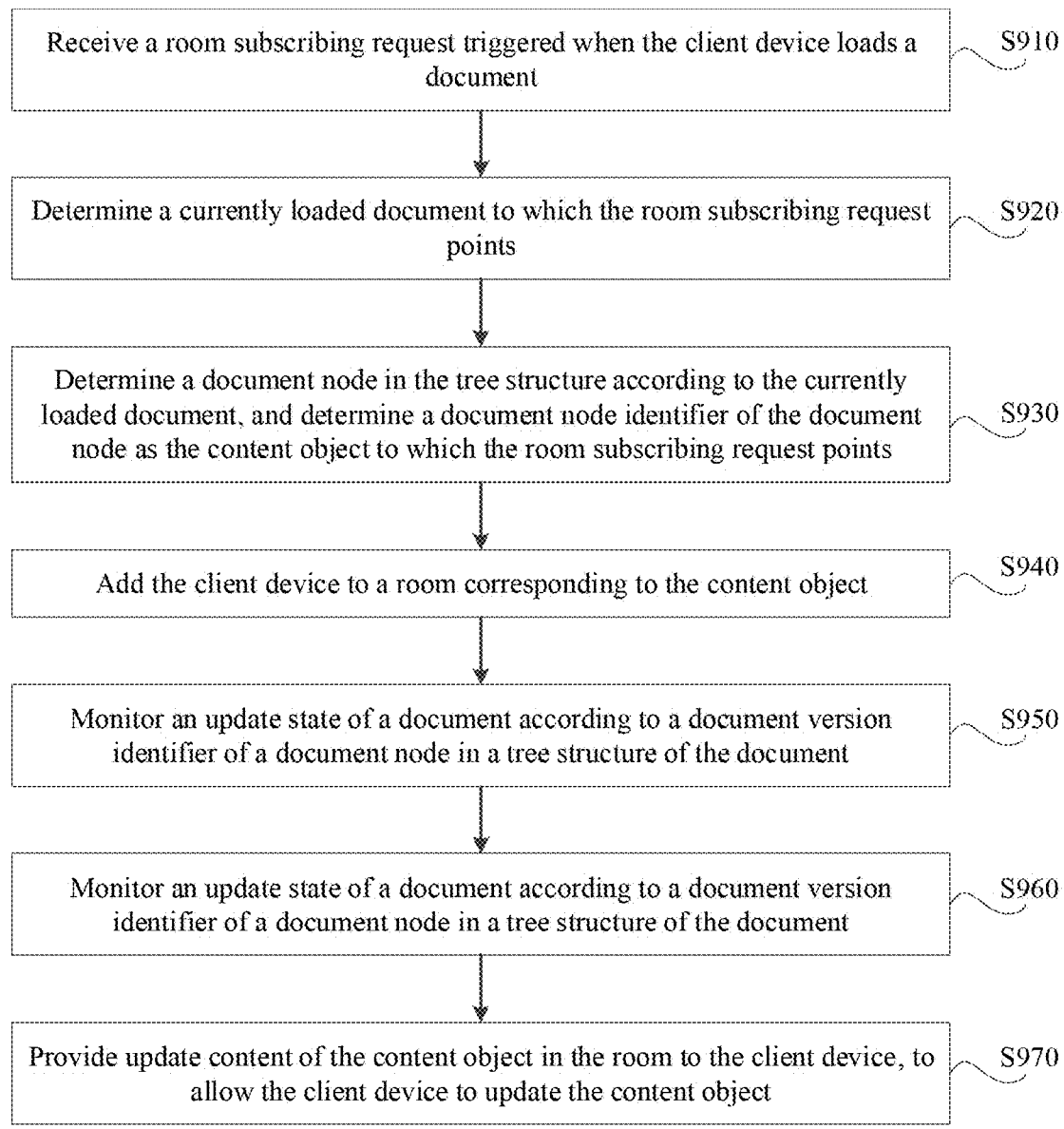
FIG. 9 is a flowchart of another document synchronization method according to an embodiment of the present disclosure.

FIG. 9 is a flowchart of a document synchronization method according to an embodiment of the present disclosure. In this embodiment, the document synchronization method is further illustrated based on the above embodiments. As an example, steps S910 to S940 are performed before S950 for illustrating the document synchronization process, which is not limited herein. As shown in FIG. 9, the document synchronization method in the embodiment includes steps S910 to S970 as follows.

In step S910, a room subscribing request triggered when a client device loads a document is received.

The room subscribing request refers to a request, sent from the client device to a server, for subscribing a content object in the room. In the embodiment, the content object includes at least one of: a document and a content block. When the client device loads the document, the client device automatically triggers a room subscribing request, and sends the room subscribing request to the server. The process of loading a document by the client device refers to opening the document by the client device. It should be understood that, when the client device loads the document, the client device automatically performs room joining subscribing on content of the document, which may be regarded that, when the user starts to view a certain document, the user joins the room. Accordingly, when the user closes the document, the user quits subscribing of the room.

In step S920, a currently loaded document pointed by the room subscribing request is determined.

It should be noted that, the room subscribing request sent from the client device to the server carries identifier information of the loaded document. The room subscribing request is analyzed after the server receives the room subscribing request sent by the client device, to obtain the corresponding identifier information. Then, the currently loaded document pointed by the room subscribing request is determined according to the identifier information.

In step S930, a document node corresponding to the currently loaded document is determined in the tree structure, and a document node identifier of the document node is determined as a content object pointed by the room subscribing request.

It should be noted that, the document node identifier refers to identifier information of the document node for distinguishing among different document nodes. It should be understood that, the document node identifier is a unique identifier of each document node. That is, different document nodes have different document node identifiers. In the embodiment, each document corresponds to one document node in the tree structure, and each document node is provided with a document node identifier. Accordingly, the currently loaded document corresponds to one document node in the tree structure, that is, the corresponding document node in the tree structure can be determined according to the currently loaded document. Then, the document node identifier of the document node serves as the content object pointed by the room subscribing request.

In step S940, the client device is added to the room corresponding to the content object.

In some embodiments, each room may include multiple content objects, and each content object may include a document and/or a content block. In another embodiment, each room corresponds to one content object, to conveniently update and manage the content object. Each document corresponds to one document node identifier. In the embodiment, after the document node corresponding to the currently loaded document is determined, the document node identifier of the document node is searched for, and the client device is added to a room corresponding to the document node identifier.

In step S950, the update state of the document is monitored according to the document version identifier of the document node in the tree structure of the document.

The document includes at least one content block, the tree structure includes a document node and a content block node, and the parent-child relationship between the document node and the content block node represents affiliation between the document and the content block. The document version identifier sequence is recorded in the document node, and the document version identifier is used to represent update of the content block of the document.

In step S960, in response to detecting an update of the content object in the room, the client device subscribing the content object in the room is determined.

The content object includes a document.

In step S970, update content of the content object in the room is provided to the client device, to allow the client device to update the content object.

In an embodiment, after the document node in tree structure is determined according to the currently loaded document, the method further includes: determining a content block node of a reference content block having a reference relationship with the document node; and determining a content block node identifier having the reference relationship as the content object pointed by the room subscribing request.

In practice, each document generally includes multiple content blocks. Accordingly, a document node corresponding to each document may correspond to multiple content block nodes. The content block node of the reference content block having the reference relationship with the document node refers to a content block node corresponding to a content block currently referred by the document node. In the embodiment, after the document node of the currently loaded document is determined in the tree structure, a content block referred by each document node is searched for and determined as a reference content block, and a content block node of the reference content block is obtained from the tree structure. A content block node identifier of the content block node serves as the content object pointed by the room subscribing request.

As an example, if the client device 1 loads (opens) a document A and the document A makes reference to a content block C of a document B, a content object pointed by a room subscribing request sent by the client device 1 includes a document node identifier of the document A and a content block node identifier of the content block C.

In an embodiment, after the document node in the tree structure is determined according to the currently loaded document, the method further includes: determining a content block node of a reverse link content block having a reverse reference relationship with the document node; and determining a content block node identifier having the reverse reference relationship as the content object pointed by the room subscribing request.

In an embodiment, the content block node of the reverse link content block having the reverse reference relationship with the document node refers to a content block node corresponding to a content block which makes reference to the currently loaded document, that is, other content block node makes reference to the currently loaded document. In practice, the currently loaded document may serve as the referenced document, that is, other document or a content block of other document makes reference to the currently loaded document. When content of the currently loaded document is updated, an association is established between the currently loaded document and an associated document, to synchronously update a document or content block associated with the currently loaded document. The content block referring to the currently loaded document is referred to as a reverse link content block having the reverse reference relationship. As an example, it is assumed that the document A is referred by the content block D, preview information of the content block D is displayed in a reverse link region of the document A.

Accordingly, after the document node of the currently loaded document in the tree structure is determined, the content block node of the content block referred by the document node (that is, the content block node of the reference content block having the reference relationship) is determined, and the content block node referring to the document node (that is, the content block node of the reverse link content block having the reverse reference relationship) is determined. The content block node identifier having the reference relationship and the content block node identifier having the reverse reference relationship each serve as the content object pointed by the room subscribing request.

In an embodiment, the process of pushing the update content to the client device subscribing the content object is illustrated by the room update operation. It should be understood that, the server provides room service to the client device, so that the client device subscribing the document and the content block in the room receives the update content, and thus the client device updates synchronously the document and the content block cached locally.

First, an interested client device joins a room of a certain document or content block, regarded as subscribing update of the content block and the document.

When the client device loads the document (that is, the user opens the document), the client device automatically joins the room. That is, a user operating the on-line document is an object at which room pushing aims. When the user starts to view a certain document, the user joins the room. When the user closes the document, the user quits subscribing of the room.

The server may automatically add all documents and content blocks to a corresponding room. Practically, a developer may select to add only the document version identifier to the room.

The user may join the room according to the document version identifier and the content block version identifier, so that subscribing logic changes. Practically, the document version identifier and the content block version identifier are subscribed as the content object.

Then, the server detects update operations of the content object in each room.

Each room may correspond to one content block or one document.

If the room corresponds to one content block, update content corresponding to a new content block version identifier is pushed to the client device in the room when the new content block version identifier is generated.

If the room corresponds to one document, update content corresponding to a new document version identifier is pushed to the client device in the room when the new document version identifier is generated.

The server can perform deduplication when the content block and the document are simultaneously subscribed, thereby avoiding sending the update content to the client device repeatedly.

Figure 10:
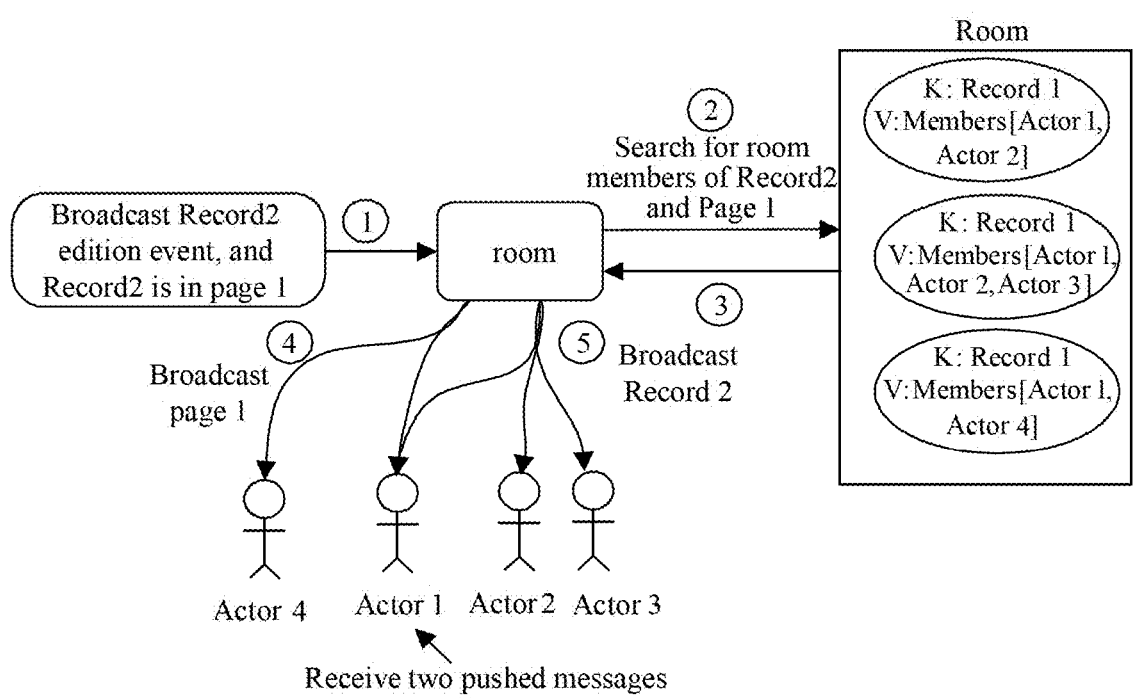
FIG. 10 is a schematic flowchart of implementing document synchronization by room updating according to an embodiment of the present disclosure.

FIG. 10 is a schematic flowchart of implementing document synchronization by room update according to an embodiment of the present disclosure. As shows in FIG. 10, the room includes three content objects: a content object 1 (indicated by Record 1), a content block 2 (indicated by Record 2) and a document 1 (Page 1). Two client devices (Actor 1 and Actor 2) subscribe the content block 1, three client devices (Actor 1, Actor 2 and Actor 3) subscribe the content block 2, and two client devices (Actor 1 and Actor 4) subscribe the document 1. The content block 2 belongs to the document 1. When an edition event is performed on the content block 2, a room at the server receives information that the edition event is performed on the content block 2, the server searches the room for room members of the content block 2 and a document 1 including the content block 2, and determines the client devices (including Actor1, Actor2, Actor3 and Actor4) subscribing the content block 2 in the room. The server provides update content of the content block 2 in the room to the client devices (Actor1, Actor2, Actor3 and Actor4), so that the four client devices update the content object.

It should be noted that, since the client device Actor 1 subscribes both the content block 2 and the document 1 including the content block 2, the server pushes the update content to the client device Actor1 twice. Practically, in practice, deduplication may be performed, to avoid repeated pushing.

Figure 11:
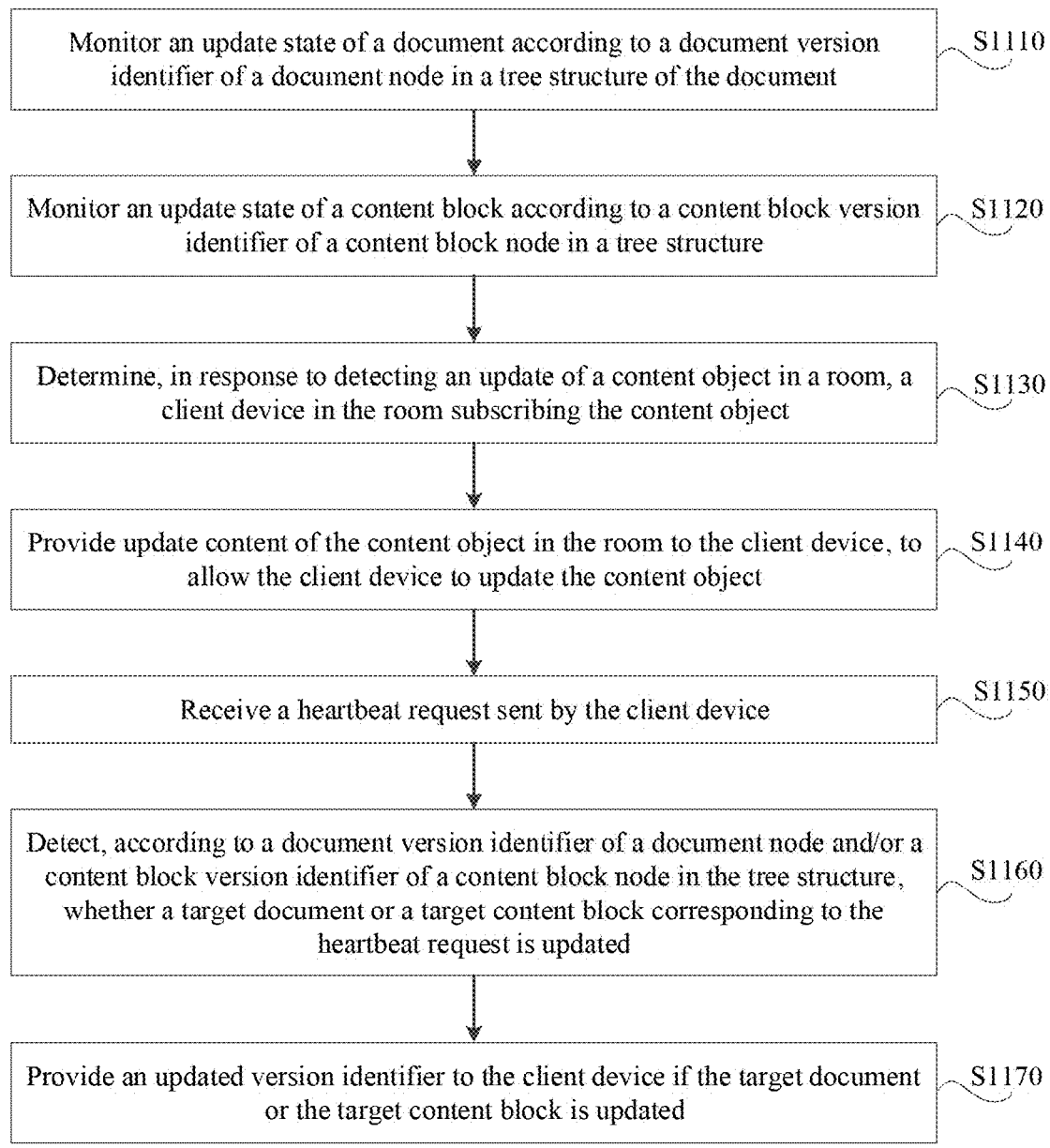
FIG. 11 is a flowchart of another document synchronization method according to an embodiment of the present disclosure.

FIG. 11 is a flowchart of a document synchronization method according to an embodiment of the present disclosure. In this embodiment, the content object includes a content block, and a document is updated synchronously by using a heartbeat request. In this embodiment, step S1120 is performed between step S1110 and step S1130 for illustrating the document synchronization process. The performing order is not limited herein, as long as step S1120 is performed before step S1150. As shown in FIG. 6, the document synchronization method in this embodiment includes steps S1110 to S1170 as follows.

In step S1110, an update state of a document is monitored, according to a document version identifier of a document node in a tree structure of the document.

The document includes at least one content block, the tree structure includes a document node and a content block node, a patent-child relationship between the document node and the content block node represents affiliation between the document and the content block. A document version identifier sequence is recorded in the document node, and the document version identifier is used to represent update of the content block of the document.

In step S1120, an update state of the content block is monitored according to a content block version identifier of a content block node in the tree structure.

A content block version identifier sequence is recorded in the content block node, and the content block version identifier is used to represent update of content of the content block.

In step S1130, in response to detecting an update of the content object in the room, a client device subscribing the content object in the room is determined.

The content object includes a document.

In step S1140, update content of the content object in the room is provided to the client device, to allow the client device to update the content object.

In step S1150, a heartbeat request sent by the client device is received.

The heartbeat request refers to a detection message sent to the server by the client device, requesting to detect a newest version. In practice, the client device may send the heartbeat request to the server in real time or periodically.

In step S1160, according to the document version identifier of the document node and/or the content block version identifier of the content block node in the tree structure, it is detected whether a target document or a target content block corresponding to the heartbeat request is updated.

In the embodiment, after receiving the heartbeat request sent by the client device, the server detects whether a version of the content object pointed by the heartbeat request is updated. The content object includes a document and/or a content block. It should be understood that, according to the document version identifier of the document node of the currently loaded document and/or the content block version identifier of the content block node in the tree structure, it is detected whether a target document or a target content block corresponding to the heartbeat request is updated. The heartbeat mechanism is similar to the room subscribing mechanism, and is an update mechanism actively initiated by the client device. When the client device loads the document, the client device monitors TV of the document and RV of a reference content block of the document, and aggregates the heartbeat requests for the TV and the RV of the reference content block together for sending to the server.

In step S1170, if the target document or the target content block is updated, an updated version identifier is provided to the client device.

In an embodiment, the heartbeat request of monitoring the TV may carry a newest version of TV. The server detects whether the newest version of TV of the target document corresponding to the heartbeat request is consistent with a newest document version identifier of the currently loaded document in the tree structure, that is, detecting whether the document is updated. If a detection result is consistent, a newest state message of the document is fed back. If the detection result is inconsistent, a new version TV to be updated by the client device and the updated RV are fed back to the client device, so that the client device pulls incremental update content. The heartbeat request of monitoring the reference content block RV carries an identifier of the reference content block, and may carry a newest version of RV or not. In a case that the heartbeat request does not carry the newest version of RV, the server directly feeds back the newest version of RV to the client device according to the content block version identifier sequence of the content block node of the currently loaded document in the tree structure, so that the client device detects whether the target content block is updated. When the client device detects that the newest version of RV is consistent with the newest version of RV cached locally, no update is performed; otherwise, the incremental update content of the reference content block is pulled from the server according to the newest version of RV.

According to the technical solution of the embodiment, the number of heartbeat requests sent to the server by the client device is reduced by monitoring the document version identifier, thereby solving the technical problem of reading diffusion of the server.

Figure 12:
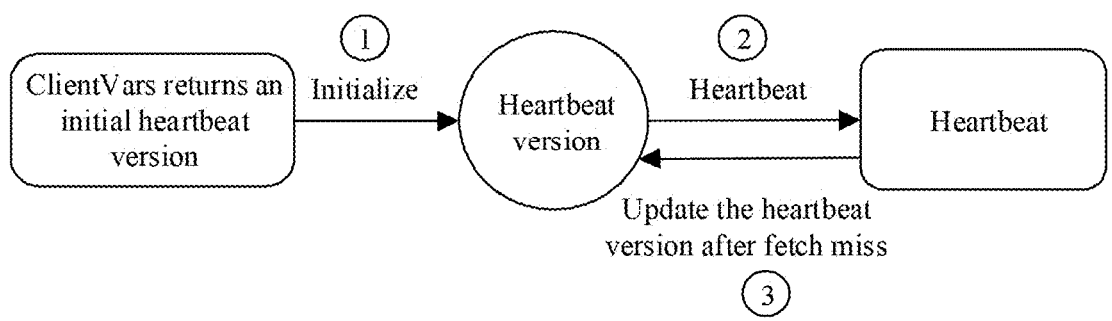
FIG. 12 is schematic flowchart of implementing document synchronization by using heartbeat according to an embodiment of the present disclosure.

FIG. 12 is a schematic flowchart of document synchronization implemented by heartbeat according to an embodiment of the present disclosure. As shown in FIG. 12, a heartbeat version of the document currently loaded by the client device is transferred via a parameter (indicated as ClientVars). After the server returns the heartbeat version, if a newest content block version identifier of a changed content block and a newest heartbeat version occur in the currently loaded document, the client device determines whether the newest content block version identifier and the newest heartbeat version returned by the server is consistent with those cached locally. If the result is negative, the client device requests (fetch miss) the newest content block version identifier and the newest heartbeat version from the server, so that the client device updates the newest heartbeat version cached locally.

The heartbeat includes two types. One type is a heartbeat version of the content block, that is, when a new content block version identifier is generated for the content block, the server pushes the update to the client device. The other type is a heartbeat version of the document.

The heartbeat version of the document can be updated only by the heartbeat request.

Figure 13:
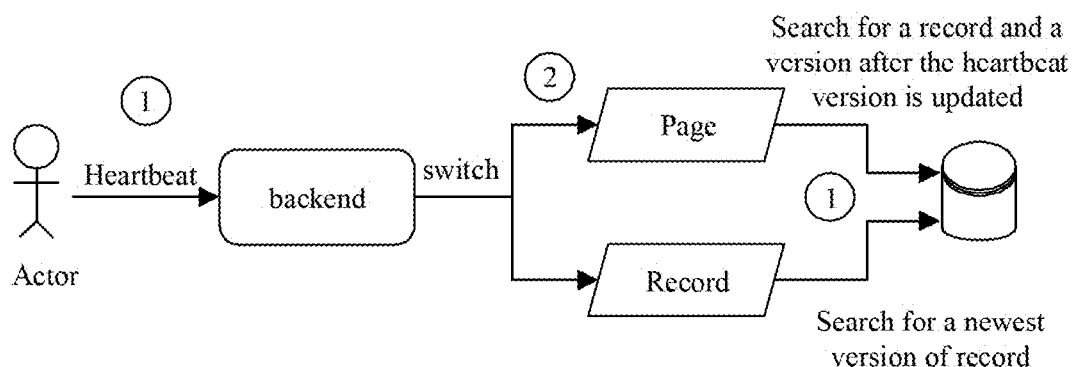
FIG. 13 is another schematic flowchart of implementing document synchronization by using heartbeat according to an embodiment of the present disclosure.

FIG. 13 is another schematic flowchart of a document synchronization implemented by heartbeat according to an embodiment of the present disclosure. As shown in FIG. 13, the client device (indicated as Actor) sends a heartbeat request to the server. After receiving the heartbeat request, the server searches for a newest content block version identifier corresponding to the content block node and a newest document version identifier corresponding to the document node. Then, the server feeds back update content corresponding to the newest content block version identifier and update content corresponding to the newest document version identifier to the client device, so that the client device updates the document and content block cached locally.

Figure 14:
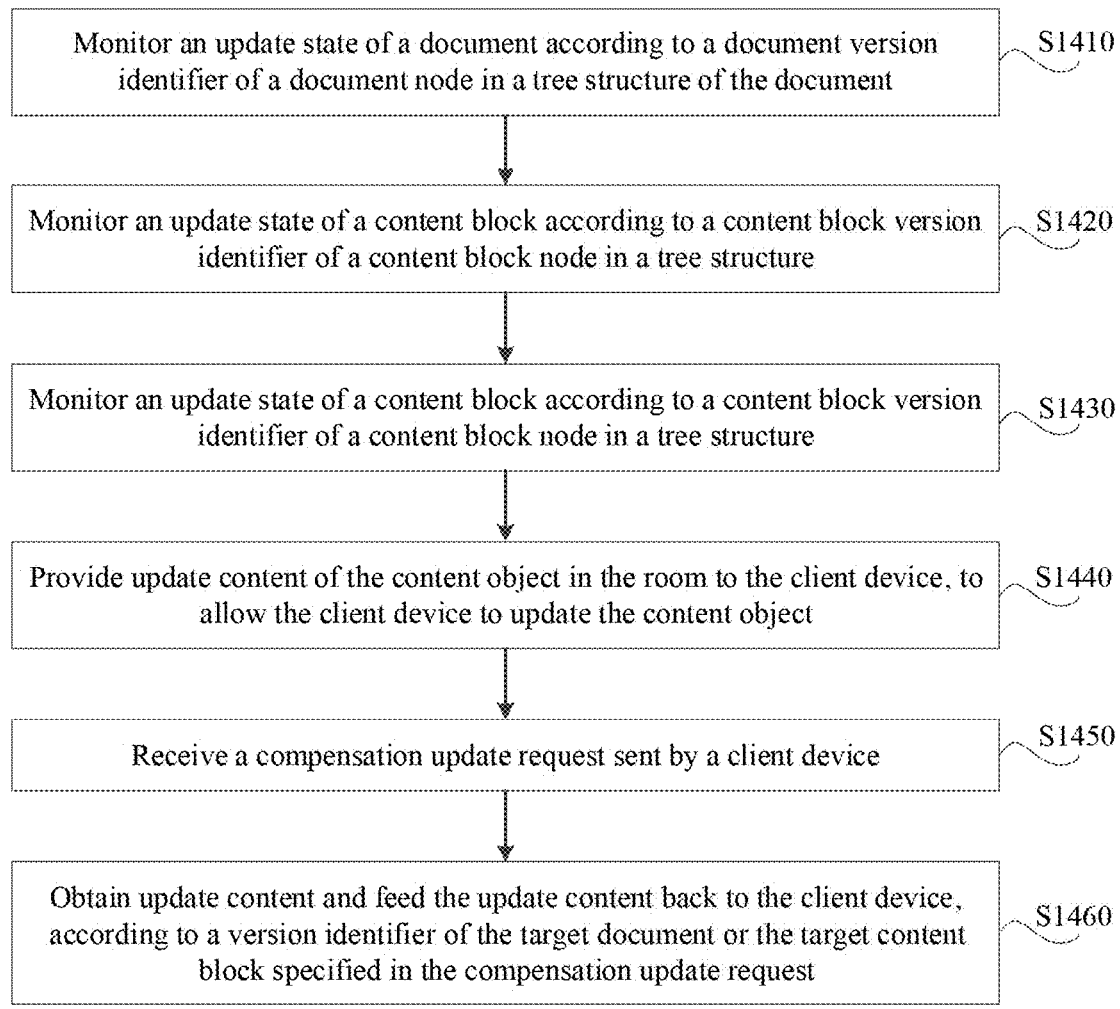
FIG. 14 is a flowchart of another document synchronization method according to an embodiment of the present disclosure.

In an embodiment, FIG. 14 is a flowchart of another document synchronization method according to an embodiment of the present disclosure. In this embodiment, the content object includes the content block, and the document is updated synchronously by using a compensation update request. As shown in FIG. 14, the document synchronization method in this embodiment includes steps S1410 to S1460 as follows.

In step S1410, an update state of a document is monitored, according to a document version identifier of a document node in a tree structure of the document.

The document includes at least one content block, the tree structure includes a document node and a content block node, a patent-child relationship between the document node and the content block node represents affiliation between the document and the content block. A document version identifier sequence is recorded in the document node, and the document version identifier is used to represent update of the content block of the document.

In step S1420, an update state of the content block is monitored according to a content block version identifier of a content block node in the tree structure.

A content block version identifier sequence is recorded in the content block node, and the content block version identifier is used to represent update of content of the content block.

In step S1430, in response to detecting an update of the content object in the room, a client device subscribing the content object in the room is determined.

The content object includes a document.

In step S1440, update content of the content object in the room is provided to the client device, to allow the client device to update the content object.

In step S1450, a compensation update request sent by the client device is received.

The compensation update request refers to a compensation operation request triggered actively by the server when the client device finds that the content object cached locally may miss a certain version. A form of the miss includes: it is found by the heartbeat request that the version identifier of the object content is inconsistent; or the version identifier returned by the server after the content block is edited is inconsistent with a local version identifier. It should be understood that, the compensation update request indicates a version identifier of a content block locally missed in the client device. As an example, if the client device 1 misses the document version identifier 5 to the document version identifier 10, an operation of requesting the document version identifier 5 to the document version identifier 10 is indicated in the compensation update request sent to the server by the client device 1.

In step S1460, according to the version identifier of the target document or the target content block specified by the compensation update request, corresponding update content is obtained and fed back to the client device.

The version identifier of the target document indicates a document version identifier missed locally in the client device, and the version identifier of the target content block indicates a content block version identifier missed locally in the client device. In the embodiment, the server determines the document version identifier and the content block version identifier missed locally in the client device according to compensation update request, and obtains the target document corresponding to the missed document version identifier or the target content block corresponding to the missed content block version identifier. Then, the server obtains update content corresponding to the version identifier of the target document, or obtains update content corresponding to the version identifier of the target content block, and feeds back the update content to the client device, so that the client device caches the update content corresponding to the missed version identifier of the target document or the update content corresponding to the missed version identifier of the target content block locally.

Figure 15:
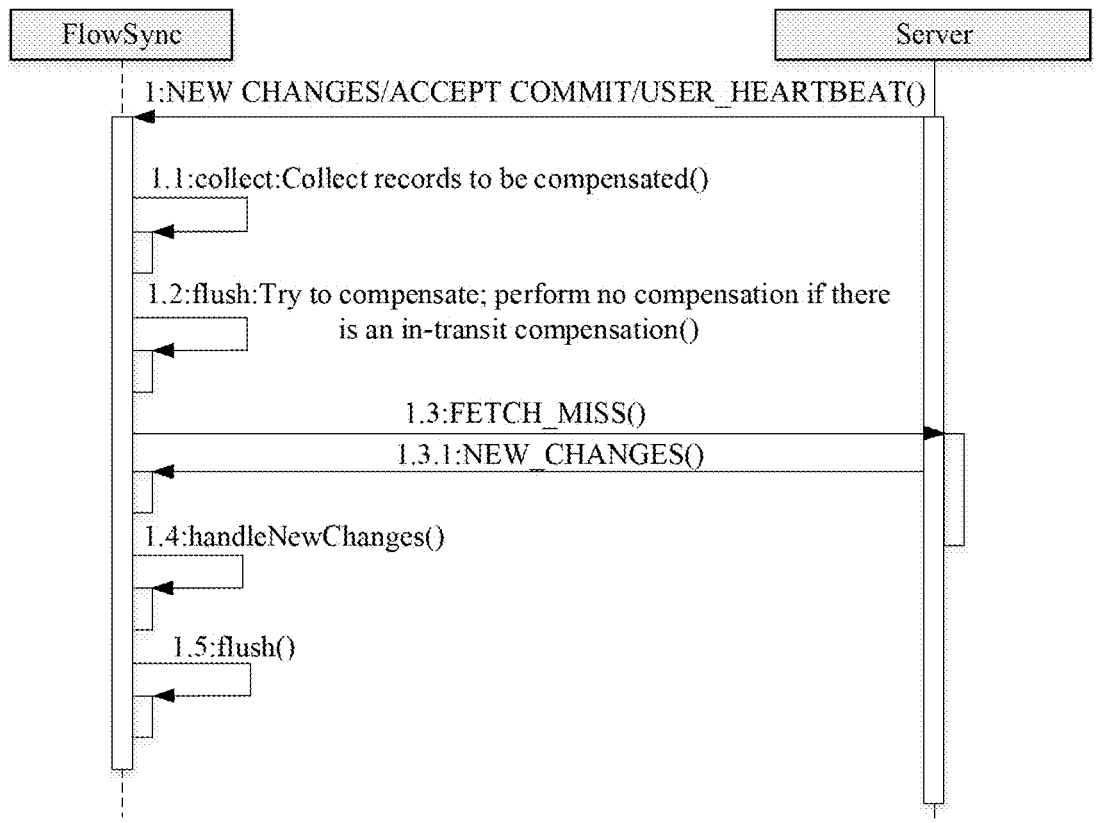
FIG. 15 is a schematic flowchart of updating a document in a compensation manner according to an embodiment of the present disclosure.

FIG. 15 is a schematic flowchart of document update by using compensation according to an embodiment of the present disclosure. As shown in FIG. 15, at step 1, a flow management module (FlowSyne) in the client device receives content update related information (NEW_CHANGES/ACCEPT_COMMIT/USER_HEARTBEAT ( )) sent by a server. At step 1.1, when detecting that a version of the content block or the document has an error, the client device collects a record to be compensated, that is, to-be-compensated version information of the content block. At step 1.2, the client device tries to perform compensation; if there is an in-transit compensation, no compensation update function is called. At step 1.3, the client device sends a compensation update request (FETCH_MISS ( )), and actively triggers to pull update content of the content block corresponding to the newest content block version identifier or update content of the document corresponding to the newest document version identifier from the server, so that the client device updates the document or the content cached locally. At step 1.3.1, the server pushes the update content (NEW_CHANGES ( )) to the client device. At step 1.4, the client device updates local cache based on the update content. At step 1.5, the client device flushes the local cache. It should be understood that, the compensation update request is triggered by the client device. If the client device finds any missed version after comparison, the client device automatically sends the compensation update request to the client device, to implement automatic compensation. Practically, in order to avoid repeatedly sending the compensation update request to the server, the client device locally records the case where the compensation update request has been sent to the server and no response is received from the server.

This embodiment is applicable to a case where the client device processes the document. The technical solution in this embodiment may be implemented in cooperation with the document synchronization method performed by the server. The method includes the following steps S1510 to S1530.

In step S1510, a content update request is sent to the server for a document currently processed by the client device, to request the server to determine document content according to a document version identifier in the content update request.

The document includes at least one content block, the tree structure includes a document node and a content block node, and a parent-child relationship between the document node and the content block node represents affiliation between the document and the content block. A document version identifier sequence is recorded in the document node, and a document version identifier is used to represent update of a content block belonging to the document.

In the embodiment, the document currently processed by the client device is a document which is loaded by the client device and is to be read or edited. When the client device initially loads the document, practical content of the document needs to be obtained from the server. Since the content block of the document may be edited and updated by other client device, the document content may need to be updated when the document is edited. The content update request sent to the server by the client device may be a room joining request or a heartbeat request. With reference to the technical solutions of the above embodiments, the room joining request or the heartbeat request carries the document identifier or the content block identifier, to allow the server respond to the update request of the client device according to the identifier.

According to the technical solution of the embodiment, the processing of sending a content update request to the server for a document currently processed by the client device includes at least one of: sending the content update request to the server when the client device loads the currently processed document; and sending the content update request to the server when the client device edits the currently processed document.

The above operation may be performed as follows. For the document currently processed by the client device, at least one reference content block of the document is determined; and a document version identifier of the document and a content block identifier of the reference content block are carried in the update request, and the update request is sent to the server.

When the document currently processed by the client device includes only the content block of the document, the client device may carry the identifier of the document in the content update request. If the document makes reference to the content block of other document, the content block identifier of the reference content block may be carried in the content update request, to request update collectively. Practically, the content update requests including the document identifier and the content block identifier may be sent separately or together to the server.

In a possible implementation, the content update request for the document may include only the document identifier. The server determines the document node based on the document identifier, and feeds back a newest TV of the document node and RV of the content block node of the content block.

In step S1520, the document version identifier and the content block version identifier of the content block belonging to the document, fed back by the server, are obtained.

The server determines the document version identifier and the RV of the content block belonging to the document, and feeds back them to the client device. Practically, the server may refer to the RV of the content block.

In step S1530, according to the document version identifier and the content block version identifier, the client device obtains practical content.

After obtaining the TV and RV, the client device may pull practical content from the server according to the obtained TV and RV. If the document is initially loaded, complete practical content is obtained. For increment update during the processing, the server may feed back the newest version of TV and RV, and the client device pulls the incremental practical content for storing locally.

According to the technical solutions of the embodiment, the client device can request both update content of the document and update content of the content block of the document only one time by the TV of the document node, and the client device does not need to monitor the content blocks separately to initiate the content update request. In this way, occupation of monitoring resources in the client device is reduced, thereby reducing the number of message interactions between the client device and the server, and thus improving the document update efficiency.

Figure 16:
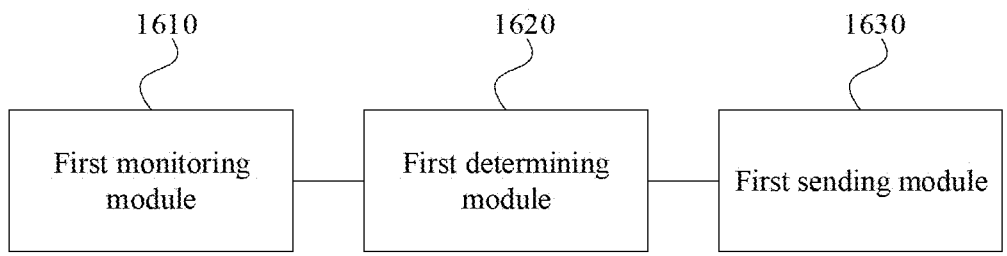
FIG. 16 is a structural block diagram of a document synchronization apparatus according to an embodiment of the present disclosure.

FIG. 16 is a structural block diagram of a document synchronization apparatus according to an embodiment of the present disclosure. The apparatus may be arranged at a server side. As shown in FIG. 16, the apparatus includes: a first monitoring module 1610, a first determining module 1620 and a first sending module 1630.

The first monitoring module 1610 is configured to: monitor an update state of a document according to a document version identifier of a document node in a tree structure of the document. The document includes at least one content block, the tree structure includes a document node and a content block node, a parent-child relationship between the document node and the content block node represents affiliation between the document and the content block; a document version identifier sequence is recorded in the document node and the document version identifier is used to represent update of a content block belonging to the document.

The first determining module 1620 is configured to: determine, in response to detecting an update of a content object in a room, a client device in the room subscribing the content object, where the content object includes a document.

The first sending module 1630 is configured to provide update content of the content object in the room to the client device, to allow the client device to update the content object.

Based on the above embodiments, the first monitoring module is configured to monitor a document version identifier sequence of the document node in the tree structure of the document, and determine that the document is updated when a new document version identifier is generated.

Based the above embodiments, a content block version identifier sequence is recorded in the content block node. The document synchronization apparatus further includes an adding module, configured to add a new document version identifier in the document version identifier sequence when a new content block version identifier is generated in any content block node belonging to the document node.

Based on the above embodiments, the content object further includes a content block. The document synchronization apparatus further includes a second monitoring module, configured to monitor an update state of the content block according to a content block version identifier of the content node in the tree structure. A content block version identifier sequence is recorded in the content block node, and the content block version identifier is used to represent content update of the content block.

Based on the above embodiments, the first sending module includes a searching unit and a sending unit.

The searching unit is configured to: search, according to the document version identifier of the document node in the tree structure, for a new content block version identifier of each content block node where the new content block version identifier corresponds to the new document version identifier, based on a version identifier snapshot of the tree structure.

The sending unit is configured to: determine update content of a content block indicated by the new content block version identifier, and provide the update content to the client device.

Based on the above embodiments, the document synchronization apparatus further includes a first receiving module and an adding module.

The first receiving module is configured to: receive a room subscribing request triggered by the client device when loading a document, and determine a content object to which the room subscribing request points.

The adding module is configured to: add the client device to a room corresponding to the content object.

Based on the above embodiments, the process of determining a content object to which the room subscribing request points includes: determining a currently loaded document to which the room subscribing request points; and determining in the tree structure a document node corresponding to the currently loaded document, and determining a document node identifier of the document node as the content object to which the room subscribing request points.

Based on the above embodiments, after the determining in the tree structure a document node corresponding to the currently loaded document, the following operations are performed: determining a content block node of a reference content block having a reference relationship with the document node; and determining an identifier of the content block node having the reference relationship as the content object to which the room subscribing request points.

Based on the above embodiments, after the determining in the tree structure a document node corresponding to the currently loaded document, the following operations are performed: determining a content block node of a reverse link content block having a reverse reference relationship with the document node; and determining an identifier of the content block node having the reverse reference relationship as the content object to which the room subscribing request points.

Based on the above embodiments, the document synchronization apparatus further includes: a second receiving module, a detection module and a second sending module.

The second receiving module is configured to receive a heartbeat request sent by the client device.

The detection module is configured to: detect, according to a document version identifier of a document node and/or a content block version identifier of a content block node in the tree structure, whether a target document or a target content block corresponding to the heartbeat request is updated.

The second sending module is configured to: provide an updated version identifier to the client device if the target document or the target content block is updated.

Based on the above embodiments, the document synchronization apparatus further includes a third receiving module and a feedback module.

The third receiving module is configured to: receive a compensation update request sent by the client device.

The feedback module is configured to: obtain update content according to a version identifier of a target document or target content block specified by the compensation update request, and feed the update content back to the client device.

The document synchronization apparatus may perform the document synchronization method according to any embodiment of the present disclosure, and has functional modules for performing the method and the same beneficial effects.

The document synchronization apparatus in the embodiment may be arranged in the client device. The apparatus includes: a request sending module 1701, a version identifier obtaining module 1702 and a content obtaining module 1703.

The request sending module 1701 is configured to: send a content update request to a server for a currently processed document of a client device, to request the server to determine document content according to a document version identifier in the content update request. The document includes at least one content block, the tree structure includes a document node and a content block node, a parent-child relationship between the document node and the content block node represents affiliation between the document and the content block. A document version identifier sequence is recorded in the document node, and the document version identifier is used to represent update of a content block belonging to the document.

The version identifier obtaining module 1702 is configured to obtain the document version identifier and a content block version identifier of a content block belonging to the document fed back by the server.

The content obtaining module 1703 is configured to obtain practical content to the client device according to the document version identifier and the content block version identifier.

In the above embodiment, the request sending module is configured to: determine, for the currently processed document of the client device, at least one reference content block of the currently processed document, and send to the server the update request carrying a document version identifier of the currently processed document and a content block identifier of the reference content block.

In the above embodiment, the request sending module is configured to perform at least one of the following operations: sending the content update request to the server when the client device loads the currently processed document; and sending the content update request to the server when the client device edits the currently processed document.

In the above embodiments, the content update request is a room joining request or a heartbeat request.

According to the technical solution of the embodiment of the present disclosure, the apparatus may perform the document synchronization method according to the embodiment of the present disclosure, and have corresponding functions and beneficial effects.

The embodiment of the present disclosure is applicable to process the on-line documents, and may be performed by a document processing apparatus based on a tree structure. The apparatus may be implemented by using hardware and/or software. The apparatus may be arranged in an electronic device having a storage and calculation capability. For example, the apparatus is integrated in the server. The server processes the on-line document, to response to the edits on the on-line documents performed by users through client devices. Preferably, the embodiment of the present disclosure is applicable to a scenario in which the server provides services such as on-line document editing and viewing for multiple client devices, and practical content and the tree structure of the document may be stored in the server. For the introduction of the document tree structure, one may refer to the related description of the above embodiments, for example description regarding FIG. 6.

Figure 17:
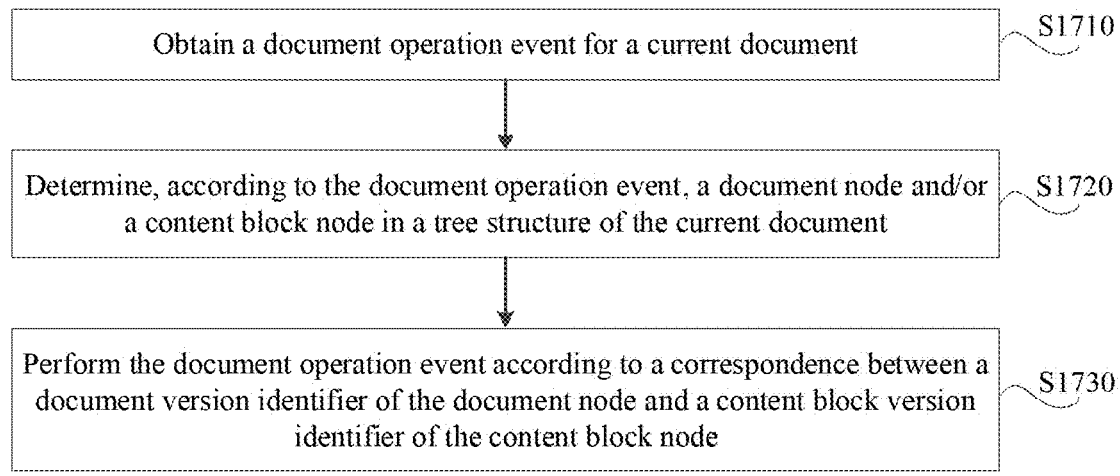
FIG. 17 is a flowchart of a document processing method based on a tree structure according to an embodiment of the present disclosure.

FIG. 17 is a flowchart of a document processing method based on a tree structure according to an embodiment of the present disclosure. The method may be performed by a document processing apparatus arranged in an electronic device. The electronic device may be a terminal device, preferably a server-side device. As shown in FIG. 17, the method according to the embodiment includes the following steps S1710 to S1730.

In step S1710, a document operation event for a current document is obtained.

The current document may be an on-line editable document displayed on a display interface of a document processing device. In practice, a type of the current document is not limited. For example, the current document may be a document for carrying multiple types of content such as texs, pictures, videos and programs; or may be a document for carrying a table. The table may support one or multiple types of data. The on-line document may include a document for implementing collaboration, or a document capable of returning to a historical version.

The document operation event refers to an event for editing a content block in the current document or an event for updating the document by a server. In an embodiment, the document includes at least one content block. It should be understood that, the document operation event on the current document refers to an event of performing operation on at least one content block in the current document.

In practice, the document operation event may be generated in response to an operation instruction of the user on the current document, or in response to an update instruction for a document or a content block obtained by the server. As an example, when an operation instruction of the user for the content block in the current document is received, a document operation event is generated according to the operation instruction. The operation instruction performed by the user on the current document may be implemented as: a touch screen operation of the user, a mouse operation of the user, or a triggering operation of the user by using a hot key, which is not limited herein. As an example, the document operation event may include one of: a version change event, and a content block update content pushing event. The version change event includes an event for the current document returning to an old version, or an event for recovering from an old version to a new version. The content block update content pushing event includes an event for pushing updated practical content to the client device by the server when the practical content of the content block is updated.

In step S1720, according to the document operation event, a document node and/or a content block node is determined in a tree structure of the current document.

The document includes at least one content block, the tree structure includes a document node and a content block node, the parent-child relationship between the document node and the content block node represents affiliation between the document and the content block; a document version identifier sequence is recorded in the document node, a content block version identifier sequence is recorded in the content block node; and the document version identifier is used to represent update of the content block belonging to the document.

In the embodiment, when the content block in the document is updated once, a new document version identifier is generated. It should be understood that, the document version identifier and the update of the document content block are in one-to-one correspondence. It should be noted that, the document operation event on the current document refers to an update event of the content block in the current document. In the embodiment, a document node in the tree structure is generally a parent node; and the content block node may be a parent node or a child node.

In the embodiment, a tree structure of the current document is determined when the document operation event on the current document is obtained, and the tree structure is searched for a document node and/or a content block node involved in the document operation event. A corresponding node may be determined according to an identifier or name of the document or content block included in the operation event.

In step S1730, the document operation event is performed according to a correspondence between the document version identifier of the document node and the content block version identifier of the content block node.

The document version identifier is used to record that the content block of the current document changes, that is, the document version identifier sequence is used to represent a historical record of the whole document. History of the change of the content block of the document can be obtained through the document version identifier sequence, thereby facilitating performing version switching operations such as version returning and version recovering of the document. It should be noted that, one document version identifier of the document node may correspond to one or more content block version identifiers, which is not limited herein. Practically, the document version identifier of the document node and the content block version identifier of the document node may be in one-to-one correspondence, which is simpler than the one-to-multiple case.

In the embodiment, when the current document is updated, the document version identifier corresponding to the document node in the current document is changed. Accordingly, when the content block of the current document is updated, the content block version identifier corresponding to the content block node of the current document and the document version identifier of the current document where the content block is located are both changed, which can be regarded that, when the content block of the current document is changed, the document node and the content block node for the current document are both updated. When the current document is updated, the document node of the current document is updated.

Practically, a correspondence is established between the document version identifier of the document node in the current document and a newest content block version identifier corresponding to each content block node. That is, a correspondence is established between the document version identifier of the document node and a newest version of each content block node, so that after the document operation event performed on the current document by the user is received, the document operation event is uniformly performed on the content block(s) of the current document according to the correspondence between the document version identifier of the document node and the content block version identifier corresponding to the newest version of the content block node(s).

According to technical solution of the embodiment, the document operation event on the current document is obtained. According to the document operation event, a corresponding document node and/or a content block node is determined in the tree structure of the current document. The document operation event is performed according to the correspondence between the document version identifier of the document node and the content block version identifier of the content block node. According to the technical solution of the embodiment, by introducing the document version identifier of the document node in the current document, the document operation event is performed on the content nodes indicted by the all content block version identifiers corresponding to the document version identifier according to the correspondence between the document version identifier of the document node and the content block version identifiers of the content block nodes, thereby performing uniform operation on the current document, and thus improving operation convenience of the user on the current document.

Figure 18:
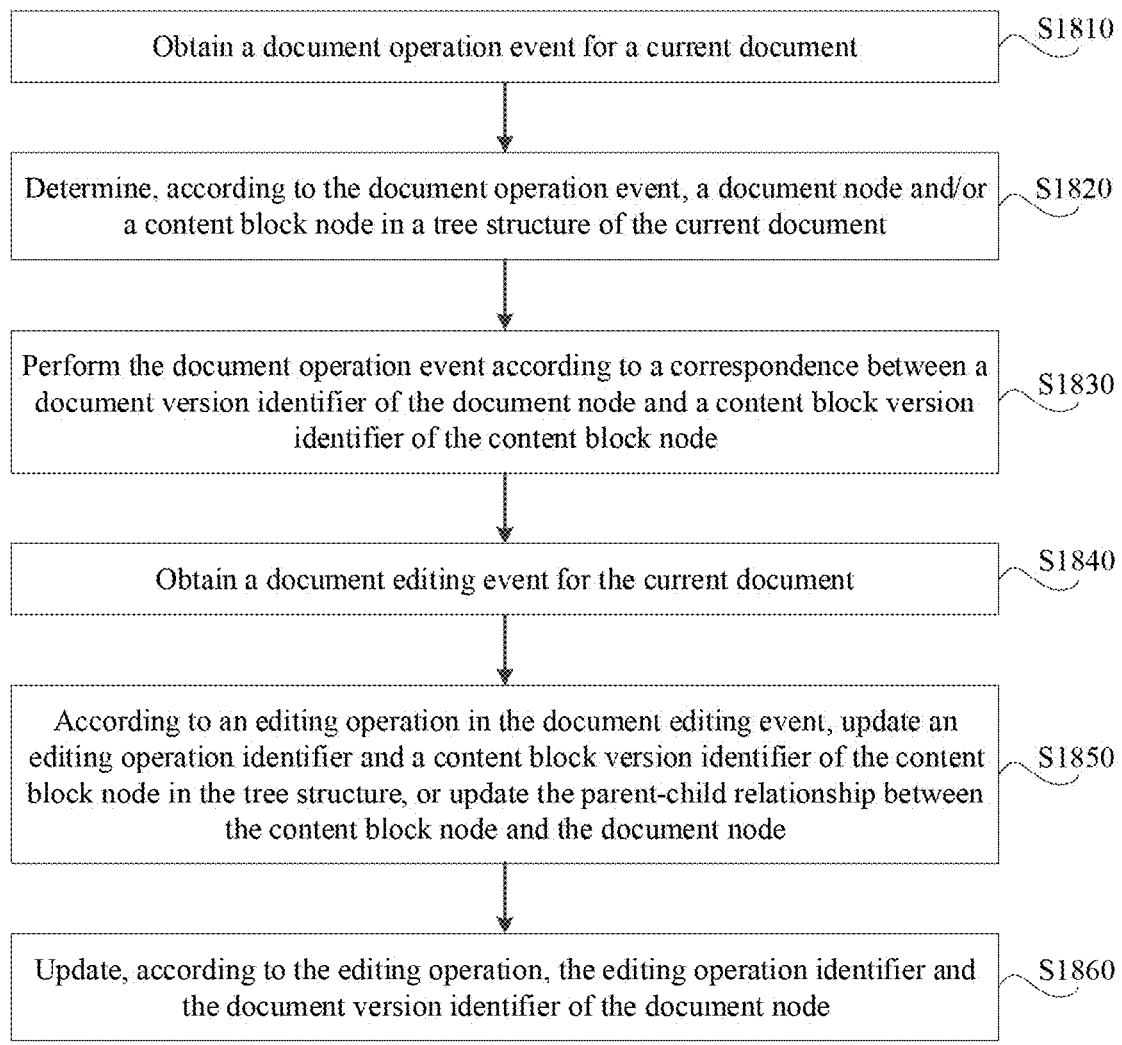
FIG. 18 is a flowchart of a document processing method based on a tree structure according to an embodiment of the present disclosure.

FIG. 18 is a flowchart of a document processing method based on a tree structure according to an embodiment of the present disclosure. This embodiment is combined with the first embodiment to further illustrate the document processing method. It should be noted that, steps S1840-S1860 may be performed after step S1830 or before step S1810, and the performing order is not limited. As an example, in this embodiment, steps S1840 to S1860 are performed after step S1830, for illustrating the document processing process. As shown in FIG. 18, the method in the embodiment includes steps S1810 to S1860 as follows.

In step S1810, a document operation event on a current document is obtained.

In step S1820, according to the document operation event, a document node and/or a content block node is determined in the tree structure of the current document.

In step S1830, the document operation event is performed according to a correspondence between a document version identifier of the document node and a content block version identifier of the content block node.

The document includes at least one content block, the tree structure includes a document node and a content block node, the parent-child relationship between the document node and the content block node represents affiliation between the document and the content block; a document version identifier sequence is recorded in the document node, a content block version identifier sequence is recorded in the content block node; and the document version identifier is used to represent update of the content block belonging to the document.

In step S1840, the document edition event on the current document is obtained.

In the embodiment, each document includes at least one content block. It should be understood that the document edition event on the current document refers to an edition event performed for at least one content block of the current document.

It should be noted that, for the document edition event on the current document, a document editor and edition time may be recorded according to requirements. As an example, when the user performs an edition operation on the content block of the current document, the document editor and the edition time are recorded, to facilitate subsequent processing such as backtracking, searching and displaying on the document, thereby facilitating processing the document in multiple manners.

In step S1850, according to the edition operation in the document edition event, an edition operation identifier and a content block version identifier of the content block node in the tree structure are updated, or the parent-child relationship between the content block node and the document node is updated.

In the embodiment, the edition operation in the document edition event includes one of the following: a content block update operation for the content block, an adding operation for the content block and a delete operation for the content block. Practically, the edition operation may be one of, two of or more of the operations described above, which is not limited herein. The update operation for the content block refers to an operation for modifying practical content in the content block. The adding operation for the content block refers to an operation for adding practical content in the content block. The delete operation for the content block refers to an operation for deleting practical content in the content block. It should be understood that, the document edition event on the current document includes: an event of performing an edition operation on practical content of at least one content block in the current block, an event for deleting at least one content block, an event for adding at least one content block, or an event for adjusting a relationship between the content blocks. The relationship between the content block may include affiliation, a position of the content block in the document, or an order of the content blocks in the document, or the like.

The edition operation identifier and an edition operation in the document edition event are in one-to-one correspondence. Once the edition operation is performed, a corresponding edition operation identifier is generated. Practically, in order to facilitate distinguishing among different versions of the content block, a content block version identifier of the content block node is updated after the document edition event is performed on the content block in the current document. In practice process, when a delete operation is performed on the content block of the current document, the number of the content blocks in the current document is reduced accordingly, and the parent-child relationship between the content block node and the document node changes accordingly. It should be understood that, in a case that the edition operation is an update operation or adding operation for the content block, an edition operation identifier and a content block version identifier of the content block node in the tree structure are updated according to the edition operation in the document edition event. In a case that the edition operation is a delete operation for the content block, the parent-child relationship between the content block node and the document node is updated according to the edition operation in the document edition event.

In step S1860, the edition operation identifier and the document version identifier of the document node are updated according to the edition operation.

As an example, in updating the content block of the current block, not only the edition operation identifier and the content block version identifier of the content block node are updated, but also the edition operation identifier and the document version identifier of the document node are updated. As an example, a correspondence between the edition operation identifier and the document version identifier of the document node is established, and a correspondence between the edition operation identifier and the content block version identifier of the content block node is established, thereby uniformly performing the document operation event on the current document subsequently.

In the technical solution of this embodiment, on the basis of the above embodiments, the edition operation identifier and the content block version identifier of the content block node in the tree structure are updated, or the parent-child relationship between the content block node and the document node is updated, according to the edition operation in the document edition event. The edition operation identifier and the document version identifier of the document node are updated according to the edition operation, thereby updating the content block node and the document node in the tree structure according to the edition operation.

Figure 19:
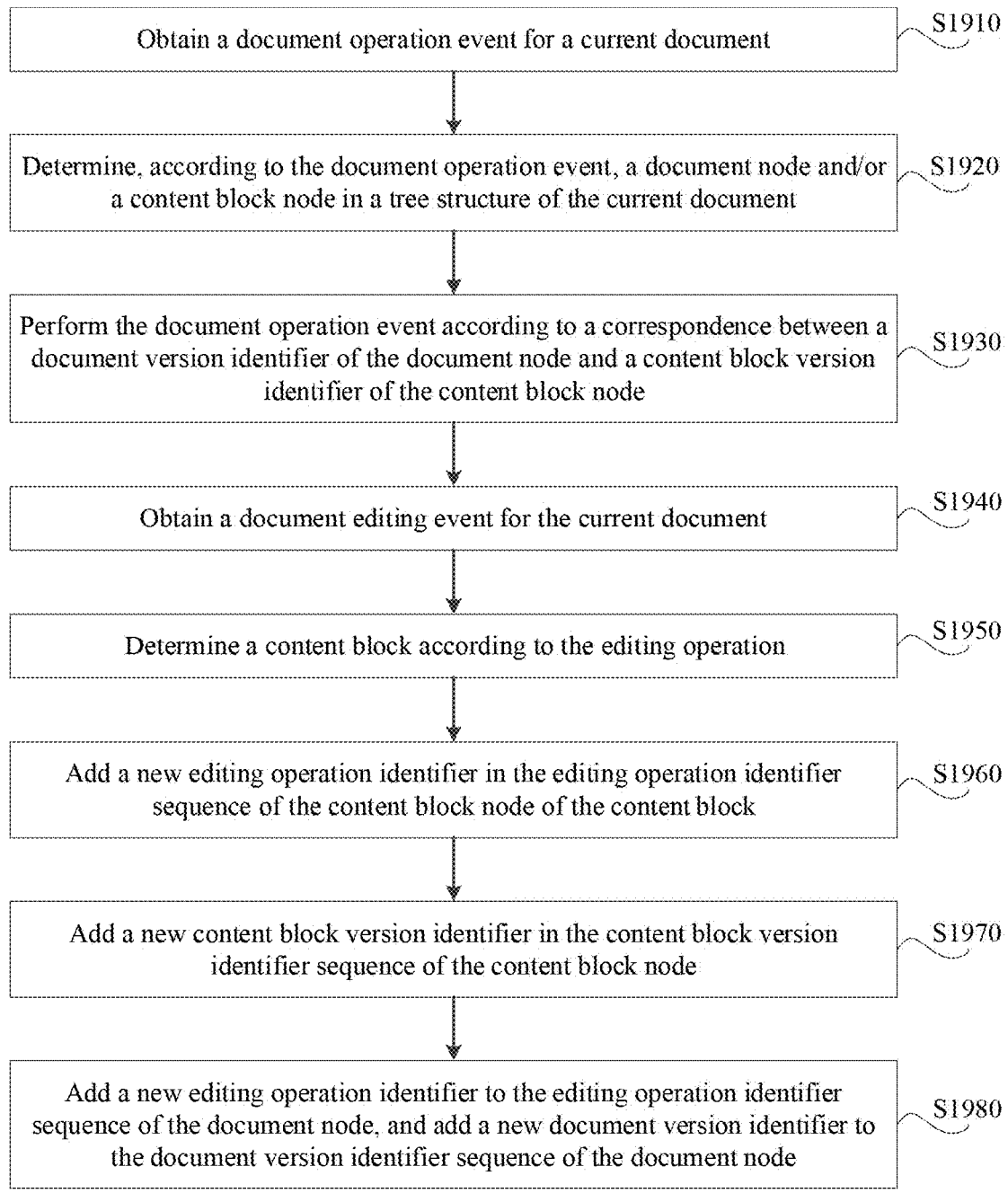
FIG. 19 is a flowchart of a document processing method based on a tree structure according to an embodiment of the present disclosure.

FIG. 19 is a flowchart of a document processing method based on a tree structure according to an embodiment of the present disclosure. This embodiment is based on the above embodiments, and the process of updating the edition operation identifier and the content block version identifier of the content block node in the tree structure according to the edition operation in the document edition event is further illustrated, in a case that the edition operation includes a content update operation for the content block. As shown in FIG. 19, the method according to this embodiment includes the following steps S1910 to S1980.

In step S1910, a document operation event for a current document is obtained.

In step S1920, according to the document operation event, a document node and/or a content block node is determined in the tree structure of the current document.

In step S1930, the document operation event is performed according to a correspondence between a document version identifier of the document node and a content block version identifier of the content block node.

The document includes at least one content block, the tree structure includes a document node and a content block node, the parent-child relationship between the document node and the content block node represents affiliation between the document and the content block; a document version identifier sequence is recorded in the document node, a content block version identifier sequence is recorded in the content block node; and the document version identifier is used to represent update of the content block belonging to the document.

In step S1940, the document edition event for the current document is obtained.

In step S1950, a corresponding content block is determined according to the edition operation.

In a case that the edition operation in the document edition event includes a content update operation for the content block, the content update operation is performed on the content block. That is, practical content in the content block is modified. In practice, an edition operation performed by the user on the current document is received, and a corresponding content block is determined according to a position of the edition operation. As an example, the position of the edition operation may be presented by a position of a mouse cursor.

In an embodiment, step S1950 may include: determining at least two content blocks according to the edition operation. A new document version identifier and a new content block version identifier are in one-to-one correspondence; or one new document version identifier corresponds to at least two new content block version identifiers added due to the edition operation. In an embodiment, the content update operation for the content block of the current document leads to change of at least two content blocks in the current block. In this case, the at least two new content block version identifiers added due to the edition operation may correspond to one new document version identifier. That is, the document version identifiers corresponding to the at least two new content block version identifiers are the same. Alternatively, each new content block version identifier may correspond to one new document version identifier, that is, the new content block version identifier and the new document version identifier are in one-to-one correspondence. As an example, it is assumed that a content update operation is performed on a content block A of the current document and the content block A is a paragraph consisting of words. An "enter" operation is performed at a middle portion of the paragraph, the content block A is divided into two content blocks, indicated by content block A1 and content block A2. That is, an adding operation of "enter" results in change of two content blocks, equaling to the case that an operation of deleting practical content corresponding to the content block A2 is performed on the content block A1, and the content block A2 is a newly established content block. The adding operation of "enter" results in change of two content blocks, that is, two edition operations are performed on the current document, which are respectively a content block delete operation and a content block adding operation. A new document version identifier may be added for each of the two edition operations, that is, the delete operation for the content block A1 corresponds to one document version identifier and the adding operation for the content block A2 corresponds to one document version identifier. Alternatively, a same new document version identifier is added for the two edition operations. That is, the document version identifier corresponding to the delete operation for the content block A1 is the same as the document version identifier corresponding to the adding operation for the content block A2.

In step S1960, a new edition operation identifier is added in the edition operation identifier sequence of the content block node corresponding to the content block.

An edition operation identifier sequence of the content block node is used to store an edition operation identifier of the content block node. It should be understood that, once an edition operation is performed on the content block, a new edition operation identifier is added in the edition operation identifier sequence of the content block node.

In step S1970, a new content block version identifier is added in the content block version identifier sequence of the content block node.

The content block version identifier sequence of the content block node is used to store a content block version identifier of the content block node. It should be understood that, once an edition operation is performed on the content block, a new content block version identifier is added in the content block version identifier sequence of the content block node.

In step S1980, a new edition operation identifier is added in an edition operation identifier sequence of the document node, and a new document version identifier is added in a document version identifier sequence of the document node. The new document version identifier corresponds to the new content block version identifier.

In the embodiment, the edition operation identifier sequence of the document node is used to store an edition operation identifier of the document node. It should be understood that, in updating the content block of the current document, not only the edition operation identifier and the content block version identifier of the content block node in the current document are updated, but also the edition operation identifier and the document version identifier of the document node are updated. In addition, a correspondence between the document version identifier of the document node and the content block version identifier of the content block node is established, that is, the new document version identifier corresponds to the new content block version identifier.

It should be understood that, the content update operation is performed on the content block of the current document as follows. When the content block is changed, the edition operation identifier and the content block version identifier of the content block are updated. Then, a corresponding document node is found according to the correspondence between the content block node and the document node, to update the document version identifier of the document node, to achieve collaborative on-line update of the content block of the current document.

Figure 20:
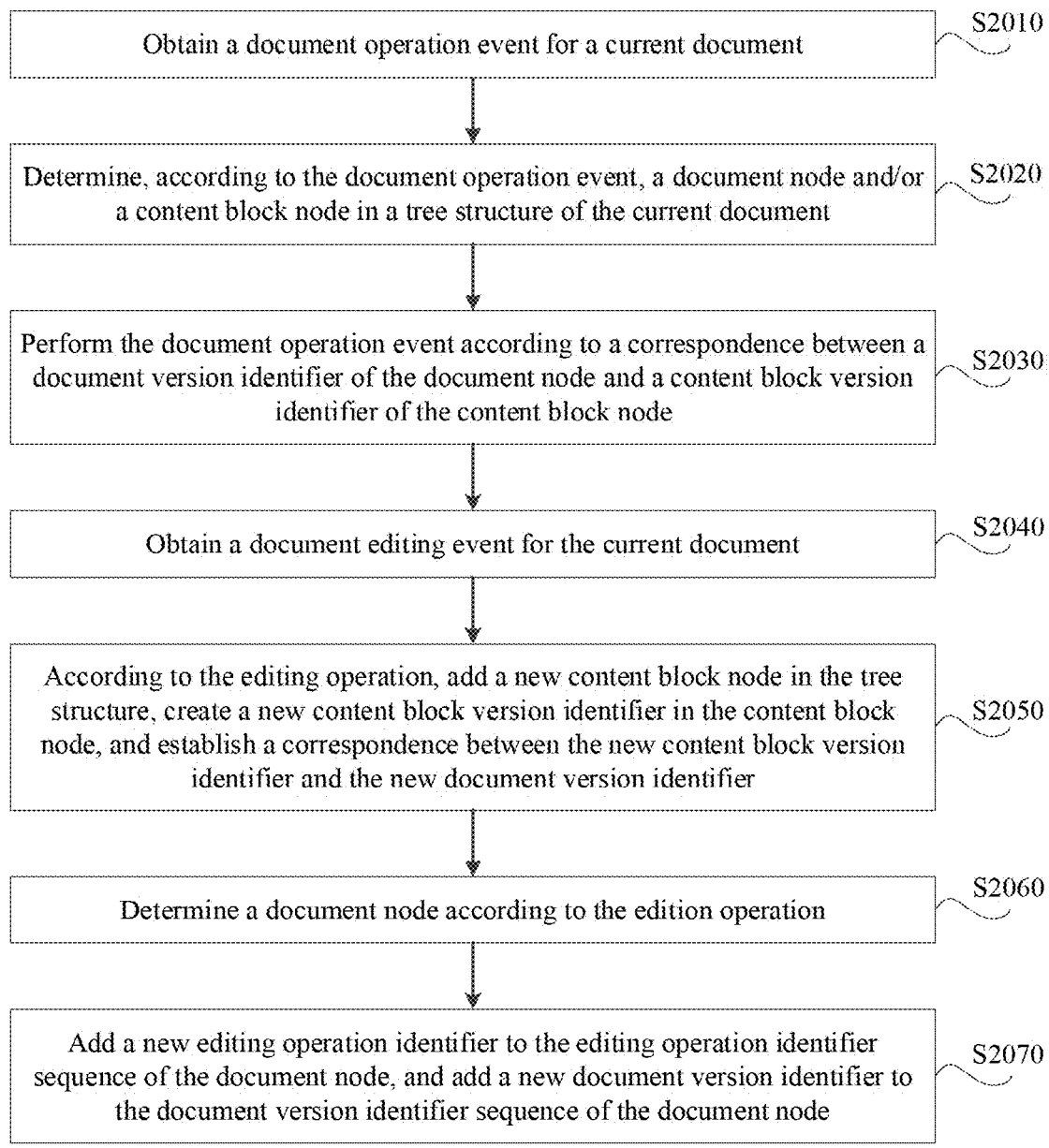
FIG. 20 is a flowchart of a document processing method based on a tree structure according to an embodiment of the present disclosure.

FIG. 20 is a flowchart of a document processing method based on a tree structure according to an embodiment of the present disclosure. This embodiment is based on the above embodiments, and the process of updating the edition operation identifier and the document version identifier of the document node according to the edition operation is further illustrated, in a case that the edition operation includes an adding operation for the content block. As shown in FIG. 20, the method according to this embodiment includes the following steps S2010 to S2070.

In step S2010, a document operation event for a current document is obtained.

In step S2020, according to the document operation event, a document node and/or a content block node is determined in the tree structure of the current document.

In step S2030, the document operation event is performed according to a correspondence between a document version identifier of the document node and a content block version identifier of the content block node.

The document includes at least one content block, the tree structure includes a document node and a content block node, the parent-child relationship between the document node and the content block node represents affiliation between the document and the content block; a document version identifier sequence is recorded in the document node, a content block version identifier sequence is recorded in the content block node; and the document version identifier is used to represent update of the content block belonging to the document.

In step S2040, the document edition event for the current document is obtained.

In step S2050, a new content block node is added in the tree structure according to the edition operation, a new content block version identifier is established in the content block node, and a correspondence between the new content block version identifier and the new document version identifier is established.

In a case that the edition operation in the document edition event includes an adding operation for content block, an operation of adding a content block is performed on the current document. When the adding operation for content block performed by the user on the current document is received, a new content block node is added in the tree structure, a content block version identifier corresponding to the content block node is established, and a new document version identifier corresponding to the content block version identifier is established.

In step S2060, a corresponding document node is determined according to the edition operation.

It should be noted that, a parent-child relationship is established between the content block node of the content block and the document node of the document, to represent affiliation between the document and the content block. In the embodiment, after the content block adding operation performed on the current document by the user is received, a new content block is added in the current document, and a corresponding document node is found according to the parent-child relationship between the document node and the content block node corresponding to the new content block.

In step S2070, a new edition operation identifier is added in the edition operation identifier sequence of the document node, and a new document version identifier is added in the document version identifier sequence of the document node.

In the embodiment, the edition operation identifier sequence of the document node is used to store an edition operation identifier of the document node, and the document version identifier sequence of the document node is used to store a document version identifier of the document node. It should be understood that, when the content block adding operation is performed, practical content of the current document is changed. That is, the edition operation is performed on the current document. Hence, a new edition operation identifier is added to the document node, and a new document version identifier is added to the document node of the current document, to implement the on-line content block adding operation for the current document.

Figure 21:
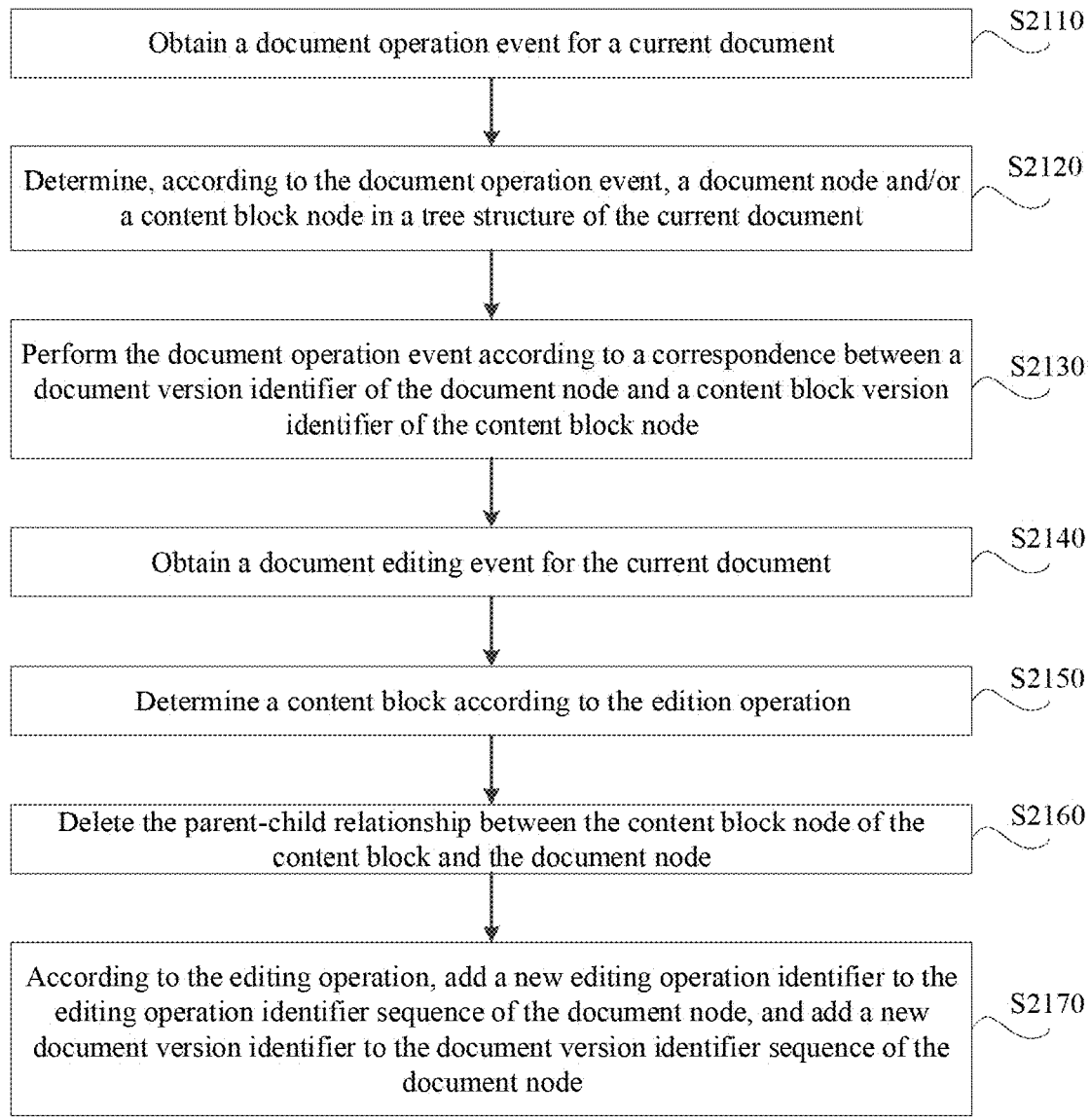
FIG. 21 is a flowchart of a document processing method based on a tree structure according to an embodiment of the present disclosure.

FIG. 21 is a flowchart of a document processing method based on a tree structure according to an embodiment of the present disclosure. This embodiment is based on the above embodiments, and the process of updating the edition operation identifier and the document version identifier of the document node according to the edition operation is further illustrated in a case that the edition operation includes a delete operation for the content block. As shown in FIG. 21, the method according to this embodiment includes the following steps S2110 to S2170.

In step S2110, a document operation event for a current document is obtained.

In step S2120, according to the document operation event, a corresponding document node and/or a content block node is determined in the tree structure of the current document.

In step S2130, the document operation event is performed according to a correspondence between a document version identifier of the document node and a content block version identifier of the content block node.

The document includes at least one content block, the tree structure includes a document node and a content block node, the parent-child relationship between the document node and the content block node represents affiliation between the document and the content block. A document version identifier sequence is recorded in the document node, and a content block version identifier sequence is recorded for the content block node. The document version identifier is used to represent update of the content block belonging to the document.

In step S2140, the document edition event for the current document is obtained.

In step S2150, a corresponding content block is determined according to the edition operation.

The edition operation in the document edition event includes a content block delete operation, that is, performing a delete operation on a certain content block in the current document. In practice, when a selection operation for the content block is detected, the selected content block is determined as the content block to which the edition operation is to be performed.

In step S2160, the parent-child relationship between the content block node of the content block and the document node is deleted.

It should be noted that, the parent-child relationship is established between the content block node of the content block and the document node, to represent affiliation between the document and the content block. In an embodiment, the content block version identifier of the content block node corresponding to the content block and the document node corresponding to the content block node are obtained, and the parent-child relationship between the content block node of the content block and the document node is deleted. That is, a parent node identifier recorded in the content block node is deleted, and a content block node identifier is deleted from a child node identifier of the document node.

In step S2170, according to the edition operation, a new edition operation identifier is added in the edition operation identifier sequence of the document node, and a new document version identifier is added in the document version identifier sequence of the document node.

In the embodiment, the edition operation identifier sequence of the document node is used to store the edition operation identifier of the document node, and the document version identifier sequence of the document node is used to store the document version identifier of the document node. It should be understood that, when the content block delete operation is performed, practical content of the current document is changed. That is, the edition operation is performed on the current document, and the edition operation identifier and the document version identifier of the document node are required to be updated. Therefore, a new edition operation identifier is added in the edition operation identifier sequence of the document node, and a new document version identifier is added in the document version identifier sequence of the document node, thereby on-line deleting the content block of the current document.

Figure 22:
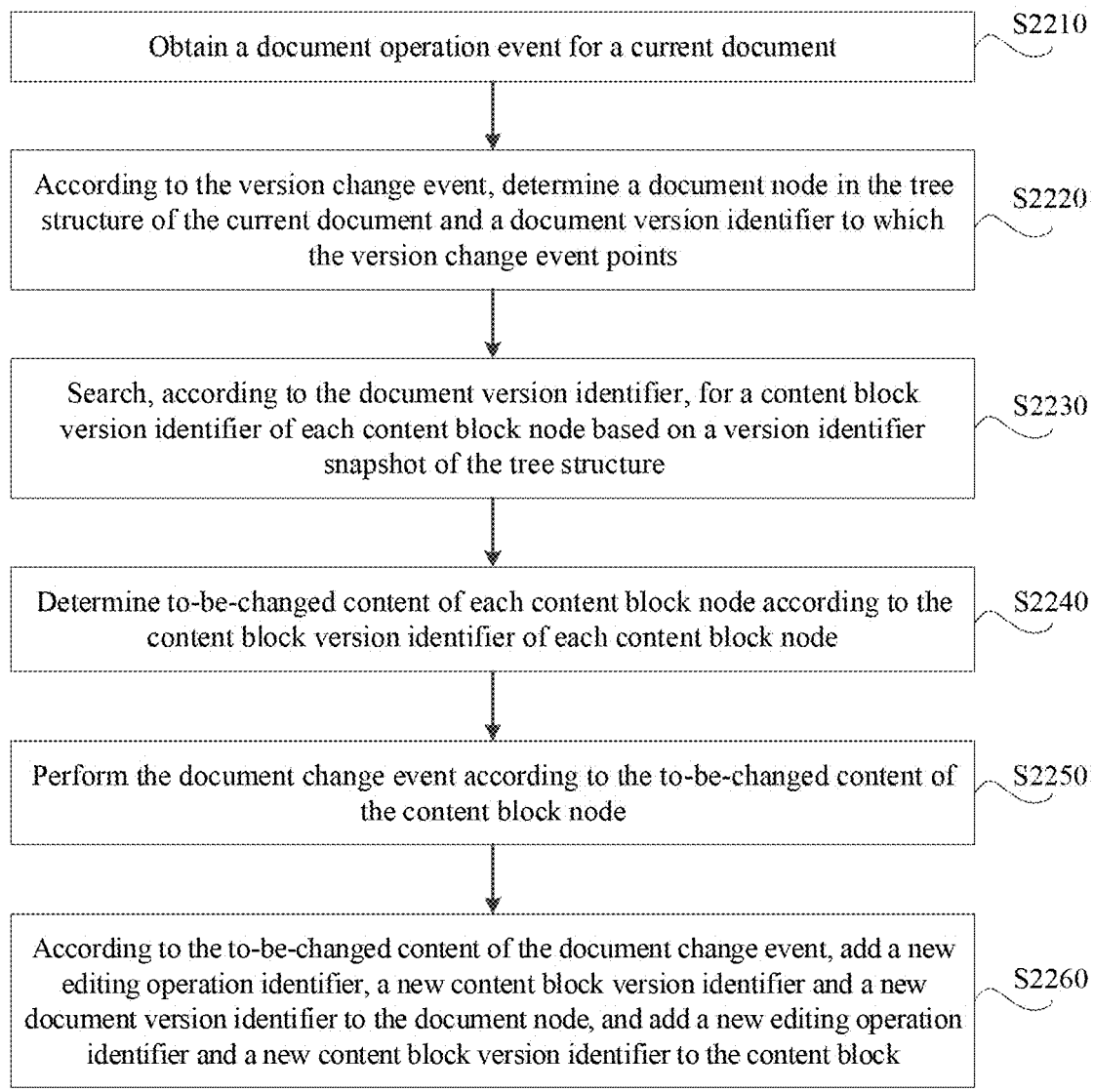
FIG. 22 is a flowchart of a document processing method based on a tree structure according to an embodiment of the present disclosure.

FIG. 22 is a flowchart of a document processing method based on a tree structure according to an embodiment of the present disclosure. This embodiment is based on the above embodiments, and steps S1720 and S1730 are further illustrated in a case that the document operation event is a version change event. As shown in FIG. 22, the method in this embodiment includes steps S2210 to S2260 as follows.

In step S2210, a document operation event for a current document is obtained.

The document operation event includes a version change event. In an embodiment, a version change event for the current document may be triggered by a display button in the document or a hot key in a keyboard. It should be understood as, when the display button corresponding to the version change event is detected or the hot key in the keyboard is triggered, the version change event for the current document is started.

In step S2220, according to the version change event, a corresponding document node in the tree structure of the current document and a document version identifier pointed by the version change event are determined.

A version return event in the version change event refers to an event for returning from a current version to an old version of the current document. A version recover event in the version change event refers to an event for recovering from an old version to a new version of the document. The old version of the current document may include one or more versions. It should be understood that, in order to accurately make the current document return to a corresponding old version, a document version identifier corresponding to the old version to be returned is indicated by the version return event. It should be noted that, the version return event is an operation event performed on the document. That is, when the version return event is obtained, the document node corresponding to the current document in the tree structure of the current document and the document version identifier indicated by the version return event are obtained.

In step S2230, a content block version identifier of each corresponding content block node is searched for according to the document version identifier by using a version identifier snapshot of the tree structure.

The version identifier snapshot refers to a correspondence established between a current newest document version identifier in the document version identifier sequence of the document node and a current newest content block version identifier of a content block node corresponding to each content block included in the document. As an example, it is assumed that a document corresponding to the document node 1 includes three content blocks, that is, a content block B1, a content block B2 and a content block B3. The document version identifier sequence of the document node 1 includes eight document version identifiers, which are respectively 0, 1, 2, 3, 4, 5, 6 and 7 (that is, the document version identifier 7 indicates the newest document version identifier). The content block version identifier sequence of the content block node corresponding to the content block B1 includes two content block version identifiers, 0 and 1 (that is, the newest content block version identifier of the content block B1 is 1). The content block version identifier sequence of the content block node corresponding to the content block B2 includes three content block version identifiers, 0, 1 and 2 (that is, the newest content block version identifier of the content block B2 is 2). The content block version identifier sequence of the content block node corresponding to the content block B3 includes four content block version identifiers, 0, 1, 2 and 3 (that is, the newest content block version identifier of the content block B3 is 3). The document version identifier 7 of the document node 1 respectively establishes correspondence with the newest content block version identifier 1 of the content block B1, the newest content block version identifier 2 of the content block B2, the newest content block version identifier 3 of the content block B3, and the correspondence serves as the version identifier snapshot.

It should be noted that, a parent-child relationship is established between the document node and a content block node of each content block included in the document. That is, according to a document version identifier of the document node and the pre-created version identifier snapshot, a content block version identifier of each content block node corresponding to the document version identifier is found.

In step S2240, to-be-changed content of each content block node is determined according to the content block version identifier of each content block node.

The content block version identifier of each content block node is used to represent practical content of the content block corresponding to the content block node. That is, content blocks corresponding to different content block version identifiers of the content block node have different practical contents. In an embodiment, after the content block version identifier of each content block node is determined, the practical content of the content block corresponding to the content block node can be obtained based on the content block version identifier, thereby obtaining practical content to which the content block node is to return, that is, returning to practical content corresponding to the content block version identifier.

Is step S2250, a document change event is performed according to the to-be-changed content of each content block node.

In the embodiment, the version return event is taken as an example. According to content to which each content block node is to return, returning of the practical content of the content block corresponding to each content block node is performed, to return to the practical content corresponding to the content block version identifier. In this way, uniform returning operation is performed on the practical content of the content blocks corresponding to all content block nodes according to the correspondence between the document version identifier and the content block version identifier, thereby improving use experience and operation convenience of the user.

In step S2260, according to the to-be-changed content in the document change event, a new edition operation identifier, a new content block version identifier and a new document version identifier are added in the document node; and the new edition operation identifier and the new content block version identifier are added in the content block.

In the embodiment, the document return event is taken as an example. After the document return event is performed on the current document, a new edition operation identifier is added in the edition operation sequence of the document node, to represent the edition operation performed on the current document. A new content block version identifier is added in the content block version identifier sequence of the document node, to represent that the content block version of the current document is changed. A new document version identifier is added in the document version identifier sequence of the document node, to represent that practical content of the current document is changed. Practically, when the content aimed by a return is cancelled for the practical content of the content block corresponding to each content block node, that is, when the edition operation is performed on each content block, the edition operation identifier and the content block version identifier of each content block are updated. That is, a new edition operation identifier is added in the edition operation identifier sequence of each content block node and a new content block version identifier is added in the content block version identifier sequence.

Figure 23:
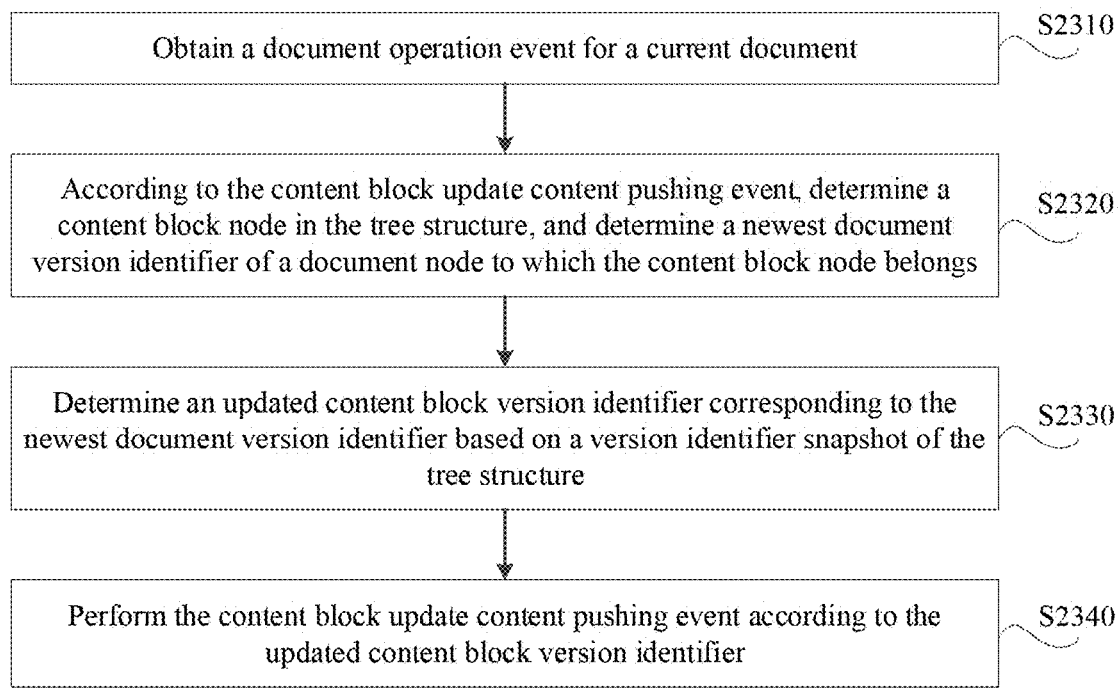
FIG. 23 is a flowchart of a document processing method based on a tree structure according to an embodiment of the present disclosure.

FIG. 23 is a flowchart of a document processing method based on a tree structure according to a seventh embodiment of the present disclosure. This embodiment is based on the above embodiments, and steps S1720 and S1730 are further illustrated in a case that the document operation event is a content block update content pushing event. As shown in FIG. 23, the method in this embodiment includes steps S2310 to S2340 as follows.

In step S2310, a document operation event for a current document is obtained.

In step S2320, according to a content block update content pushing event, a corresponding content block node and a newest document version identifier of a document node to which the content block node belongs are determined in the tree structure.

The content block update content pushing event refers to an event in which a server pushes update content of a content block to a client device. In the embodiment, when practical content of the content block is updated, a content block node of which practical content is updated and a newest document version identifier of a document node to which the content block node belongs are determined in the tree structure. It should be noted that, a parent-child relationship is established between the content block node and the document node, to represent affiliation between the content block and the document. It should be understood that, the content block node belongs to the document node, that is, a parent node of the content block node is the document node.

In step S2230, an updated content block version identifier corresponding to the newest document version identifier is determined based on a version identifier snapshot of the tree structure.

In an embodiment, step S2330 includes steps S23301 and S23302.

In step S23301, based on the version identifier snapshot of the tree structure, an edition operation version identifier corresponding to the newest document version identifier is determined.

In an embodiment, the process of performing a content block update content pushing event on the current document refers to a process in which practical content of the content block in the current document is updated. Accordingly, the edition operation version identifier of the document node corresponding to the current document is updated, that is, a correspondence is established between the newest document version identifier and the edition operation version identifier. It should be understood that, according to the correspondence between the newest document version identifier and the edition operation version identifier, an edition operation version identifier corresponding to the newest document version identifier is found.

In step S23302, a corresponding content block version identifier is searched for according to the edition operation version identifier, as the updated content block version identifier.

It should be noted that, a one-to-one correspondence between the edition operation version identifier and the content block version identifier is established. When the edition operation version identifier is determined, a corresponding content block version identifier is searched for according to the correspondence, as the updated content block version identifier.

In step S2340, the content block update content pushing event is performed according to the updated content block version identifier.

In an embodiment, practical content of the content block corresponding to the updated content block version identifier is pushed to the client device, so that the client device updates the current document according to the practical content of the content block corresponding to the updated content block version identifier.

Figure 24:
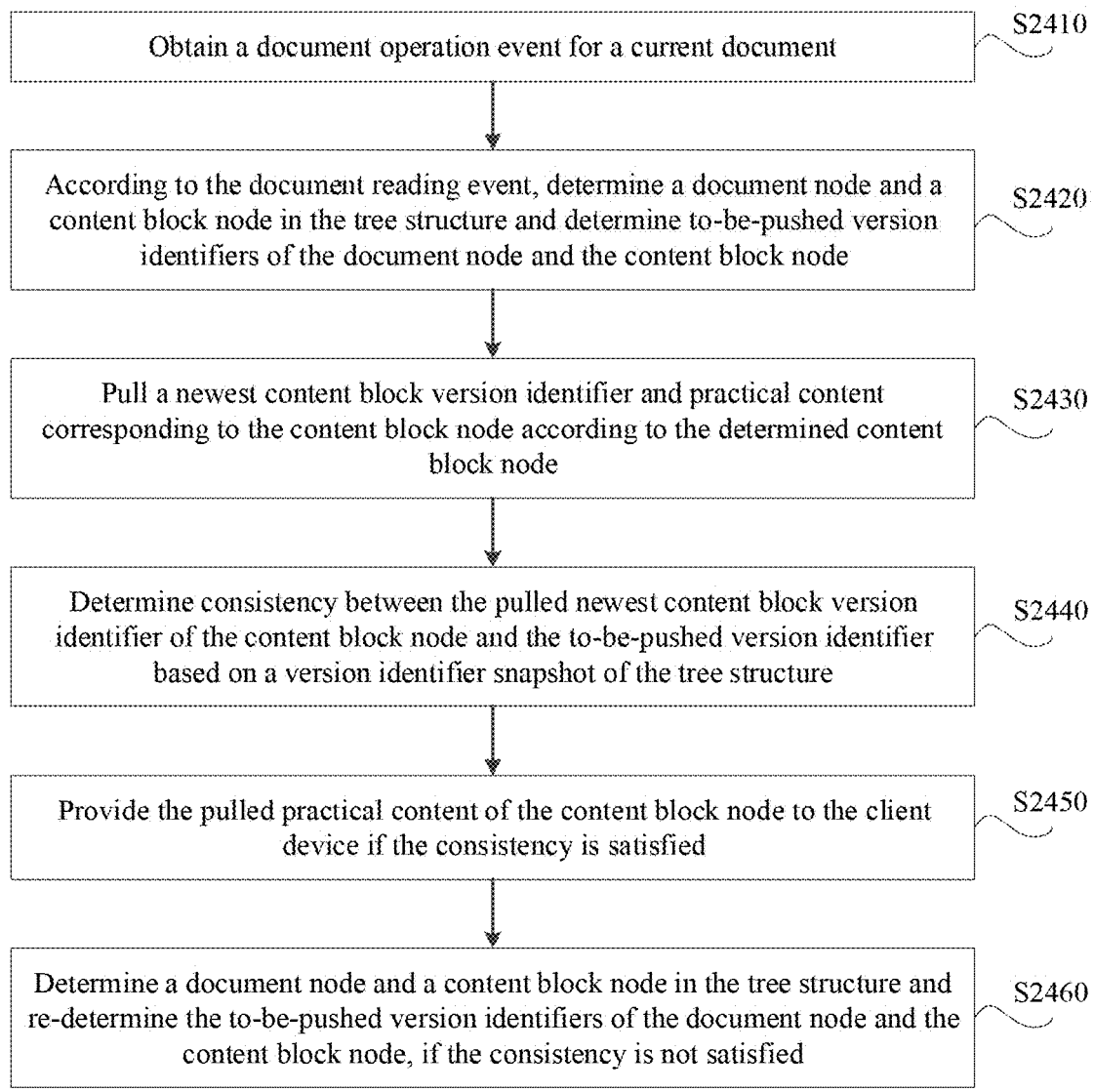
FIG. 24 is a flowchart of a document processing method based on a tree structure according to an embodiment of the present disclosure.

FIG. 24 is a flowchart of a document processing method based on a tree structure according to an embodiment of the present disclosure. This embodiment is based on the above embodiments, steps S1720 and S1730 are further illustrated in a case that the document operation event is a document reading event. As shown in FIG. 24, the method in this embodiment includes steps S2410 to S2460 as follows.

In step S2410, a document operation event for a current document is obtained. The document operation event is a document reading event.

The document reading event may be an event in which a client device opens and initially reads a document. In this case, the client device may send a document reading request to the server, to indicate a document to be read.

In step S2420, according to the document reading event, a corresponding document node and content block node, and to-be-pushed version identifiers of the document node and the content block node are determined in the tree structure.

When the server obtains the document reading event, a document identifier to be read is determined according to the document reading event. Then, a tree structure of the document is pulled from a storage space for the document based on the document identifier. After the tree structure is pulled, TV of the document node and a content block node belonging to the document node are determined, and RV of the content block node is determined. A newest TV of the document node and a newest RV of the content block node are the to-be-pushed version identifiers. A root content block of the document node may serve as a particular content block, and a newest RV of the root content block is determined as the to-be-pushed version identifier.

In step S2430, according to the determined content block node, the newest content block version identifier of the content block node and the practical content of the content block node are pulled.

When the to-be-pushed version identifier of each content block is determined, the practical content of each content block is pulled from the storage space of the server. The pulling may be performed according to the content block node identifier. In the storage space, incremental update content of each version identifier relative to a previous version identifier is stored, and complete content corresponding to the newest version identifier is also stored. The practical content pulled based on the content block node identifier generally includes the newest content block node version identifier and the corresponding complete content.

In step S2440, based on a version identifier snapshot of the tree structure, it is determined whether the pulled newest content block version identifier of content block node is consistent with the to-be-pushed version identifier.

Generally, the version identifier obtained when pulling the tree structure at the first time is consistent with the version identifier obtained when pulling the practical content at the second time. However, a time difference exists between time instants when the two rounds of pulling are performed, and there is a chance that the content block is updated again in the time difference. In this case, new RV is generated for some content block, and new TV is generated for the document node. Therefore, the newest content block version identifier pulled at the second time may be inconsistent with the to-be-pushed version identifier.

For example, it is determined that the to-be-pushed version identifiers are: TV=10, RV of a content block A=3, RV of a content block B=2, and RV of a content block C=5. Update is generated during a process of pulling the practical content of the content block, the RV of the content block A is 3, the RV of the content block B is 3, the RV of the content block C is 5, RV of a newly added content block D is 0, and TV of the document is 12 at this time. Therefore, the newest version identifier of the pulled practical content is inconsistent with the to-be-pushed version identifier. When TV is in one-to-one correspondence with RV of each content block node, a value of the TV is a sum of values of all newest RVs. Therefore, determining consistency of the version identifiers may be performed by determining whether the to-be-pushed document version identifier is equal to the newest document version identifier of the pulled practical content. If a determination result is positive, the pulled version identifier of the practical content is consistent with the to-be-pushed document version identifier; otherwise, the version identifier of the pulled practical content is inconsistent with the to-be-pushed document version identifier. Practically, the consistency may be verified by comparing RVs of the content block nodes one by one.

In step S2450, if the consistency is satisfied, the pulled practical content of the content block node is provided to the client device.

In step S2460, if the consistency is not satisfied, a corresponding document node and content block node, and to-be-pushed version identifiers of the document node and the content block node are re-determined in the tree structure.

There is low probability that update occurs during the two rounds of pulling, and therefore error may be corrected by re-determining the version to be pushed.

In the embodiment, when the to-be-pushed version identifier does not correspond to the newest version identifier, it is indicated that content of the current document pushed from the server to the client device is incomplete. In this case, the correspondence between the newest document version identifier and the to-be-pushed content block version identifier may be adjusted. That is, a content block version identifier of at least one content block corresponding to the newest document version identifier is re-determined as the to-be-pushed content block version identifier, and update content corresponding to the re-determined to-be-pushed content block version identifier is pushed to the client device.

Figure 25:
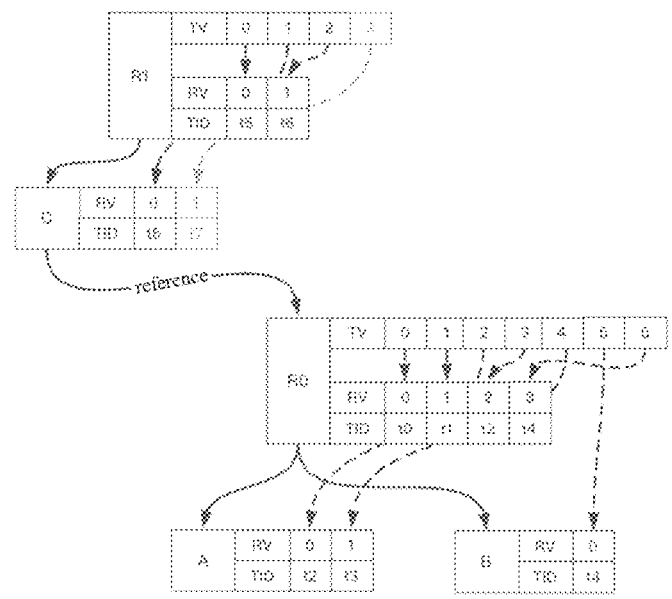
FIG. 25 is a schematic diagram of a document tree structure according to an embodiment of the present disclosure.

FIG. 25 is a schematic diagram of a document tree structure according to an embodiment of the present disclosure. As shown in FIG. 25, a document R1 is created. The document R1 includes a content block C, a document R0, a content block A and a content block B. The content block C makes reference to the document R0, the document R0 makes reference to the content block A and the content block B. As an example, when a user performs operation t6, the content block C is created and RV version 0 of the content block C is generated. Due to the change of the content block C, the TV of the document R1 generates the new version 1. The operation t6 also leads to change of content of the document R1, thus the RV of the document R1 generates a new version 1. Due to change of content of the document R1, the TV of the document R1 generates a new version again, and the TV of the document R1 generates a new version 2. That is, one transaction operation t6 generates two TV versions. When the user performs an operation t7, version change occurs for the content block C. That is, the RV of the content block C generates a new version 1.

It should be noted that, one document operation event may lead to change of one or more content blocks, and the RV is changed accordingly. Change of each content block leads to TV change. Therefore, the TV and the document node in the tree structure are in one-to-one correspondence. Alternatively, the document operation is atomic, that is, the TV in the document may be in one-to-one correspondence with each TID.

Figure 26:
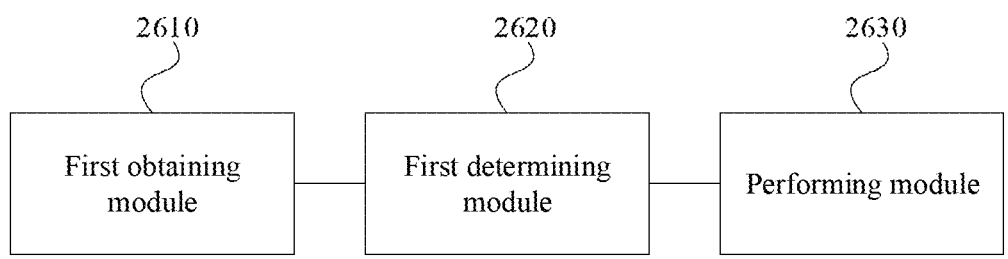
FIG. 26 is a structural block diagram of a document processing apparatus based on a tree structure according to an embodiment of the present disclosure.

FIG. 26 is a structural block diagram of a document processing apparatus based on a tree structure according to an embodiment of the present disclosure. As shown in FIG. 26, the document processing apparatus based on the tree structure includes a first obtaining module 2610, a first determining module 2620 and a performing module 2630.

The first obtaining module is configured to: obtain a document operation event for a current document.

The first determining module 2620 is configured to: determine, according to the document operation event, a document node and/or a content block node in a tree structure of the current document.

The performing module 2630 is configured to: perform the document operation event according to a correspondence between a document version identifier of the document node and a content block version identifier of the content block node.

The document includes at least one content block, the tree structure includes a document node and a content block node; a parent-child relationship between the document node and the content block node represents affiliation between the document and the content block; a document version identifier sequence is recorded in the document node, a content block version identifier sequence is recorded for the content block node; and the document version identifier is used to represent update of the content block of the document.

Based the above embodiments, the content blocks belonging to the document include a root content block, and a content block version identifier sequence of the root content block is recorded in the document node.

Based the above embodiments, an editing operation identifier sequence is recorded in the document node and the content block node, and the editing operation identifier is used to represent an editing operation for updating the content block.

Based on the above embodiments, the document processing apparatus based on the tree structure further includes a second obtaining module, a first update module and a second update module.

The second obtaining module is configured to obtain a document editing event for the current document.

The first update module is configured to: according to an editing operation in the document editing event, update an editing operation identifier and a content block version identifier of the content block node in the tree structure, or update the parent-child relationship between the content block node and the document node.

The second update module is configured to update, according to the editing operation, the editing operation identifier and the document version identifier of the document node.

Based on the above embodiments, if the edition operation includes a content update operation for the content block, the first update module includes a first determining unit, a first adding unit and a second adding unit.

The first determining unit is configured to: determine a content block according to the editing operation.

The first adding unit is configured to: add a new editing operation identifier in the editing operation identifier sequence of the content block node of the content block.

The second adding unit is configured to: add a new content block version identifier in the content block version identifier sequence of the content block node.

Accordingly, the second update module is configured to: add a new editing operation identifier to the editing operation identifier sequence of the document node, and add a new document version identifier to the document version identifier sequence of the document node, where the new document version identifier corresponds to the new content block version identifier.

Based on the above embodiments, the first determining unit is configured to: determine at least two content blocks according to the editing operation.

Accordingly, there is a one-to-one correspondence between the new document version identifier and the new content version identifier, or one new document version identifier corresponds to at least two new content block version identifiers added by the editing operation.

Based on the above embodiments, if the edition operation includes a content block adding operation, the second update module includes a second determining unit and a third adding unit.

The second determining unit is configured to: determine a document node according to the editing operation.

The third adding unit is configured to: add a new editing operation identifier to the editing operation identifier sequence of the document node, and add a new document version identifier to the document version identifier sequence of the document node.

The first update module is configured to: according to the editing operation, add a new content block node in the tree structure, create a new content block version identifier in the content block node, and establish a correspondence between the new content block version identifier and the new document version identifier.

Based on the above embodiments, if the edition operation includes a content block delete operation, the first update module includes a third determining unit and a delete unit.

The third determining unit is configured to: determine a content block according to the editing operation.

The delete unit is configured to: delete the parent-child relationship between the content block node of the content block and the document node.

Accordingly, the second update module is configured to: according to the editing operation, add a new editing operation identifier to the editing operation identifier sequence of the document node, and add a new document version identifier to the document version identifier sequence of the document node.

Based on the above embodiments, if the document operation event is a version change event, the first determining module is configured to: according to the version change event, determine a document node in the tree structure of the current document and a document version identifier to which the version change event points.

Accordingly, the performing module includes: a searching unit, a fourth determining unit and a first performing unit.

The searching unit is configured to: search, according to the document version identifier, for a content block version identifier of each content block node based on a version identifier snapshot of the tree structure.

The fourth determining unit is configured to: determine to-be-changed content of each content block node according to the content block version identifier of each content block node.

The first performing unit is configured to: perform the document change event according to the to-be-changed content of each content block node.

Based on the above embodiments, the performing module further includes a fourth adding unit, configured to: after the performing the document change event according to the to-be-changed content of the content block node, add, according to the to-be-changed content of the document change event, a new editing operation identifier, a content block version identifier and a document version identifier to the document node, and add a new editing operation identifier and a content block version identifier to each content block.

Based on the above embodiments, if the document operation event is a content block update content pushing event, the first determining module is configured to: according to the content block update content pushing event, determine a content block node in the tree structure, and determining a newest document version identifier of a document node to which the content block node belongs.

Accordingly, the performing module includes a fifth determining unit and a second performing unit.

The fifth determining unit is configured to: determine an updated content block version identifier corresponding to the newest document version identifier based on a version identifier snapshot of the tree structure.

The second performing unit is configured to perform the content block update content pushing event according to the updated content block version identifier.

Based on the above embodiments, the fifth determining unit includes a first determining subunit and a searching subunit.

The first determining subunit is configured to: determine an editing operation version identifier corresponding to the newest document version identifier based on a version identifier snapshot of the tree structure.

The searching subunit is configured to: search, according to the editing operation version identifier, for a content block version identifier as the updated content block version identifier.

Based on the above embodiments, if the document operation event is a document reading event, the first determining module is configured to: according to the document reading event, determine a document node and a content block node in the tree structure and determine to-be-pushed version identifiers of the document node and the content block node.

Accordingly, the performing module includes: a pulling unit, a sixth determining unit and a third performing unit.

The pulling unit is configured to: pull a newest content block version identifier and practical content corresponding to the content block node according to the determined content block node.

The sixth determining unit is configured to: determine consistency between the pulled newest content block version identifier of the content block node and the to-be-pushed version identifier based on a version identifier snapshot of the tree structure.

The third performing unit is configured to: provide the pulled practical content of the content block node to the client device if the consistency is satisfied.

Based on the above embodiments, the performing module further includes a fourth performing unit configured to: re-determine a document node and a content block node in the tree structure and re-determine the to-be-pushed version identifiers of the document node and the content block node, if the consistency is not satisfied.

Figure 27:
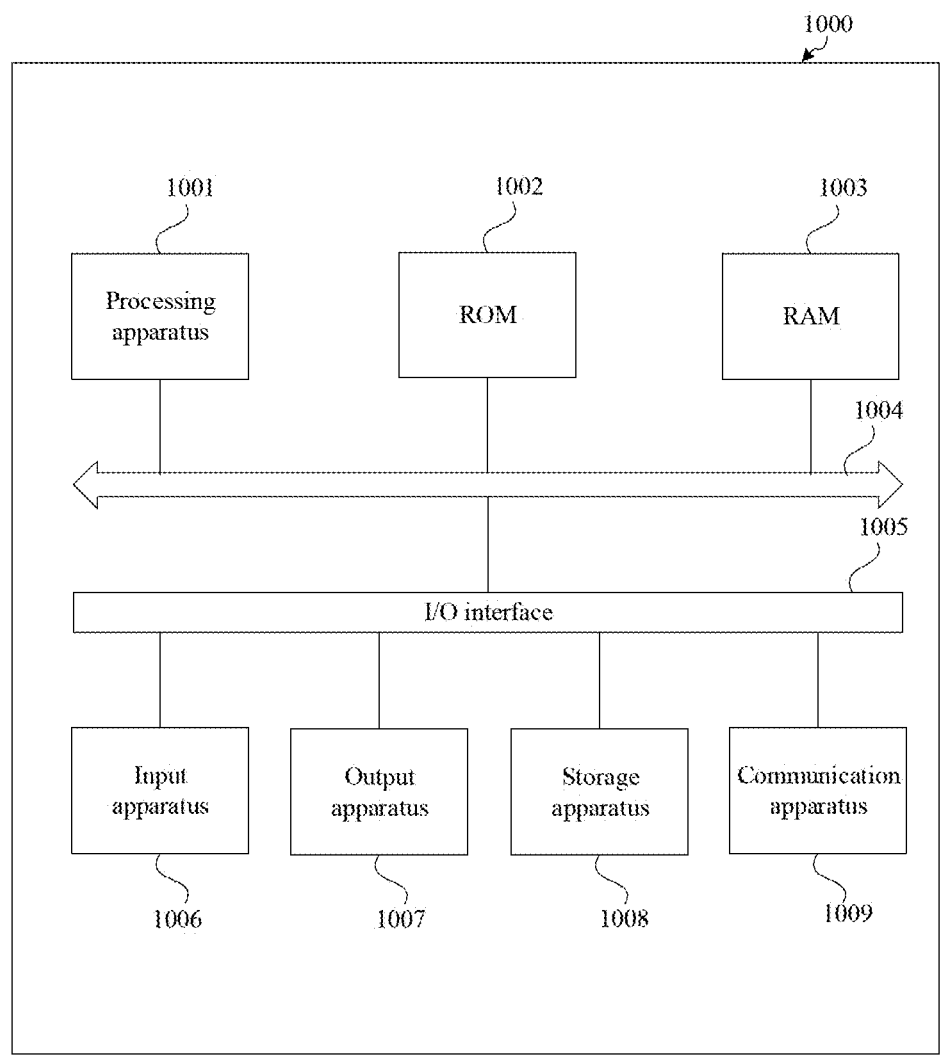
FIG. 27 is a structural block diagram of a device according to an embodiment of the present disclosure.

FIG. 27 is a structural block diagram of a device according to an embodiment of the present disclosure. Reference is made to FIG. 27 which shows a schematic structural diagram of an electronic device 1000 for implementing the embodiments of the present disclosure (the terminal device or the server shown in FIG. 27). The terminal device according to the embodiment of the present disclosure may include but not limited to a mobile terminal such as a mobile phone, a notebook computer, a digital broadcast receiver, a personal digital assistance (PDA), a tablet computer (PAD), a portable multimedia player (PMP) and a vehicle terminal (for example a vehicle navigation terminal); and a fixed terminal such as digital TV and a desktop computer. The electronic device in FIG. 27 is schematic, and is not intended to limit the function and use scope of the embodiments of the present disclosure.

As shown in FIG. 27, the electronic device 1000 may include a processing apparatus (such as a central processor and a graphic processor) 1001. The processing apparatus may perform various appropriate actions and processing by executing programs stored in a read-only memory (ROM) 1002 or programs uploaded from a storage apparatus 1006 to a random access memory (RAM) 1003. Various programs and data required for operations of the electronic device 1000 are also stored in the RAM 1003. The processing apparatus 1001, the ROM 1002 and the RAM 1003 are connected to each other through the bus 1004. An input/output (I/O) interface 1005 is also connected to the bus 1004.

Generally, the following components are connected to the I/O interface 1005: an input apparatus 1006 such as a touch screen, a touch panel, a keyboard, a mouse, a camera, a microphone, an accelerometer, and gyroscope; an output apparatus 1007 such as a liquid crystal display (LCD), a loudspeaker and a vibrator; a storage apparatus 1006 such as a magnetic tape and a hard disk; and a communication apparatus 1009. The communication apparatus 1009 may allow the electronic device 1000 to communicate with other device in a wired or wireless manner to exchange data. Although FIG. 27 shows the electronic device 1000 provided with various apparatuses, it should be understood that not all shown apparatuses are necessary. Alternatively, more or less apparatuses may be included.

According to the embodiments of the present disclosure, a process described in the flowchart may be implemented by computer software programs. For example, according to an embodiment of the present disclosure, a computer program product including computer program carried on a non-transient computer readable medium is provided. The computer program includes program codes for performing the method shown in the flowchart. In such embodiment, the computer program may be downloaded and installed from the network through the communication apparatus 1009, installed from the storage apparatus 1006 or installed from the ROM 1002. The computer program is executed by the processing apparatus 1001 to perform functions defined in the methods described in the embodiments of the present disclosure.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may include but not limited to an electromagnetic signal, an optical signal or any combination thereof. The computer readable signal medium may be any computer readable medium other than the computer readable storage medium. The computer readable signal medium may send, propagate or transmit programs used by the instruction execution system, apparatus or device or the programs used in combination with the instruction execution system, apparatus or device. The program code included in the computer readable medium may be transmitted via any appropriate medium, including but not limited to an electric wire, an optical fiber, radio frequency (RF) or any appropriate combination thereof.

In some embodiments, the client device and the server may perform communication by using any known network protocol such as Hyper Text Transfer Protocol (HTTP) or any network protocol to be developed, and may connect with digital data in any form or carried in any medium (for example, a communication network). The communication network includes a local area network (LAN), a wide area network (WAN), an international network (for example the internet), a peer-to-peer network (for example ad hoc peer-to-peer network), and any known network or network to be developed.

The computer readable medium may be included in the electronic device described above, or may exist independently and is not installed in the electronic device.

The computer readable storage medium carries one or more programs. The one or more programs, when being executed by the electronic device, cause the electronic device to perform: determining, in response to a connection operation for a target content block in a current page, a connection content block of the target content block, and displaying, at an associated position of one of the target content block and the connection content block, a connection identifier of the other of the target content block and the connection content block, to view the other content block by using the connection identifier; or recording, in response to a connection operation for connecting a first content block and a second content block, a connection relationship between the first content block and the second content block in connection characteristic information of the first content block and connection characteristic information of the second content block, searching, in response to a connection content block output request of the first content block, for the connection characteristic information of the first content block to determine a content block in connection with the first content block, and obtaining content data information of the content block in connection with the first content block, and outputting the content data information.

The computer readable storage medium carries one or more programs. The one or more programs, when being executed by the electronic device, cause the electronic device to perform: monitor an update state of a document according to a document version identifier of a document node in a tree structure of the document, wherein the document comprises at least one content block, the tree structure comprises a document node and a content block node, a parent-child relationship between the document node and the content block node represents affiliation between the document and the content block; a document version identifier sequence is recorded in the document node and the document version identifier is used to represent update of a content block belonging to the document; determine, in response to detecting an update of a content object in a room, a client device in the room subscribing the content object, wherein the content object comprises a document; and provide update content of the content object in the room to the client device, to allow the client device to update the content object.

The computer readable storage medium carries one or more programs. The one or more programs, when being executed by the electronic device, cause the electronic device to perform: obtain a document operation event for a current document; determine, according to the document operation event, a document node and/or a content block node in a tree structure of the current document; and perform the document operation event according to a correspondence between a document version identifier of the document node and a content block version identifier of the content block node.

The document includes at least one content block, the tree structure comprises a document node and a content block node; a parent-child relationship between the document node and the content block node represents affiliation between the document and the content block; a document version identifier sequence is recorded in the document node, a content block version identifier sequence is recorded for the content block node; and the document version identifier is used to represent update of the content block of the document.

Computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams shown in the drawings show a system architecture, function and operation which may be implemented by the system, method and computer program product according to the embodiments of the present disclosure. Each block in the flowcharts or the block diagram may represent a part of a module, a program section or codes including executable instructions for implementing specified logic functions. It should be noted that, in alternative embodiment, functions denoted in the blocks may be performed in an order different from the order denoted in the drawing. For example, operations in two blocks connected successively may be performed in parallel, or may be performed in an opposite order, depending on the involved function. It should be noted that, each block in the block diagrams and/or flowcharts, and a combination of blocks in the block diagrams and/or flowcharts may be implemented by a dedicated hardware system for performing specified functions or operations, or may be implemented by a combination of dedicated hardware and computer instructions.

Units involved in the embodiments of the present disclosure may be implemented by software or hardware. Names of the units do not limit the units in a certain case. For example, the first obtaining unit may be referred to as "a unit configured to obtain at least two internet protocol addresses".

The functions described above may be partially performed by one or more hardware logic components. For example, the hardware logic components include: a field programmable gate array (FPGA), an application specific integrated circuit (ASIC), an application specific standard product (ASSP), a system on chip (SOC), a complex programmable logic device (CPLD) and so on.

In the context of the present disclosure, the machine readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof.

A page content processing method is provided according to one or more embodiments of the present disclosure. The method includes: determining, in response to a connection operation for a target content block in a current page, a connection content block of the target content block; and displaying, at an associated position of one of the target content block and the connection content block, a connection identifier of the other of the target content block and the connection content block, to view the other content block by using the connection identifier.

According to one or more embodiments of the present disclosure, the displaying, at an associated position of one of the target content block and the connection content block, a connection identifier of the other of the target content block and the connection content block, to view the other content block by using the connection identifier includes: displaying, at an associated position of the target content block, an active connection identifier indicating connecting to the connection content block, to view the connection content block in the current page by using the active connection identifier; and displaying, at an associated position of the connection content block, a passive connection identifier indicating being connected to the target content block, to view the target content block in a page where the connection content block is located by using the passive connection identifier.

According to one or more embodiments of the present disclosure, the determining, in response to a connection operation for a target content block in a current page, a connection content block of the target content block includes: displaying, in response to the connection operation for the target content block in the current page, a connection search interface; and displaying at least one content block in the connection search interface, and determining, in response to a selection operation on the at least one content block, a selected content block as the connection content block of the target content block.

According to one or more embodiments of the present disclosure, a connection identifier displayed at an associated position of one of the target content block and the connection content block includes at least one of: a passive connection identifier indicating the one content block being connected to another content block; and an active connection identifier indicating the one content block connecting to another content block.

According to one or more embodiments of the present disclosure, after the displaying, at an associated position of one of the target content block and the connection content block, a connection identifier of the other of the target content block and the connection content block, the method further includes: displaying, in response to a preset operation, one or more content blocks associated with the target content block in a preset region of the current page; and jumping, in response to a triggering operation on a content block of the one or more content blocks displayed in the preset region, from the current page to a page where the displayed content block is located.

According to one or more embodiments of the present disclosure, in the above method, the jumping from the current page to a page where the displayed content block is located includes: jumping from the current page to a position of the content block in the page where the displayed content block is located.

According to one or more embodiments of the present disclosure, the displaying a content block associated with the target content block in a preset region of the current page includes: viewing a connection relationship recorded in connection characteristic information of the target content block, and determining, according to a delete identifier set corresponding to the connection relationship, whether the content block associated with the target content block is deleted; and displaying, in the preset region of the current page, the content block associated with the target content block that is not deleted.

According to one or more embodiments of the present disclosure, in the above method, the delete identifier set corresponding to the connection relationship is recorded in connection characteristic information of the content block indicated by the connection relationship or other data region.

According to one or more embodiments of the present disclosure, after the determining, in response to a connection operation for a target content block in a current page, a connection content block of the target content block, the method further includes: recording a connection relationship between the target content block and the connection content block in connection characteristic information of the target content block and the connection content block.

According to one or more embodiments of the present disclosure, the method further includes: determining, in response to a delete operation on the target content block, a content block in connection with the target content block according to the connection relationship recorded in the connection characteristic information of the target content block, and updating a delete identifier set by the determined content block for the target content block.

According to one or more embodiments of the present disclosure, in the above method, the preset region includes a sidebar, a lower half display region or an upper half display region of the current page; or the content blocks to which the target content block actively connects and passively connects are displayed in different sub-regions of the preset region, or a content block indicated by a connection identifier specified by the preset operation is highlighted.

According to one or more embodiments of the present disclosure, in the above method, each connection identifier displayed at an associated position of the target content block has a classification label associated with the connection identifier, and the displaying a content block associated with the target content block in a preset region of the current page includes: selectively displaying, in the preset region of the current page, the content blocks associated with the target content block according to a classification label of a triggered connection identifier.

According to one or more embodiments of the present disclosure, in the above method, the current page includes a document.

According to one or more embodiments of the present disclosure, in the above method, before the determining, in response to a connection operation for a target content block in a current page, a connection content block of the target content block, the method further includes: creating the target content block in the current page, and configuring a connection control for the target content block, to perform the connection operation by using the connection control.

According to one or more embodiments of the present disclosure, in the above method, the connection content block is a content block in the current page other than the target content block, or is a content block in page other than the current page.

According to one or more embodiments of the present disclosure, the connection content block and the target content block have the same or different types of content, or classification labels of the connection identifiers displayed at associated positions of the connection content block and the target content block are the same or different.

According to one or more embodiments of the present disclosure, in the above method, the content block includes at least one of: a content block of a text type, a content block of a multimedia type, a content block of a table type and a content block of a program type; and the classification label includes at least one of: a target, a task and a report.

According to one or more embodiments of the present disclosure, an information processing method is provided. The method includes: recording, in response to a connection operation for connecting a first content block and a second content block, a connection relationship between the first content block and the second content block in connection characteristic information of the first content block and connection characteristic information of the second content block; searching, in response to a connection content block output request of the first content block, for the connection characteristic information of the first content block to determine a content block in connection with the first content block; and obtaining content data information of the content block in connection with the first content block, and outputting the content data information.

According to one or more embodiments of the present disclosure, the method further includes: determining, in response to a delete operation for the first content block, a content block in connection with the first content block according to the connection characteristic information of the first content block, and updating a delete identifier set by the content block in connection with the first content block for the first content block.

According to one or more embodiments of the present disclosure, after the recording a connection relationship between the first content block and the second content block in connection characteristic information of the first content block and connection characteristic information of the second content block, the method further includes: updating the connection characteristic information of the first content block and the second content block in a document structure.

According to one or more embodiments of the present disclosure, the first content block and the second content block belong to a same document or different documents. According to one or more embodiments of the present disclosure, a page content processing apparatus is provided. The apparatus includes: a connection response module and a content connection module.

The connection response module is configured to determine, in response to a connection operation for a target content block in a current page, a connection content block of the target content block.

The content connection module is configured to display, at an associated position of one of the target content block and the connection content block, a connection identifier of the other of the target content block and the connection content block, to view the other content block by using the connection identifier.

According to one or more embodiments of the present disclosure, in the apparatus, the content connection module is configured to: display, at an associated position of the target content block, an active connection identifier indicating connecting to the connection content block, to view the connection content block in the current page by using the active connection identifier; and display, at an associated position of the connection content block, a passive connection identifier indicating being connected to the target content block, to view the target content block in a page where the connection content block is located by using the passive connection identifier.

According to one or more embodiments of the present disclosure, in the above apparatus, the connection response module is configured to: display, in response to the connection operation for the target content block in the current page, a connection search interface; and display at least one content block in the connection search interface, and determine, in response to a selection operation on the at least one content block, a selected content block as the connection content block of the target content block.

According to one or more embodiments of the present disclosure, in the above apparatus, a connection identifier displayed at an associated position of one of the target content block and the connection content block comprises at least one of: a passive connection identifier indicating the one content block being connected to another content block; and an active connection identifier indicating the one content block connecting to another content block.

According to one or more embodiments of the present disclosure, the apparatus further includes a connection display module and a page jumping module.

The connection display module is configured to: display, in response to a preset operation, one or more content blocks associated with the target content block in a preset region of the current page.

The page jumping module is configured to: jump, in response to a triggering operation on a content block of the one or more content blocks displayed in the preset region, from the current page to a page where the displayed content block is located.

According to one or more embodiments of the present disclosure, in the above apparatus, the page jumping module is configured to: jump from the current page to a position of the content block in the page where the displayed content block is located.

According to one or more embodiments of the present disclosure, in the above apparatus, the connection display module is configured to: view a connection relationship recorded in connection characteristic information of the target content block, and determine, according to a delete identifier set corresponding to the connection relationship, whether the content block associated with the target content block is deleted; and display, in the preset region of the current page, the content block associated with the target content block that is not deleted.

According to one or more embodiments of the present disclosure, in the above apparatus, the delete identifier set corresponding to the connection relationship is recorded in connection characteristic information of the content block indicated by the connection relationship or other data region.

According to one or more embodiments of the present disclosure, the apparatus further includes a connection relationship recording module, configured to: record a connection relationship between the target content block and the connection content block in connection characteristic information of the target content block and the connection content block. The preset region includes a sidebar, a lower half display region or an upper half display region of the current page; or the content blocks to which the target content block actively connects and passively connects are displayed in different sub-regions of the preset region, or a content block indicated by a connection identifier specified by the preset operation is highlighted.

According to one or more embodiments of the present disclosure, in the above apparatus, each connection identifier displayed at an associated position of the target content block has a classification label associated with the connection identifier. The connection display module is configured to: selectively display, in the preset region of the current page, the content blocks associated with the target content block according to a classification label of a triggered connection identifier.

According to one or more embodiments of the present disclosure, in the above apparatus, the current page includes a document.

According to one or more embodiments of the present disclosure, the apparatus further includes a content creating module, configured to: create the target content block in the current page, and configure a connection control for the target content block, to perform the connection operation by using the connection control.

According to one or more embodiments of the present disclosure, in the above apparatus, the connection content block is a content block in the current page other than the target content block, or is a content block in page other than the current page.

According to one or more embodiments of the present disclosure, in the apparatus, the connection content block and the target content block have the same or different types of content, or classification labels of the connection identifiers displayed at associated positions of the connection content block and the target content block are the same or different.

According to one or more embodiments of the present disclosure, in the apparatus, the content block includes at least one of: a content block of a text type, a content block of a multimedia type, a content block of a table type and a content block of a program type; and the classification label includes at least one of: a target, a task and a report.

According to one or more embodiments of the present disclosure, an information processing apparatus is provided. The apparatus includes: a connection relationship recording module, a connection content searching module and a connection content output module.

The connection relationship recording module is configured to: record, in response to a connection operation for connecting a first content block and a second content block, a connection relationship between the first content block and the second content block in connection characteristic information of the first content block and connection characteristic information of the second content block.

The connection content searching module is configured to: search, in response to a connection content block output request of the first content block, for the connection characteristic information of the first content block to determine a content block in connection with the first content block.

The connection content output module is configured to: obtain content data information of the content block in connection with the first content block, and output the content data information.

According to one or more embodiments of the present disclosure, the apparatus further includes a content delete module, configured to: determine, in response to a delete operation for the first content block, a content block in connection with the first content block according to the connection characteristic information of the first content block, and updating a delete identifier set by the content block in connection with the first content block for the first content block.

According to one or more embodiments of the present disclosure, the apparatus further includes a document update module, configured to: update the connection characteristic information of the first content block and the second content block in a document structure.

According to one or more embodiments of the present disclosure, in the apparatus, the first content block and the second content block belong to a same document or different documents. According to one or more embodiments of the present disclosure, a computer device is provided. The device includes: one or more processors; and a memory configured to store one or more programs. The one or more programs, when being executed by the one or more processors, cause the one or more processors to perform the page content processing method according to any embodiment of the present disclosure, or perform the information processing method according to any embodiment of the present disclosure.

According to one or more embodiments of the present disclosure, a readable medium storing a computer program is provided. The program is executed by a processor to implement the page content processing method according to any embodiments of the present disclosure, or implement the information processing method according to any embodiment of the present disclosure.

According to one or more embodiments of the present disclosure, a document synchronization method is provided. The method includes: monitoring an update state of a document according to a document version identifier of a document node in a tree structure of the document, where the document includes at least one content block, the tree structure comprises a document node and a content block node, a parent-child relationship between the document node and the content block node represents affiliation between the document and the content block; a document version identifier sequence is recorded in the document node and the document version identifier is used to represent update of a content block belonging to the document; determine, in response to detecting an update of a content object in a room, a client device in the room subscribing the content object, wherein the content object comprises a document; and provide update content of the content object in the room to the client device, to allow the client device to update the content object.

According to one or more embodiments of the present disclosure, the monitoring an update state of a document according to a document version identifier of a document node in a tree structure of the document includes: monitoring a document version identifier sequence of the document node in the tree structure of the document, and determining the document is updated when a new document version identifier is generated.

According to one or more embodiments of the present disclosure, a content block version identifier sequence is recorded in the content node, and the method further includes: adding a new document version identifier in the document version identifier sequence when a new content block version identifier is generated in any content block node belonging to the document node.

According to one or more embodiments of the present disclosure, the content object further includes a content block. The method further includes: monitoring an update state of the content block according to a content block version identifier of the content node in the tree structure, where a content block version identifier sequence is recorded for the content block node, and the content block version identifier is used to represent content update of the content block.

According to one or more embodiments of the present disclosure, the providing update content of the content object in the room to the client device includes: searching, according to the document version identifier of the document node in the tree structure, for a new content block version identifier of each content block node where the new content block version identifier corresponds to the new document version identifier, based on a version identifier snapshot of the tree structure; and determining update content of a content block indicated by the new content block version identifier, and providing the update content to the client device.

According to one or more embodiments of the present disclosure, the method further includes: receiving a room subscribing request triggered when the client device loads the document, and determining a content object to which the room subscribing request points; and adding the client device to a room corresponding to the content object.

According to one or more embodiments of the present disclosure, the determining a content object to which the room subscribing request points includes: determining a currently loaded document to which the room subscribing request points; and determining in the tree structure a document node corresponding to the currently loaded document, and determining a document node identifier of the document node as the content object to which the room subscribing request points.

According to one or more embodiments of the present disclosure, after the determining in the tree structure a document node corresponding to the currently loaded document, the method further includes: determining a content block node of a reverse connection content block having a reverse reference relationship with the document node; and determining an identifier of the content block node having the reverse reference relationship as the content object to which the room subscribing request points.

According to one or more embodiments of the present disclosure, the method further includes: receiving a heartbeat request sent by the client device; detecting, according to a document version identifier of a document node and/or a content block version identifier of a content block node in the tree structure, whether a target document or a target content block corresponding to the heartbeat request is updated; and providing an updated version identifier to the client device if the target document or the target content block is updated.

According to one or more embodiments of the present disclosure, the method further includes: receiving a complementary update request sent by the client device; and obtaining update content according to a version identifier of a target document or target content block specified by the complementary update request, and feeding the update content back to the client device.

According to one or more embodiments of the present disclosure, a document synchronization method is provided. The method includes: sending a content update request to a server for a currently processed document of a client device, to request the server to determine document content according to a document version identifier in the content update request, wherein the document comprises at least one content block, the tree structure comprises a document node and a content block node, a parent-child relationship between the document node and the content block node represents affiliation between the document and the content block; wherein a document version identifier sequence is recorded in the document node, and the document version identifier is used to represent update of a content block belonging to the document; obtaining the document version identifier and a content block version identifier of a content block belonging to the document fed back by the server; and obtaining practical content by the client device according to the document version identifier and the content block version identifier.

In the above method, the sending a content update request to a server for a currently processed document of a client device includes: determining, for the currently processed document of the client device, at least one reference content block of the currently processed document, and sending to the server the update request carrying a document version identifier of the currently processed document and a content block identifier of the reference content block.

In the above method, the sending a content update request to a server for a currently processed document of a client device includes at least one of: sending a content update request to the server when the client device loads the currently processed document; and sending a content update request to the server when the client device edits the currently processed document.

In the above method, the content update request is a room-adding request or a heartbeat request.

Document content may be maintained by operating the tree structure by the server by using the document processing method based on a tree structure. In an embodiment, a document processing client device may pre-load a tree structure to process the document locally, and instructs the server to update. In the client device, a content management module, a flow management module, a flow synchronization module may be provided to perform different functions to perform the document processing based on a tree structure by the client device. A document processing method performed by the document processing client device includes:

obtaining, by the content management module, a document content edition event of a document currently edited, where the document content edition event includes an edition operation and an edition content; determining, by the content management module, a corresponding node in a tree structure of the document currently edited that is cached locally according to the edition operation and the edition content, and determining, by the content management module, update content of the node; determining, by the content management module, an operation identifier and a content version identifier added in the node of the tree structure according to the edition operation and the update content; generating, by the content management module, a document change event, and providing, by the content management module, the document change event to the flow management module in the document processing client device, where the document change event includes the update content, the added operation identifier and the content version identifier; caching, by the flow management module, the document change event in a local queue; sending, by the flow synchronization module, the update content, the added operation identifier and the content block version identifier provided by the flow management module to a server, to request update the tree structure and document content stored in the server; receiving, by the flow synchronization module, an update notification transmitted by the server, and transmitting, by the flow synchronization module, the flow management module in the document processing client device; determining, by the flow management module, whether a conflict occurs to the document change event cached locally according to update notification transmitted by the server; and instructing, by the flow management module if no conflict occurs, the content management module to update document content and the tree structure of the document currently edited according to the document change event, and delete the cached document change event.

In the above solution, the determining, by the flow management module, whether a conflict occurs to the document change event cached locally according to update notification transmitted by the server may include: determining no conflict occurs, if the flow management module identifies that the update notification transmitted by the server is a feedback notification according to a local document change event; and if the flow management module identifies that the update notification transmitted by the server is generated in response to an update event of another client device, matching the document change event in the update notification with the document change event cached locally to determine whether a conflict occurs.

According to one or more embodiments of the present disclosure, a document processing method, apparatus and device based on a tree structure and a medium are provided. The method includes: obtaining a document operation event for a current document; determining, according to the document operation event, a document node and/or a content block node in a tree structure of the current document; performing the document operation event according to a correspondence between a document version identifier of the document node and a content block version identifier of the content block node, where the document comprises at least one content block, the tree structure comprises a document node and a content block node; a parent-child relationship between the document node and the content block node represents affiliation between the document and the content block; a document version identifier sequence is recorded in the document node, a content block version identifier sequence is recorded for the content block node; and the document version identifier is used to represent update of the content block of the document.

According to one or more embodiments of the present disclosure, the content blocks belonging to the document includes a root content block, and a content block version identifier sequence of the root content block is recorded in the document node.

According to one or more embodiments of the present disclosure, an editing operation identifier sequence is recorded in the document node and the content block node, and the editing operation identifier is used to represent an editing operation for updating the content block.

According to one or more embodiments of the present disclosure, the method further includes: obtaining a document editing event for the current document; according to an editing operation in the document editing event, updating an editing operation identifier and a content block version identifier of the content block node in the tree structure, or updating the parent-child relationship between the content block node and the document node; and updating, according to the editing operation, the editing operation identifier and the document version identifier of the document node.

According to one or more embodiments of the present disclosure, if the editing operation includes a content update operation for the content block, the updating an editing operation identifier and a content block version identifier of the content block node in the tree structure according to an editing operation in the document editing event includes: determining a content block according to the editing operation; adding a new editing operation identifier in the editing operation identifier sequence of the content block node of the content block; and adding a new content block version identifier in the content block version identifier sequence of the content block node.

Accordingly, the updating, according to the editing operation, the editing operation identifier and the document version identifier of the document node includes: adding a new editing operation identifier to the editing operation identifier sequence of the document node, and adding a new document version identifier to the document version identifier sequence of the document node, where the new document version identifier corresponds to the new content block version identifier.

According to one or more embodiments of the present disclosure, the determining a content block according to the editing operation includes: determining at least two content blocks according to the editing operation, where there is a one-to-one correspondence between the new document version identifier and the new content version identifier, or one new document version identifier corresponds to at least two new content block version identifiers added by the editing operation.

According to one or more embodiments of the present disclosure, if the editing operation includes a content block adding operation, the updating, according to the editing operation, the editing operation identifier and the document version identifier of the document node includes: determining a document node according to the editing operation; and adding a new editing operation identifier to the editing operation identifier sequence of the document node, and adding a new document version identifier to the document version identifier sequence of the document node.

Accordingly, the updating, according to the editing operation, the editing operation identifier and the document version identifier of the document node includes: according to the editing operation, adding a new content block node in the tree structure, creating a new content block version identifier in the content block node, and establishing a correspondence between the new content block version identifier and the new document version identifier.

According to one or more embodiments, if the editing operation includes a content block delete operation, the updating the parent-child relationship between the content block node and the document node includes: determining a content block according to the editing operation; and deleting the parent-child relationship between the content block node of the content block and the document node.

Accordingly, the updating, according to the editing operation, the editing operation identifier and the document version identifier of the document node includes: according to the editing operation, adding a new editing operation identifier to the editing operation identifier sequence of the document node, and adding a new document version identifier to the document version identifier sequence of the document node.

According to one or more embodiments of the present disclosure, the document operation event is a version change event, and the determining, according to the document operation event, a document node in a tree structure of the current document includes: according to the version change event, determining a document node in the tree structure of the current document and a document version identifier to which the version change event points.

Accordingly, the performing the document operation event according to a correspondence between a document version identifier of the document node and a content block version identifier of the content block node includes: searching, according to the document version identifier, for a content block version identifier of each content block node based on a version identifier snapshot of the tree structure; determining to-be-changed content of each content block node according to the content block version identifier of each content block node; and performing the document change event according to the to-be-changed content of the content block node.

According to one or more embodiments of the present disclosure, after the performing the document change event according to the to-be-changed content of the content block node, the method further includes: according to the to-be-changed content of the document change event, adding a new editing operation identifier, a content block version identifier and a document version identifier to the document node, and adding a new editing operation identifier and a content block version identifier to the content block.

According to one or more embodiments of the present disclosure, if the document operation event is a content block update content pushing event, the determining a content block node in the tree structure of the current document according to the document operation event includes: according to the content block update content pushing event, determining a content block node in the tree structure, and determining a newest document version identifier of a document node to which the content block node belongs.

Accordingly, the performing the document operation event according to a correspondence between a document version identifier of the document node and a content block version identifier of the content block node includes: determining an updated content block version identifier corresponding to the newest document version identifier based on a version identifier snapshot of the tree structure; and performing the content block update content pushing event according to the updated content block version identifier.

According to one or more embodiments of the present disclosure, the determining an updated content block version identifier corresponding to the newest document version identifier based on a version identifier snapshot of the tree structure includes: determining an editing operation version identifier corresponding to the newest document version identifier based on a version identifier snapshot of the tree structure; and searching, according to the editing operation version identifier, for a content block version identifier as the updated content block version identifier.

According to one or more embodiments of the present disclosure, if the document operation event is a document reading event, the determining a content block node in the tree structure of the current document according the document operation event includes: according to the document reading event, determining a document node and a content block node in the tree structure and determining to-be-pushed version identifiers of the document node and the content block node.

According to one or more embodiments of the present disclosure, the performing the document operation event according to a correspondence between a document version identifier of the document node and a content block version identifier of the content block node includes: pulling a newest content block version identifier and practical content corresponding to the content block node according to the determined content block node; determining consistency between the pulled newest content block version identifier of the content block node and the to-be-pushed version identifier based on a version identifier snapshot of the tree structure; and providing the pulled practical content of the content block node toe the client device if the consistency is satisfied.

According to one or more embodiments of the present disclosure, the method further includes: determining a document node and a content block node in the tree structure and determining the to-be-pushed version identifiers of the document node and the content block node again, if the consistency is not satisfied.

According to one or more embodiments of the present disclosure, the apparatus further includes a content block delete module, configured to: determining, in response to a delete operation on the target content block, a content block in connection with the target content block according to the connection relationship recorded in the connection characteristic information of the target content block, and updating a delete identifier set by the determined content block for the target content block. According to one or more embodiments of the present disclosure, in the above apparatus.

The preferred embodiments and the technical principles of the present disclosure are described above. It should be understood by those skilled in the art that, the protection scope of the present disclosure is not limited to the technical solutions formed by specific combination of the above technical features, and other technical solutions formed by random combinations of the above technical features or equivalent features without departing from the concept of the present disclosure also fall within the protection scope of the present disclosure, for example the technical solution formed by replacement between the above technical features and technical features with similar functions disclosed (not limited) in the present disclosure.

Although the operations are described in a specific order, the operations are unnecessarily to be performed in the specific order or in a chronological order. In a certain environment, a multi-task and parallel processing may be beneficial. Although specific details are described above, the details should not be understood as restriction to the scope of the present disclosure. Some features described in the context of different embodiments may be combined in one embodiment. Alternatively, the features described in the context of one embodiment may be implemented in multiple embodiments independently or in any appropriate sub-combination.

The subject matter is described by language specific to the structure feature and/or method logic, it should be understood that the subject matter defined in the appended claims is not limited to the specific features or actions described above. The specific features and actions are only schematic implementation of the claims.

The invention claimed is:

1. A page content processing method, comprising:
determining, in response to a connection operation for a target content block in a current page, a connection content block of the target content block;
displaying, at an associated position of one of the target content block and the connection content block, a connection identifier of an other of the target content block and the connection content block, to view the other content block by using the connection identifier;
performing a document operation event according to a correspondence between a document version identifier of a document node and a content block version identifier of a content block node in a tree structure of a document, wherein the current page comprises the document,
wherein the document comprises at least one content block, the tree structure comprises the document node and the content block node;
wherein the method comprises at least one of:
in response to the document operation event being a version change event, determining, according to the document operation event, the document node in the tree structure of the current document comprising: according to the version change event, determining a document node in the tree structure of the current document and a document version identifier to which the version change event points; wherein the performing the document operation event according to the correspondence between the document version identifier of the document node and the content block version identifier of the content block node comprises searching, according to the document version identifier, for a content block version identifier of each corresponding content block node, based on a version identifier snapshot of the tree structure, determining to-be-changed content of each content block node according to the content block version identifier of each content block node, and performing the document change event according to the to-be-changed content of each content block node; or,
in response to the document operation event being a content block update content pushing event, determining the content block node in the tree structure of the current document according to the document operation event comprising: according to the content block update content pushing event, determining a content block node in the tree structure, and determining a newest document version identifier of a document node to which the content block node belongs; wherein the performing the document operation event according to the correspondence between the document version identifier of the document node and the content block version identifier of the content block node comprises:

determining an updated content block version identifier corresponding to the newest document version identifier based on a version identifier snapshot of the tree structure, and performing the content block update content pushing event according to the updated content block version identifier; or, in response to the document operation event being a document reading event, determining the content block node in the tree structure of the current document according the document operation event comprising: according to the document reading event, determining a document node and a content block node in the tree structure and determining to-be-pushed version identifiers of the document node and the content block node; wherein the performing the document operation event according to the correspondence between the document version identifier of the document node and the content block version identifier of the content block node comprises: pulling a newest content block version identifier and practical content corresponding to the content block node according to the determined content block node, determining consistency between the pulled newest content block version identifier of the content block node and the to-be-pushed version identifier based on a version identifier snapshot of the tree structure, and providing the pulled practical content of the content block node to a first client device if the consistency is satisfied.

2. The method according to claim 1, wherein the displaying, at the associated position of one of the target content block and the connection content block, the connection identifier of the other of the target content block and the connection content block comprises:

displaying, at an associated position of the target content block, an active connection identifier indicating connecting to the connection content block, to view the connection content block in the current page by using the active connection identifier; and displaying, at an associated position of the connection content block, a passive connection identifier indicating being connected to the target content block, to view the target content block in a page where the connection content block is located by using the passive connection identifier.

3. The method according to claim 1, wherein the determining, in response to the connection operation for the target content block in the current page, the connection content block of the target content block comprises:

displaying, in response to the connection operation for the target content block in the current page, a connection search interface; and displaying at least one content block in the connection search interface, and determining, in response to a selection operation on the at least one content block, a selected content block as the connection content block of the target content block.

4. The method according to claim 1, wherein the connection identifier displayed at the associated position of one of the target content block and the connection content block comprises at least one of:

a passive connection identifier indicating the one content block being connected to another content block; and an active connection identifier indicating the one content block connecting to another content block.

5. The method according to claim 1, wherein after the displaying, at the associated position of one of the target content block and the connection content block, the connection identifier of the other of the target content block and the connection content block, the method further comprises:

displaying, in response to a preset operation, one or more content blocks associated with the target content block in a preset region of the current page; and jumping, in response to a triggering operation on a content block of the one or more content blocks displayed in the preset region, from the current page to a page where the content block is located.

6. The method according to claim 5, wherein the jumping from the current page to the page where the content block is located comprises:

jumping from the current page to a position of the content block in the page where the content block is located.

7. The method according to claim 5, wherein the displaying the content block associated with the target content block in the preset region of the current page comprises:

viewing a connection relationship recorded in connection characteristic information of the target content block, and determining, according to a delete identifier set corresponding to the connection relationship, whether the content block associated with the target content block is deleted; and displaying, in the preset region of the current page, the content block associated with the target content block that is not deleted.

8. The method according to claim 7, wherein the delete identifier set corresponding to the connection relationship is recorded in connection characteristic information of the content block indicated by the connection relationship or other data region, or the method comprises:

in response to a delete operation on the target content block, determining, according to the connection relationship recorded in the connection characteristic information of the target content block, a content block in connection with the target content block, and updating a delete identifier set by the determined content block for the target content block.

9. The method according to claim 1, wherein after the determining, in response to the connection operation for the target content block in the current page, the connection content block of the target content block, the method further comprises:

recording a connection relationship between the target content block and the connection content block in connection characteristic information of the target content block and connection characteristic information of the connection content block.

10. The method according to claim 5, wherein the preset region comprises a sidebar, a lower half display region or an upper half display region of the current page;

or the content blocks to which the target content block actively connects and passively connects are displayed in different sub-regions of the preset region, or a content block corresponding to a connection identifier specified by the preset operation is highlighted, or, wherein each connection identifier displayed at the associated position of the target content block has a classification label associated with the connection identifier, the displaying the content block associated with the target content block in the preset region of the current page comprises: selectively displaying, in the preset region of the current page, the content blocks associated with the target content block according to a classification label of a triggered connection identifier.

11. The method according to claim 1, wherein before the determining, in response to the connection operation for the target content block in the current page, the connection content block of the target content block, the method further comprises:
creating the target content block in the current page, and configuring a connection control for the target content block, to perform the connection operation by using the connection control.

12. The method according to claim 1, wherein the connection content block and the target content block have a same or different types of content, or classification labels of the connection identifiers displayed at associated positions of the connection content block and the target content block are the same or different.

13. A computer device, comprising:
one or more processors;
a memory configured to store one or more programs, wherein the one or more programs, when being executed by the one or more processors, cause the one or more processors to perform the page content processing method according to claim 1.

14. An information processing method, comprising:
recording, in response to a connection operation for connecting a first content block and a second content block, a connection relationship between the first content block and the second content block in connection characteristic information of the first content block and connection characteristic information of the second content block;
searching, in response to a connection content block output request of the first content block, for the connection characteristic information of the first content block to determine a content block in connection with the first content block;
obtaining content data information of the content block in connection with the first content block, and outputting the content data information; and
performing a document operation event according to a correspondence between a document version identifier of a document node and a content block version identifier of a content block node in a tree structure of a document,
wherein the document comprises at least one content block including the first content block and the second content block, the tree structure comprises the document node and the content block node;
wherein the method comprises at least one of:
in response to the document operation event being a version change event, determining, according to the document operation event, the document node in the tree structure of the current document comprising: according to the version change event, determining a document node in the tree structure of a current document and a document version identifier to which the version change event points; wherein the performing the document operation event according to the correspondence between the document version identifier of the document node and the content block version identifier of the content block node comprises searching, according to the document version identifier, for a content block version identifier of each corresponding content block node, based on a version identifier snapshot of the tree structure, determining to-be-changed content of each content block node according to the content block version identifier of each content block node, and performing the document change event according to the to-be-changed content of each content block node; or,
in response to the document operation event being a content block update content pushing event, determining the content block node in the tree structure of the current document according to the document operation event comprising: according to the content block update content pushing event, determining a content block node in the tree structure, and determining a newest document version identifier of a document node to which the content block node belongs, wherein the performing the document operation event according to the correspondence between the document version identifier of the document node and the content block version identifier of the content block node comprises: determining an updated content block version identifier corresponding to the newest document version identifier based on a version identifier snapshot of the tree structure, and performing the content block update content pushing event according to the updated content block version identifier; or,
in response to the document operation event being a document reading event, determining the content block node in the tree structure of the current document according the document operation event comprising: according to the document reading event, determining a document node and a content block node in the tree structure and determining to-be-pushed version identifiers of the document node and the content block node; wherein the performing the document operation event according to the correspondence between the document version identifier of the document node and the content block version identifier of the content block node comprises: pulling a newest content block version identifier and practical content corresponding to the content block node according to the determined content block node, determining consistency between the pulled newest content block version identifier of the content block node and the to-be-pushed version identifier based on a version identifier snapshot of the tree structure, and providing the pulled practical content of the content block node to a first client device if the consistency is satisfied.

15. The method according to claim 14, further comprising:
determining, in response to a delete operation for the first content block, a content block in connection with the first content block according to the connection characteristic information of the first content block, and updating a delete identifier set by the content block in connection with the first content block for the first content block.

16. The method according to claim 14, wherein after recording the connection relationship between the first content block and the second content block in connection characteristic information of the first content block and connection characteristic information of the second content block, the method further comprises:
updating the connection characteristic information of the first content block and the second content block in a document structure,
wherein the first content block and the second content block belong to a same document or different documents.

17. A document synchronization method, comprising:
monitoring an update state of a document according to a document version identifier of a document node in a tree structure of the document, wherein the document comprises at least one content block, the tree structure comprises a document node and a content block node, a parent-child relationship between the document node and the content block node represents affiliation between the document and the content block; a document version identifier sequence is recorded in the document node and the document version identifier is used to represent update of a content block belonging to the document;
determining, in response to detecting an update of a content object in a room, a second client device in the room subscribing the content object, wherein the content object comprises the document; and
providing update content of the content object in the room to the second client device, to allow the second client device to update the content object; and
performing a document operation event according to a correspondence between the document version identifier of the document node and the content block version identifier of the content block node in the tree structure of the document,
wherein the method comprises at least one of:
in response to the document operation event being a version change event, determining, according to the document operation event, the document node in the tree structure of the current document comprising: according to the version change event, determining a document node in the tree structure of a current document and a document version identifier to which the version change event points; wherein the performing the document operation event according to the correspondence between the document version identifier of the document node and the content block version identifier of the content block node comprises searching, according to the document version identifier, for a content block version identifier of each corresponding content block node, based on a version identifier snapshot of the tree structure, determining to-be-changed content of each content block node according to the content block version identifier of each content block node, and performing the document change event according to the to-be-changed content of each content block node; or,
in response to the document operation event being a content block update content pushing event, determining the content block node in the tree structure of the current document according to the document operation event comprising: according to the content block update content pushing event, determining a content block node in the tree structure, and determining a newest document version identifier of a document node to which the content block node belongs; wherein the performing the document operation event according to the correspondence between the document version identifier of the document node and the content block version identifier of the content block node comprises: determining an updated content block version identifier corresponding to the newest document version identifier based on a version identifier snapshot of the tree structure, and performing the content block update content pushing event according to the updated content block version identifier; or,
in response to the document operation event being a document reading event, determining the content block node in the tree structure of the current document according the document operation event comprising: according to the document reading event, determining a document node and a content block node in the tree structure and determining to-be-pushed version identifiers of the document node and the content block node; wherein the performing the document operation event according to the correspondence between the document version identifier of the document node and the content block version identifier of the content block node comprises: pulling a newest content block version identifier and practical content corresponding to the content block node according to the determined content block node, determining consistency between the pulled newest content block version identifier of the content block node and the to-be-pushed version identifier based on a version identifier snapshot of the tree structure, and providing the pulled practical content of the content block node to a first client device if the consistency is satisfied.

18. The method according to claim 17, wherein the monitoring the update state of the document according to the document version identifier of the document node in the tree structure of the document comprises:
monitoring the document version identifier sequence of the document node in the tree structure of the document, and determining that the document is updated when a new document version identifier is generated.

19. The method according to claim 17, wherein a content block version identifier sequence is recorded for the content node, and the method further comprises:
adding a new document version identifier in the document version identifier sequence of the document node when a new content block version identifier is generated in any content block node belonging to the document node;
or,
wherein the content object further comprises a content block, and the method further comprises:
monitoring an update state of the content block according to a content block version identifier of the content node in the tree structure, wherein a content block version identifier sequence is recorded for the content block node, and the content block version identifier is used to represent content update of the content block.

20. The method according to claim 17, wherein the providing update content of the content object in the room to the second client device comprises:
searching, according to the document version identifier of the document node in the tree structure, for a new content block version identifier of each content block node where the new content block version identifier corresponds to the new document version identifier, based on a version identifier snapshot of the tree structure; and
determining update content of a content block corresponding to the new content block version identifier, and providing the update content to the second client device.

21. The method according to claim 17, further comprising:
receiving a room subscribing request triggered when the second client device loads the document, and determining a content object to which the room subscribing request points; and adding the second client device to a room corresponding to the content object, or wherein the determining the content object to which the room subscribing request points comprises: determining a currently loaded document to which the room subscribing request points; and determining in the tree structure a document node corresponding to the currently loaded document, and determining a document node identifier of the document node as the content object to which the room subscribing request points.

22. The method according to claim 21, wherein after the determining in the tree structure the document node corresponding to the currently loaded document, the method further comprises:

determining a content block node of a reference content block having a reference relationship with the document node; and determining an identifier of the content block node having the reference relationship as the content object to which the room subscribing request points;

or, determining a content block node of a reverse link content block having a reverse reference relationship with the document node; and determining an identifier of the content block node having the reverse reference relationship as the content object to which the room subscribing request points.

23. The method according to claim 19, further comprising:

receiving a heartbeat request sent by the second client device, detecting, according to a document version identifier of a document node and/or a content block version identifier of a content block node in the tree structure, whether a target document or a target content block corresponding to the heartbeat request is updated, and providing an updated version identifier to the second client device if the target document or the target content block is updated;

or, the method further comprising: receiving a compensation update request sent by the second client device, and obtaining update content according to a version identifier of a target document or target content block specified by the compensation update request, and feeding the update content back to the second client device.

24. A document synchronization method, comprising:

sending a content update request to a server for a document of a third client device, to request the server to determine document content according to a document version identifier in the content update request, wherein the document comprises at least one content block, a tree structure of the document comprises a document node and a content block node, a parent-child relationship between the document node and the content block node represents affiliation between the document and the content block; wherein a document version identifier sequence is recorded in the document node, and a document version identifier is used to represent update of a content block belonging to the document;

obtaining the document version identifier and a content block version identifier of a content block belonging to the document fed back by the server;

obtaining practical content by the third client device according to the document version identifier and the content block version identifier; and performing a document operation event according to a correspondence between the document version identifier of the document node and the content block version identifier of the content block node in the tree structure of the document, wherein the method comprises at least one of:

in response to the document operation event being a version change event, determining according to the document operation event, the document node in the tree structure of the current document comprising: according to the version change event, determining a document node in the tree structure of a current document and a document version identifier to which the version change event points; wherein the performing the document operation event according to the correspondence between the document version identifier of the document node and the content block version identifier of the content block node comprises searching, according to the document version identifier, for a content block version identifier of each corresponding content block node, based on a version identifier snapshot of the tree structure, determining to-be-changed content of each content block node according to the content block version identifier of each content block node, and performing the document change event according to the to-be-changed content of each content block node; or, in response to the document operation event being a content block update content pushing event, determining the content block node in the tree structure of the current document according to the document operation event comprising: according to the content block update content pushing event, determining a content block node in the tree structure, and determining a newest document version identifier of a document node to which the content block node belongs; wherein the performing the document operation event according to the correspondence between the document version identifier of the document node and the content block version identifier of the content block node comprises: determining an updated content block version identifier corresponding to the newest document version identifier based on a version identifier snapshot of the tree structure, and performing the content block update content pushing event according to the updated content block version identifier; or, in response to the document operation event being a document reading event, determining the content block node in the tree structure of the current document according the document operation event comprising: according to the document reading event, determining a document node and a content block node in the tree structure and determining to-be-pushed version identifiers of the document node and the content block node; wherein the performing the document operation event according to the correspondence between the document version identifier of the document node and the content block version identifier of the content block node comprises: pulling a newest content block version identifier and practical content corresponding to the content block node according to the determined content block node, determining consistency between the pulled newest content block version identifier of the content block node and the to-be-pushed version identifier based on a version identifier snapshot of the tree structure, and providing the pulled practical content of the content block node to a first client device if the consistency is satisfied.

25. The method according to claim 24, wherein the sending the content update request to the server for the document of the third client device comprises at least one of:
   determining, for the document of the third client device, at least one reference content block of the document, and sending, to the server, the update request carrying a document version identifier of the document and a content block identifier of the reference content block;
   sending a content update request to the server when the third client device loads the document; and
   sending a content update request to the server when the third client device edits the document.

26. A document processing method based on a tree structure, comprising:
   obtaining a document operation event for a current document;
   determining, according to the document operation event, a document node and/or a content block node in a tree structure of the current document; and
   performing the document operation event according to a correspondence between a document version identifier of the document node and a content block version identifier of the content block node,
   wherein the document comprises at least one content block, the tree structure comprises a document node and a content block node; a parent-child relationship between the document node and the content block node represents affiliation between the document and the content block; a document version identifier sequence is recorded in the document node, a content block version identifier sequence is recorded in the content block node; and the document version identifier is used to represent update of the content block belonging to the document,
   wherein the method comprises at least one of:
   in response to the document operation event being a version change event, the determining according to the document operation event, the document node in the tree structure of the current document comprising: according to the version change event, determining a document node in the tree structure of the current document and a document version identifier to which the version change event points; wherein the performing the document operation event according to the correspondence between the document version identifier of the document node and the content block version identifier of the content block node comprises searching, according to the document version identifier, for a content block version identifier of each corresponding content block node, based on a version identifier snapshot of the tree structure, determining to-be-changed content of each content block node according to the content block version identifier of each content block node, and performing the document change event according to the to-be-changed content of each content block node; or,
   in response to the document operation event being a content block update content pushing event, the determining the content block node in the tree structure of the current document according to the document operation event comprising: according to the content block update content pushing event, determining a content block node in the tree structure, and determining a newest document version identifier of a document node to which the content block node belongs; wherein the performing the document operation event according to the correspondence between the document version identifier of the document node and the content block version identifier of the content block node comprises: determining an updated content block version identifier corresponding to the newest document version identifier based on a version identifier snapshot of the tree structure, and performing the content block update content pushing event according to the updated content block version identifier; or,
   in response to the document operation event being a document reading event, the determining the content block node in the tree structure of the current document according the document operation event comprising: according to the document reading event, determining a document node and a content block node in the tree structure and determining to-be-pushed version identifiers of the document node and the content block node; wherein the performing the document operation event according to the correspondence between the document version identifier of the document node and the content block version identifier of the content block node comprises: pulling a newest content block version identifier and practical content corresponding to the content block node according to the determined content block node, determining consistency between the pulled newest content block version identifier of the content block node and the to-be-pushed version identifier based on a version identifier snapshot of the tree structure, and providing the pulled practical content of the content block node to a first client device if the consistency is satisfied.

27. The method according to claim 26, wherein the content block belonging to the document comprises a root content block, and a content block version identifier sequence of the root content block is recorded in the document node,
   or,
   wherein an editing operation identifier sequence is recorded in the document node and the content block node, and the editing operation identifier is used to represent an editing operation for updating the content block.

28. The method according to claim 27, further comprising:
   obtaining a document editing event for the current document;
   according to an editing operation in the document editing event, updating an editing operation identifier and a content block version identifier of the content block node in the tree structure, or updating the parent-child relationship between the content block node and the document node; and
   updating, according to the editing operation, the editing operation identifier and the document version identifier of the document node.

29. The method according to claim 28, wherein the method comprises at least one of:
   the editing operation comprises a content update operation for the content block, and the updating the editing operation identifier and the content block version identifier of the content block node in the tree structure according to the editing operation in the document editing event comprises determining a content block according to the editing operation, adding a new editing operation identifier in the editing operation identifier sequence of the content block node of the content block, and adding a new editing operation identifier in the editing operation identifier sequence of the content block node of the content block; and the updating, according to the editing operation, the editing operation identifier and the document version identifier of the document node comprises adding a new editing operation identifier to the editing operation identifier sequence of the document node, and adding a new document version identifier to the document version identifier sequence of the document node, wherein the new document version identifier corresponds to the new content block version identifier; or, the editing operation comprises a content block adding operation, and the updating, according to the editing operation, the editing operation identifier and the document version identifier of the document node comprises determining a document node according to the editing operation, adding a new editing operation identifier to the editing operation identifier sequence of the document node, and adding a new document version identifier to the document version identifier sequence of the document node; wherein the updating, according to the editing operation in the document edition event, the editing operation identifier and the document version identifier of the content block node in the tree structure comprises: according to the editing operation, adding a new content block node in the tree structure, creating a new content block version identifier in the content block node, and establishing a correspondence between the new content block version identifier and the new document version identifier; or, the editing operation comprises a content block delete operation, and the updating the parent-child relationship between the content block node and the document node according to the editing operation comprises determining a content block according to the editing operation, deleting the parent-child relationship between the content block node of the content block and the document node; wherein the updating, according to the editing operation, the editing operation identifier and the document version identifier of the document node comprises: according to the editing operation, adding a new editing operation identifier to the editing operation identifier sequence of the document node, and adding a new document version identifier to the document version identifier sequence of the document node.

30. The method according to claim 29, wherein the determining the content block according to the editing operation comprises:
   determining at least two content blocks according to the editing operation,
   wherein there is a one-to-one correspondence between the new document version identifier and the new content version identifier, or one new document version identifier corresponds to at least two new content block version identifiers added due to the editing operation.

31. The method according to claim 26, wherein after performing the document change event according to the to-be-changed content of each content block node, the method further comprises:
   according to the to-be-changed content of the document change event, adding a new editing operation identifier, a new content block version identifier and a new document version identifier to the document node, and adding a new editing operation identifier and a new content block version identifier to each content block.

32. The method according to claim 26, wherein the determining the updated content block version identifier corresponding to the newest document version identifier based on the version identifier snapshot of the tree structure comprises:
   determining an editing operation version identifier corresponding to the newest document version identifier based on the version identifier snapshot of the tree structure; and
   searching, according to the editing operation version identifier, for a content block version identifier as the updated content block version identifier.

33. The method according to claim 26, further comprising:
   re-determining a document node and a content block node in the tree structure and re-determining the to-be-pushed version identifiers of the document node and the content block node, if the consistency is not satisfied.

* * * * *